Dec. 12, 1972    C. M. HAMMACK    3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961    27 Sheets-Sheet 1
FIG_1
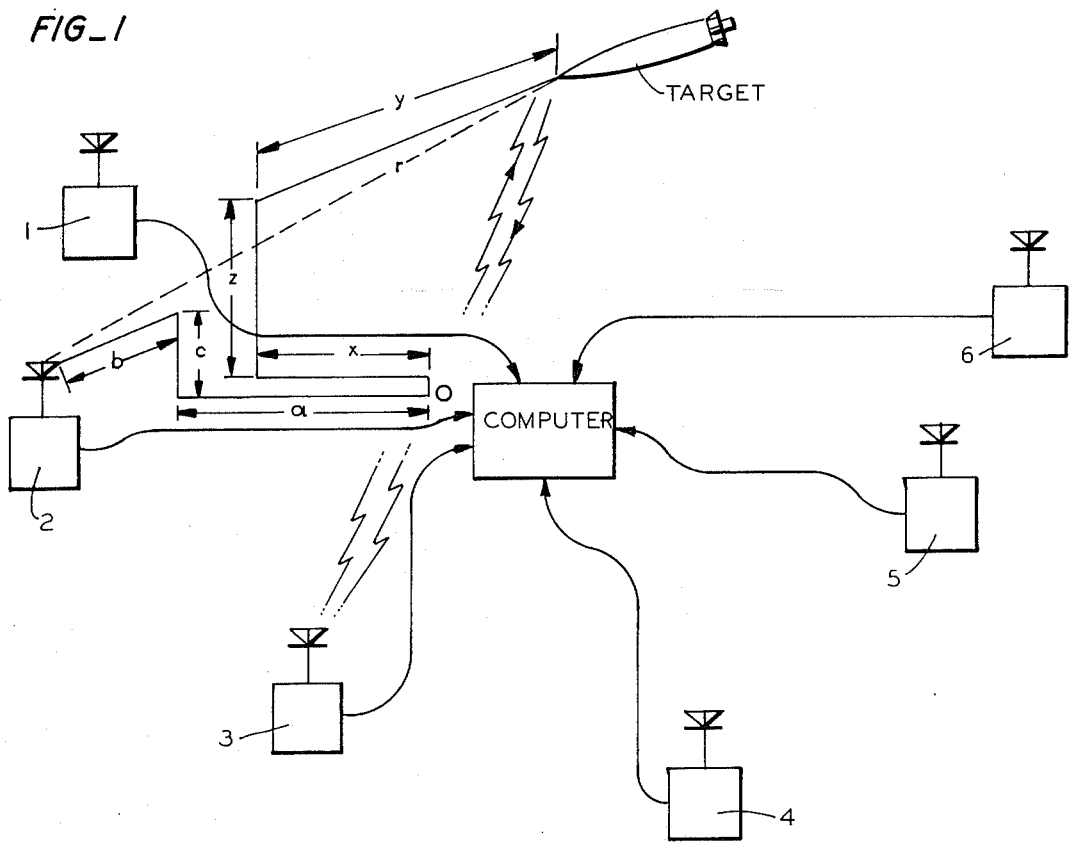
FIG_2
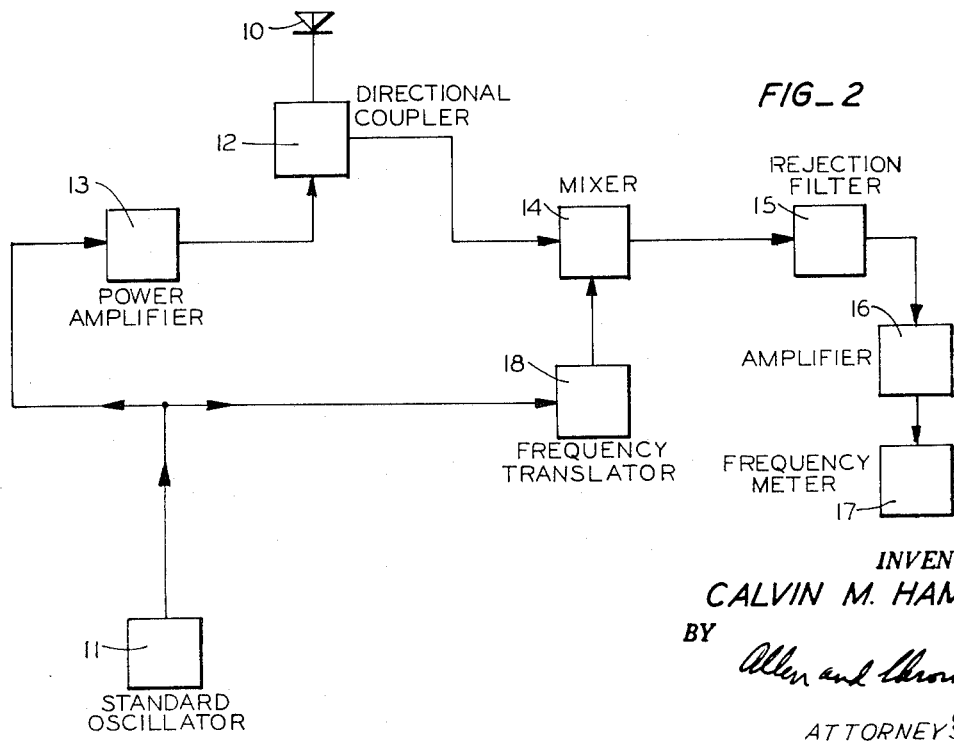
INVENTOR.
CALVIN M. HAMMACK
BY
ATTORNEYS

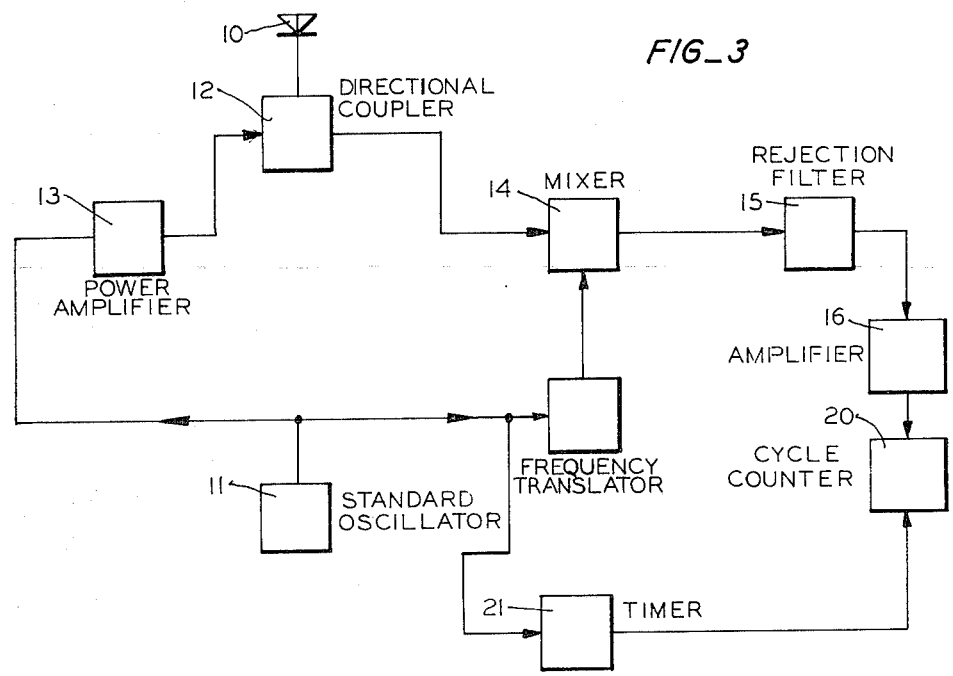
FIG_3
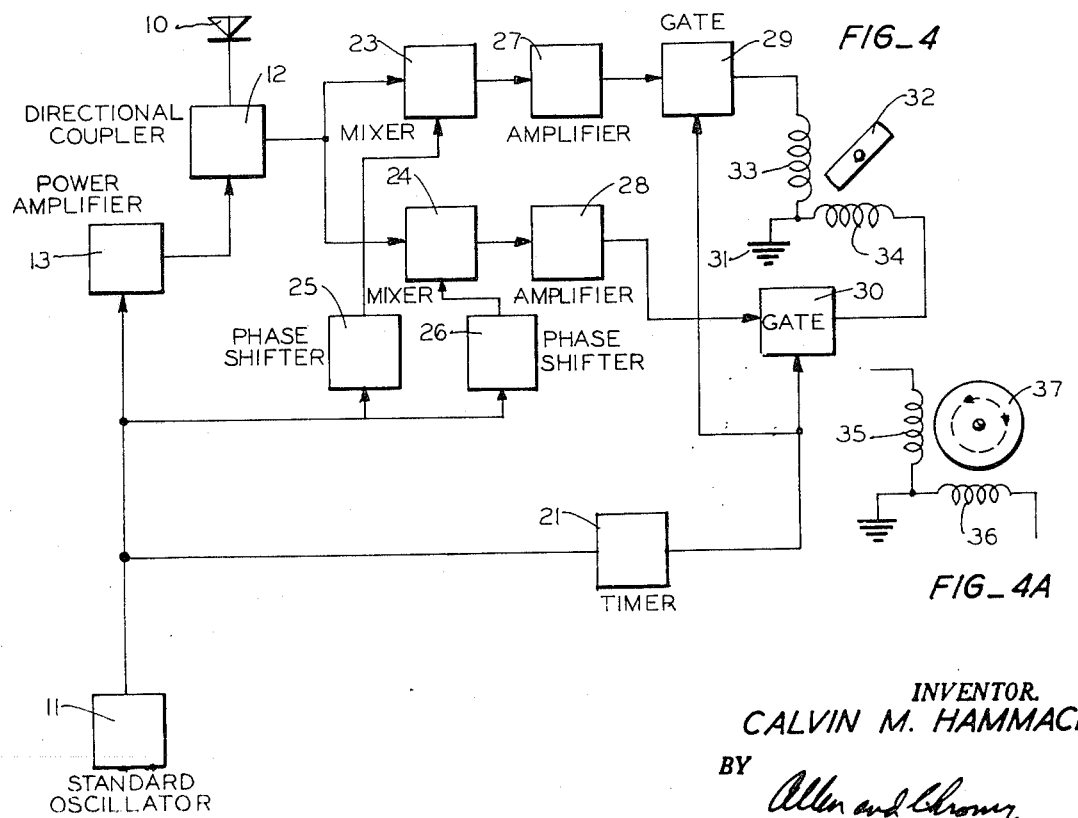
FIG_4
FIG_4A
INVENTOR.
CALVIN M. HAMMACK

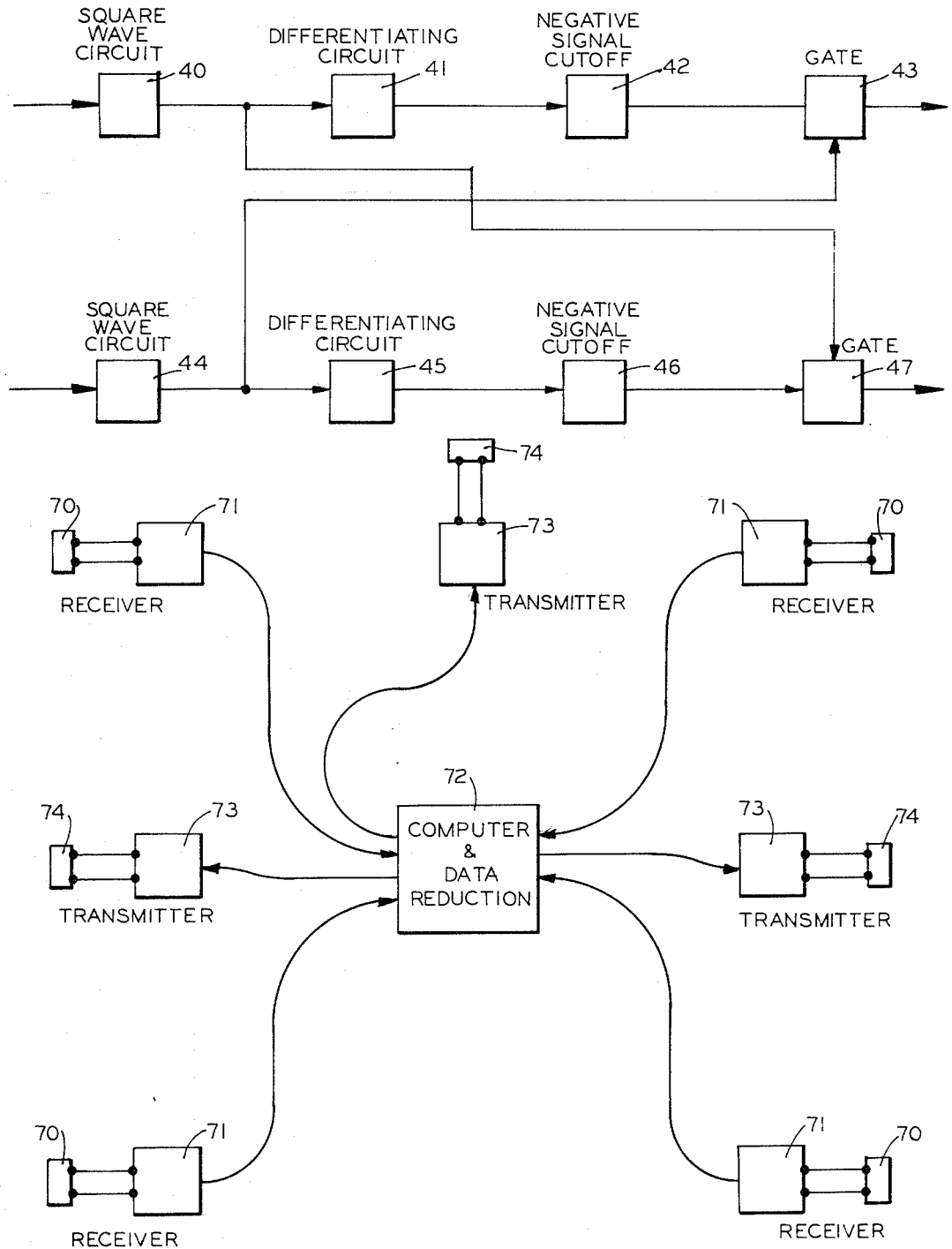

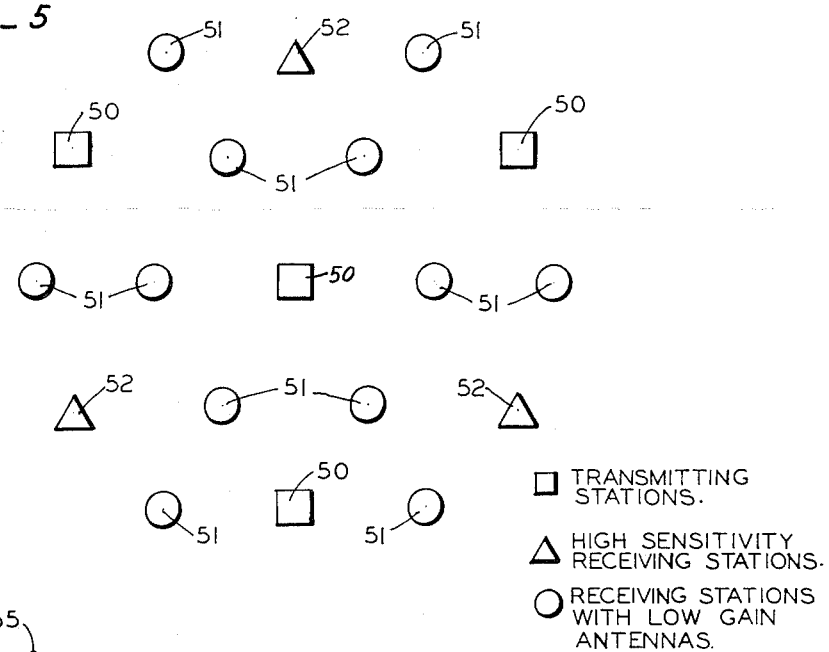
FIG_5
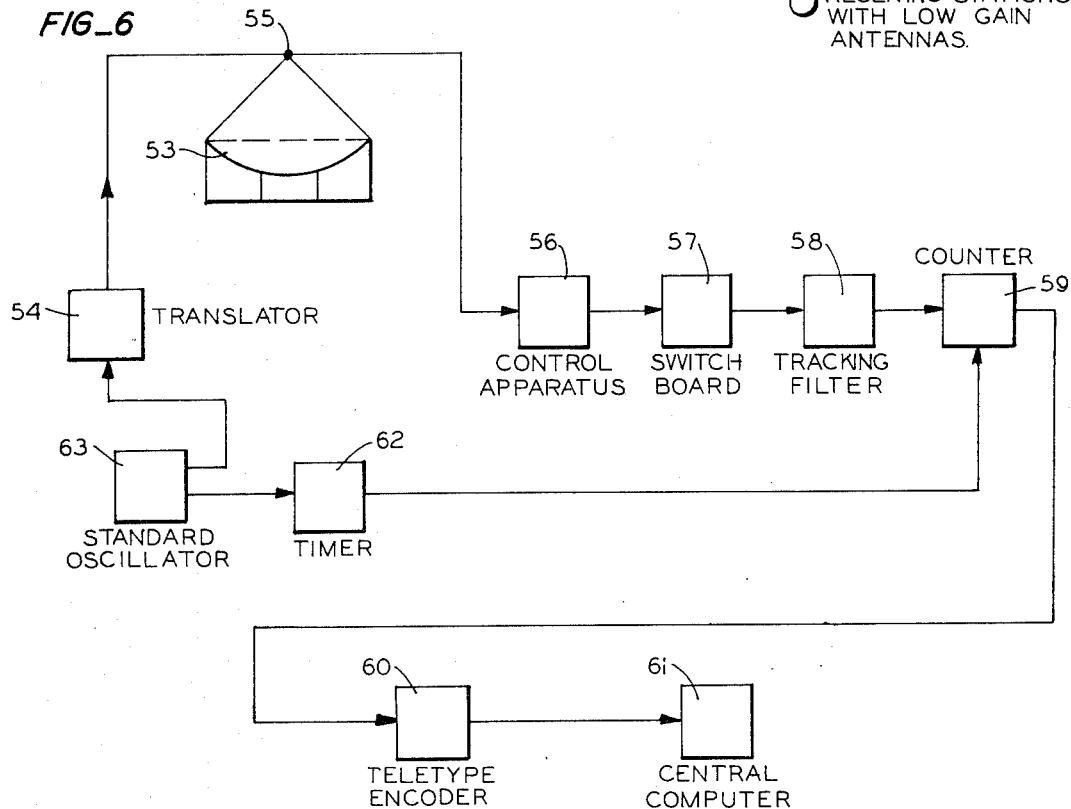
FIG_6
INVENTOR.
CALVIN M. HAMMACK

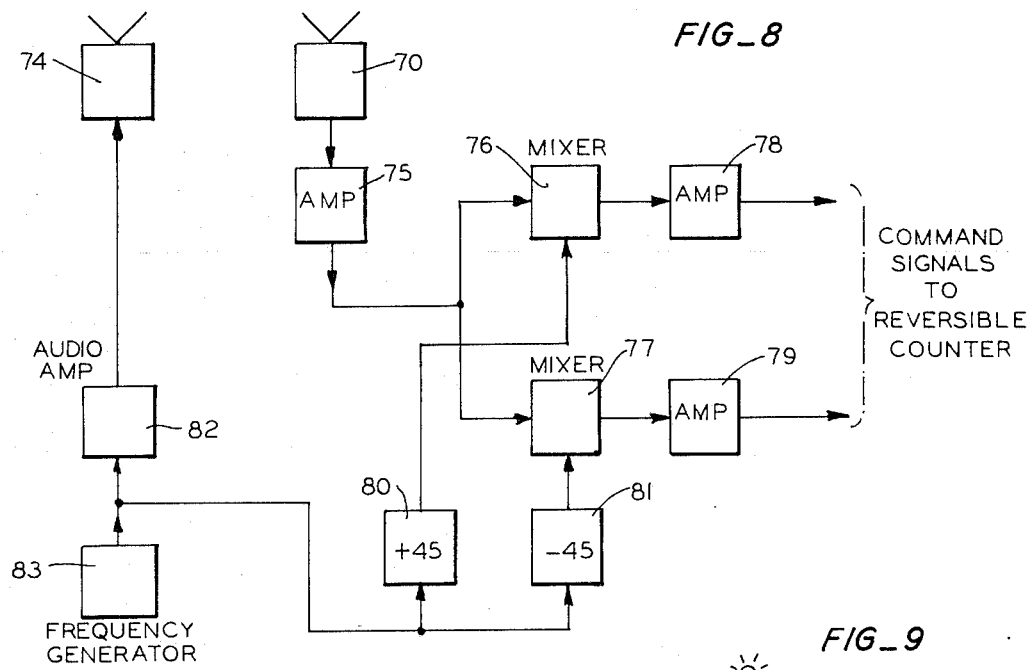
FIG_8
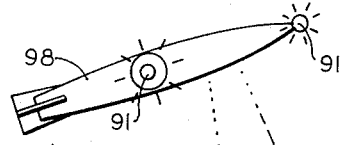
FIG_9
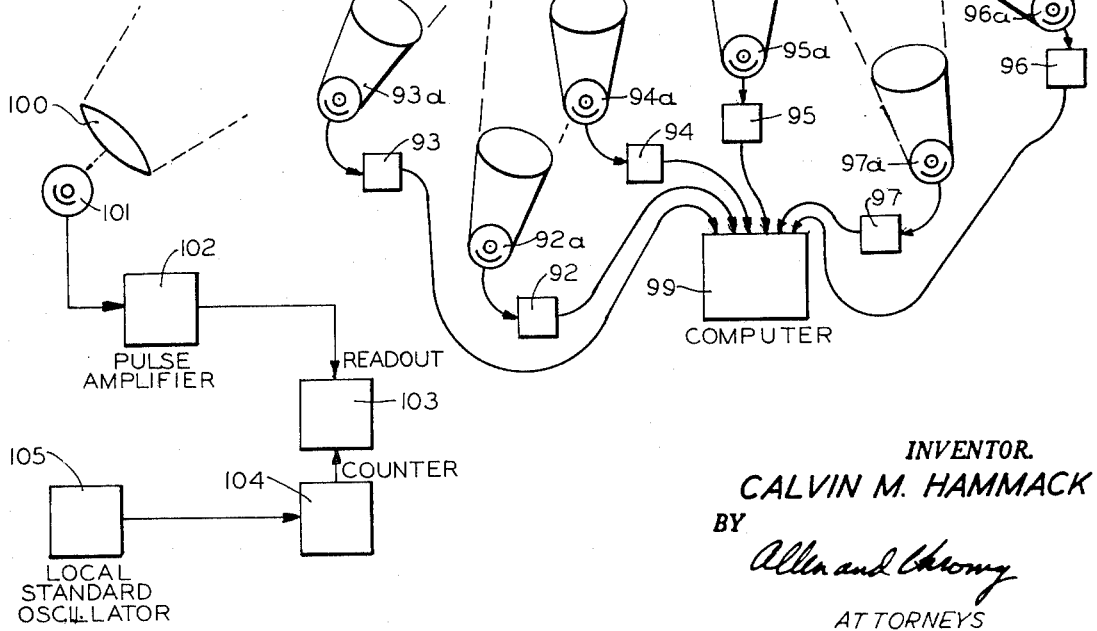
FIG_10
INVENTOR.
CALVIN M. HAMMACK
BY
*Allen and Chromy*
ATTORNEYS

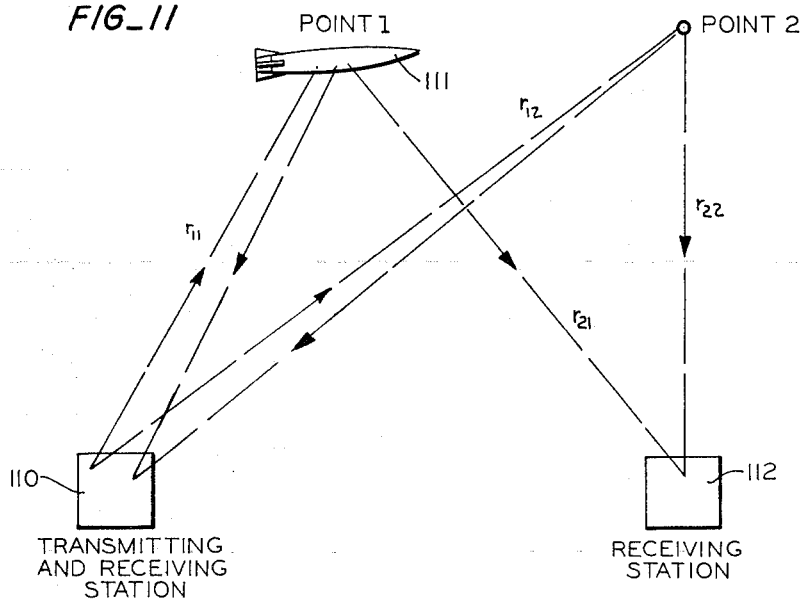
FIG_11
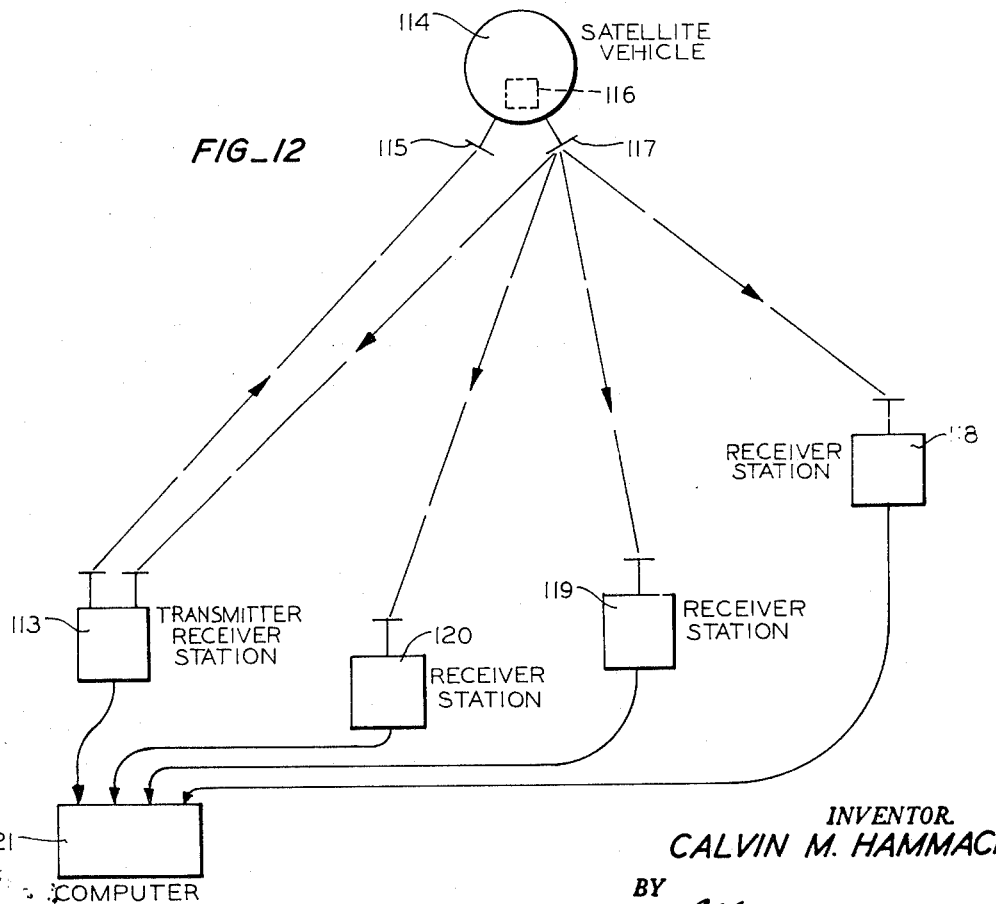
FIG_12
INVENTOR.
CALVIN M. HAMMACK

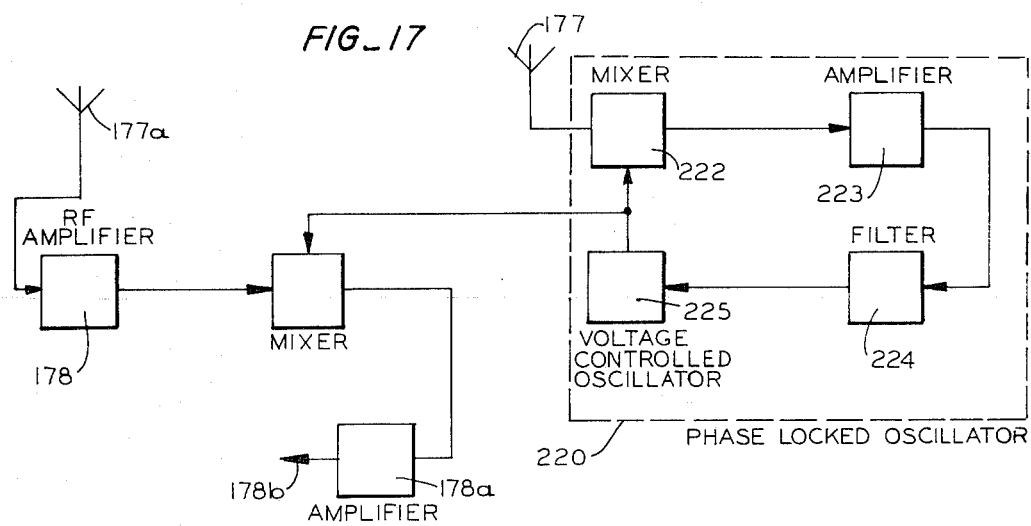
FIG_17
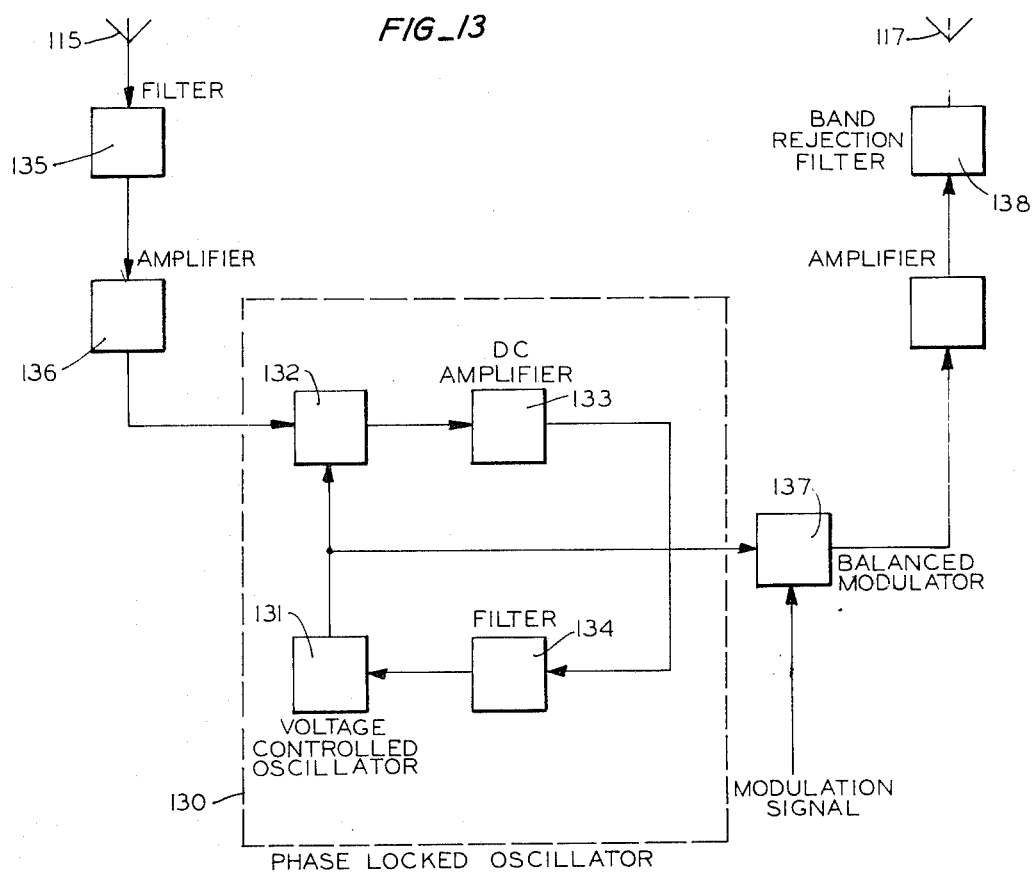
FIG_13

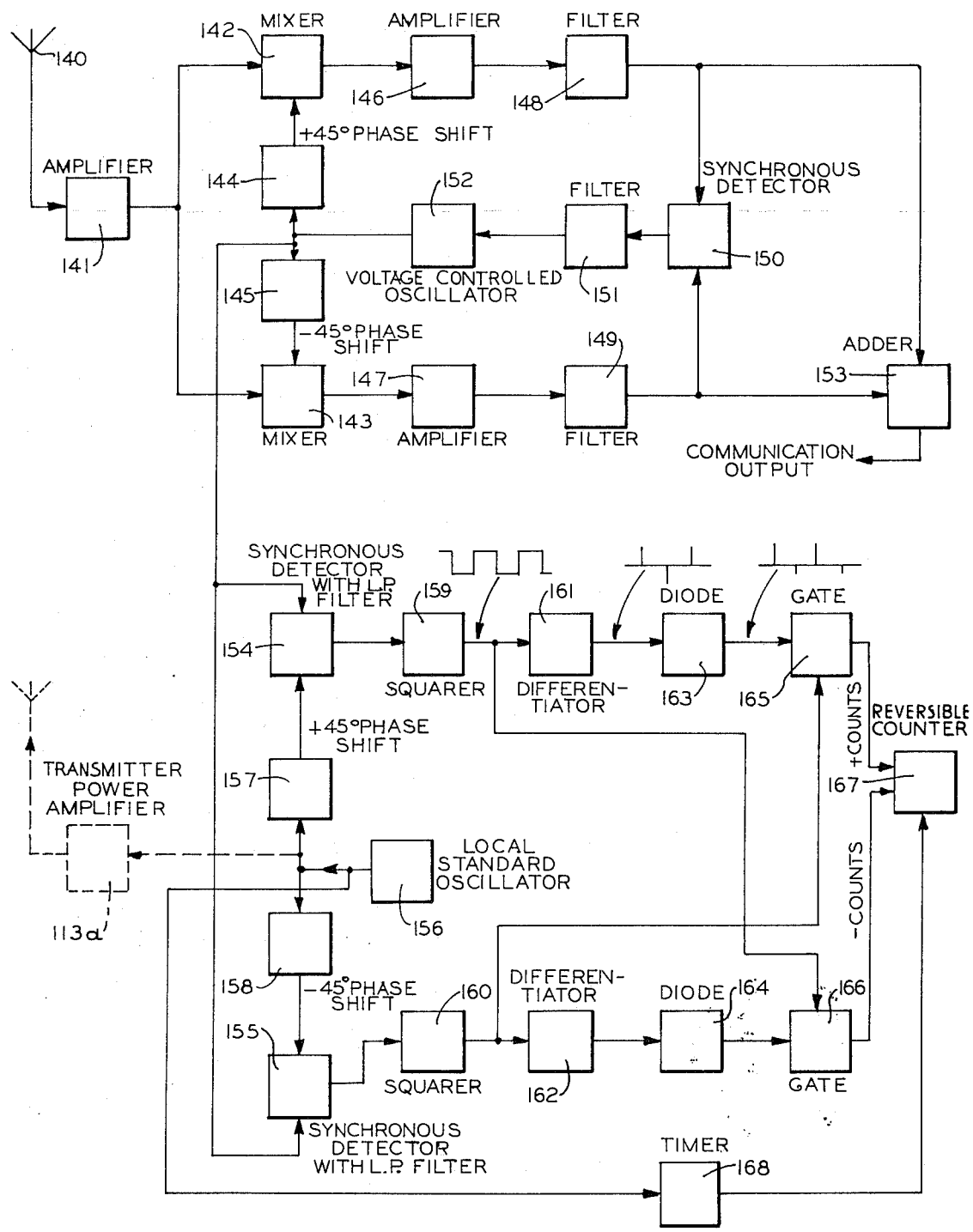
FIG_14

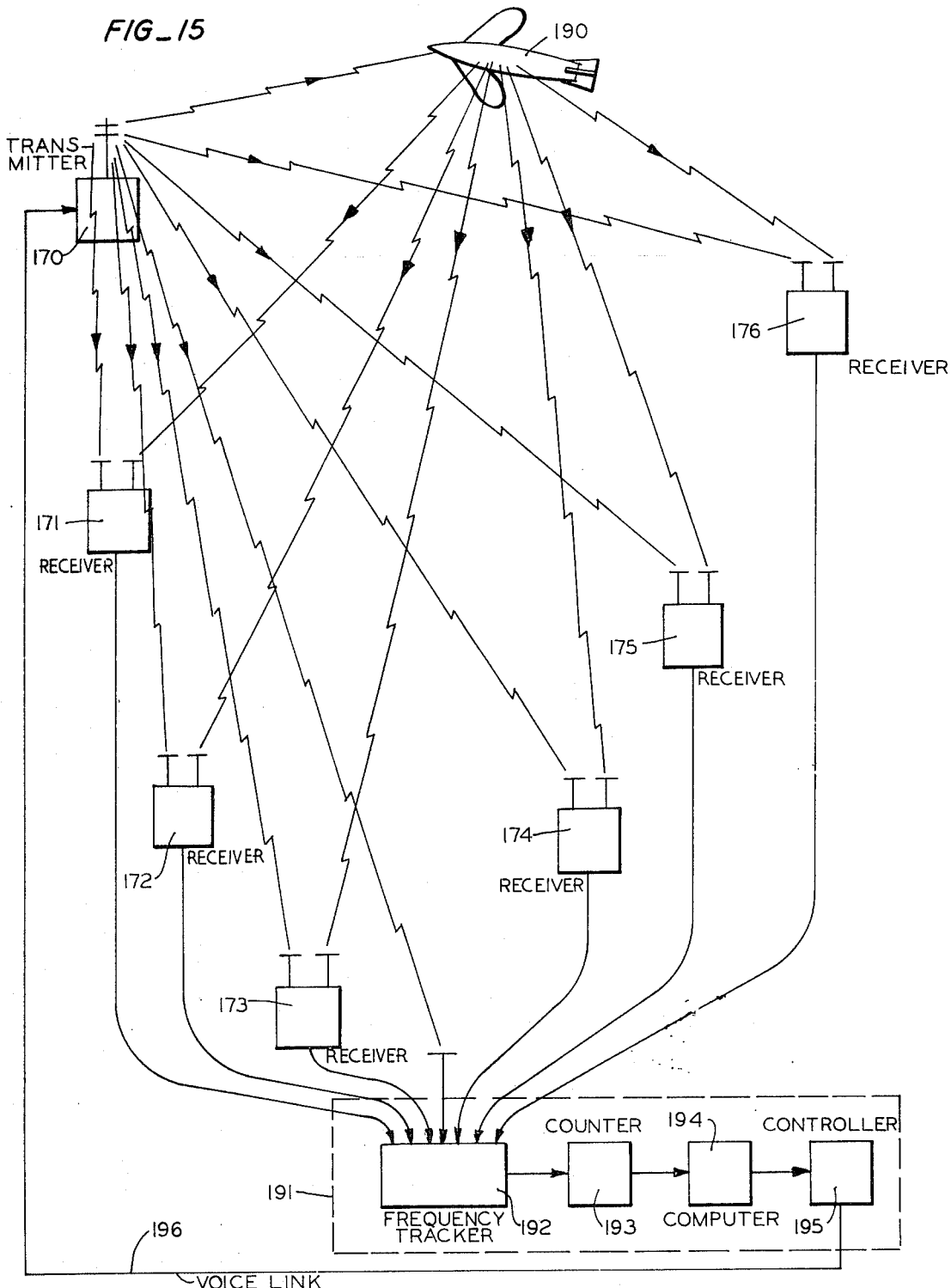

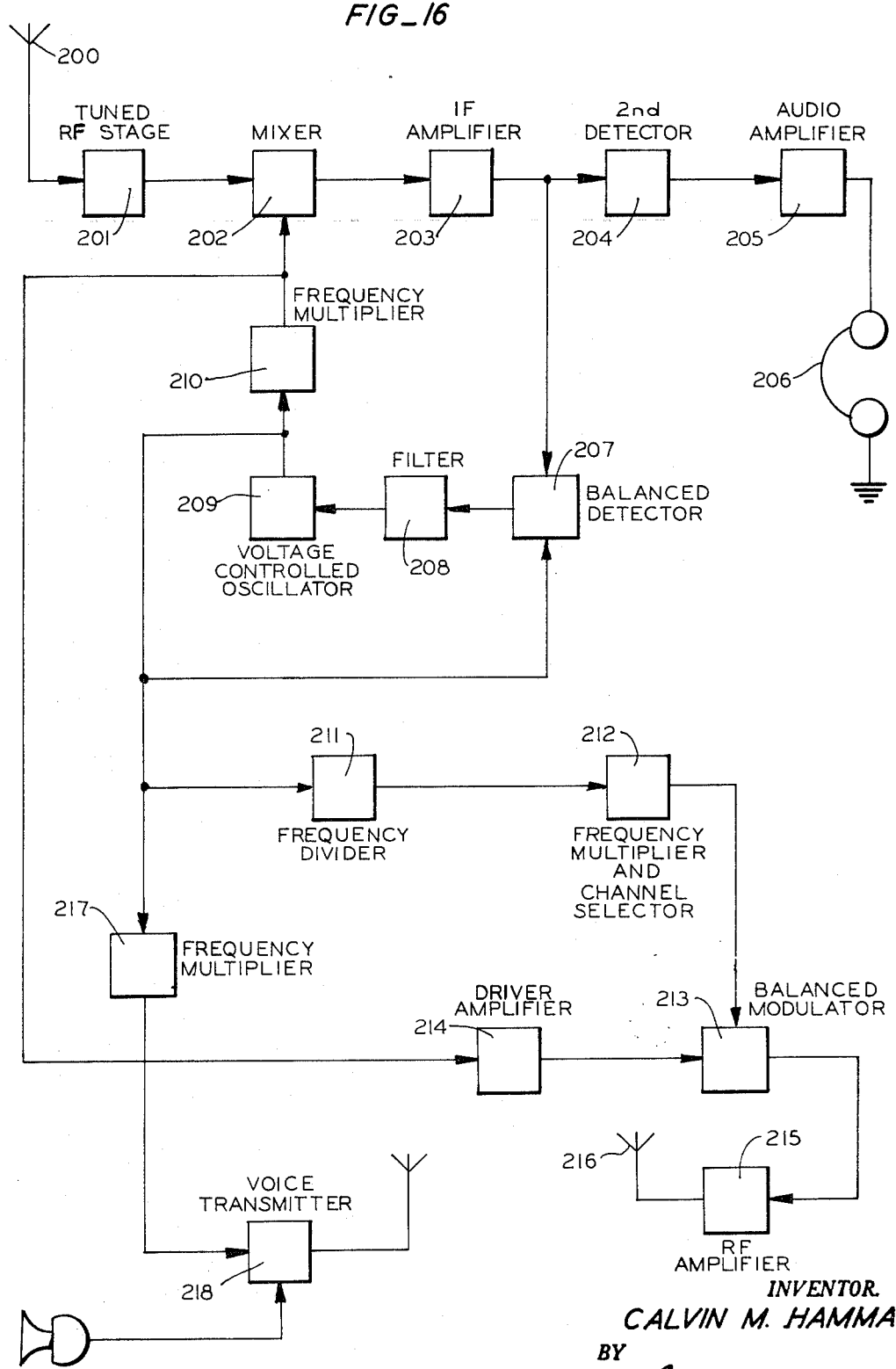

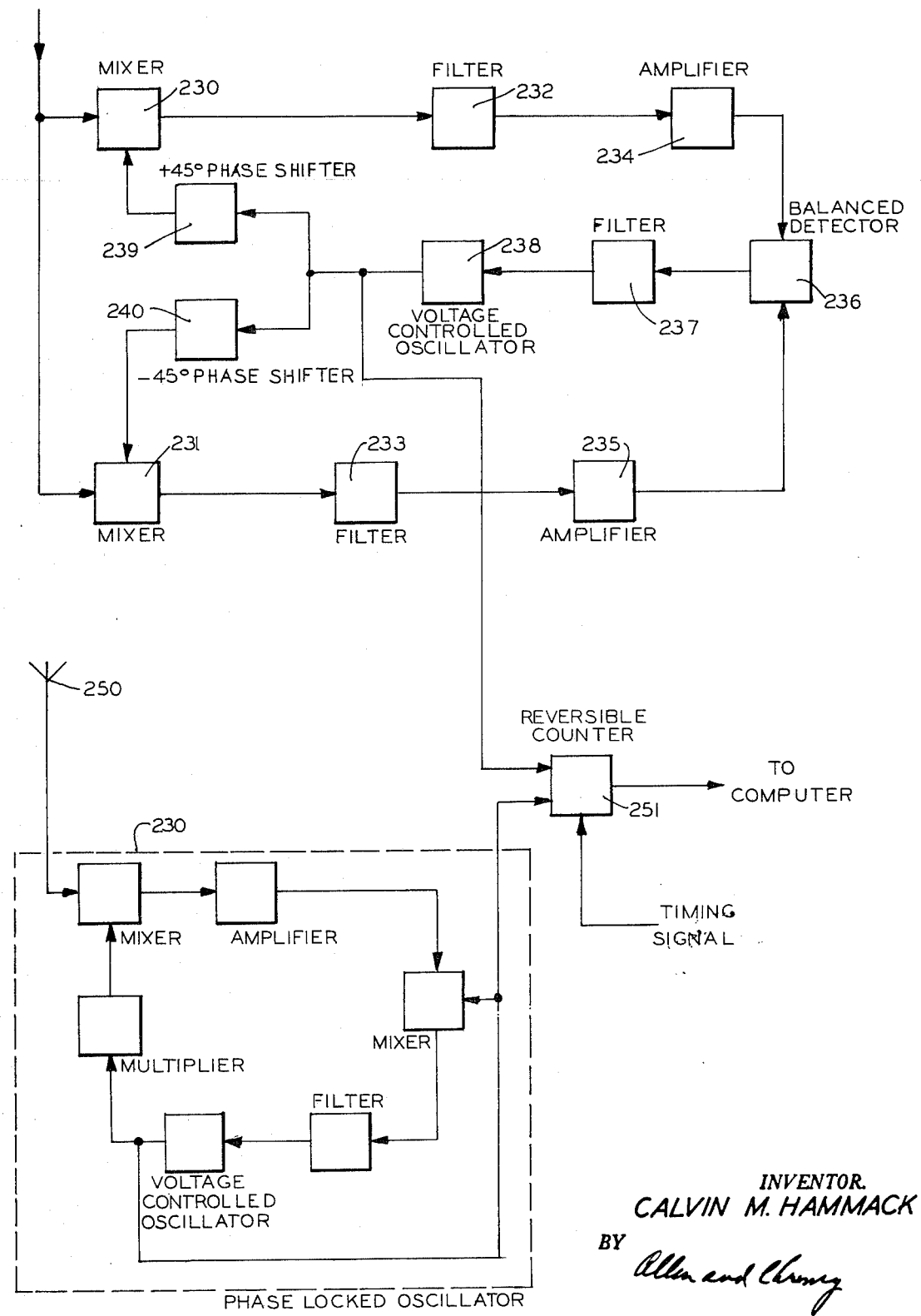

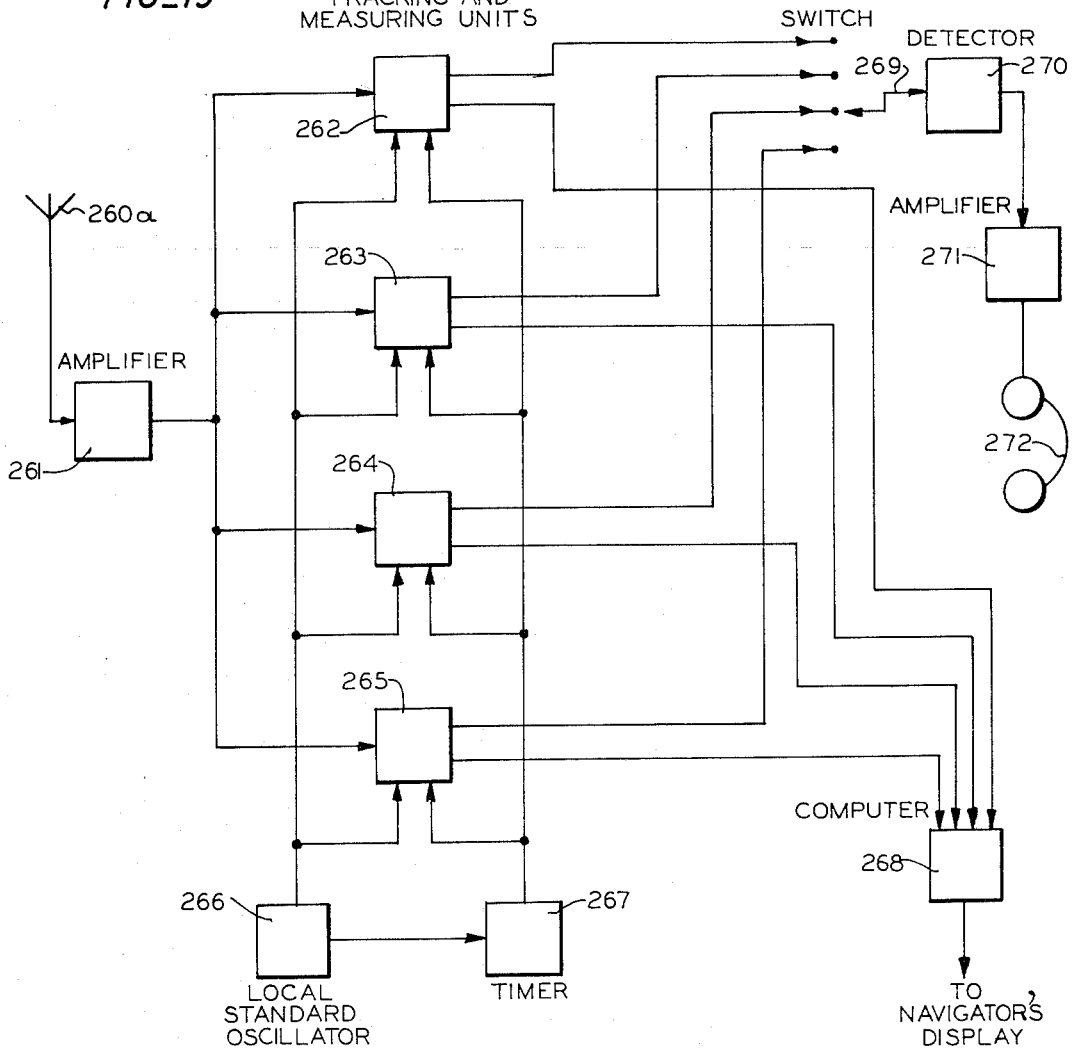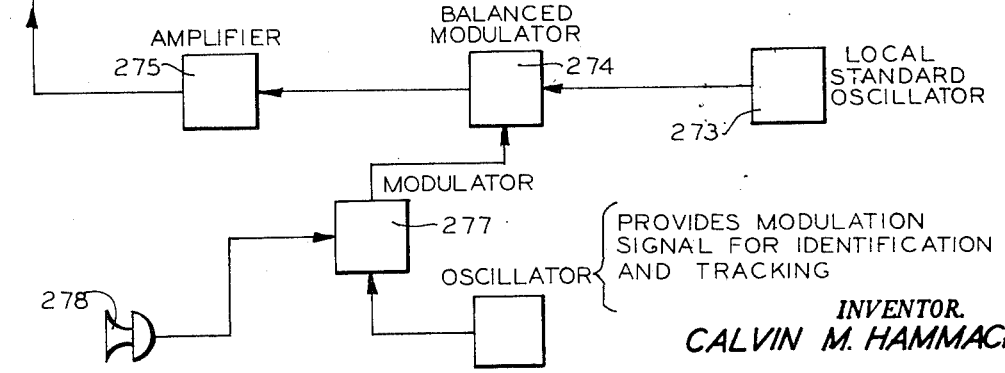

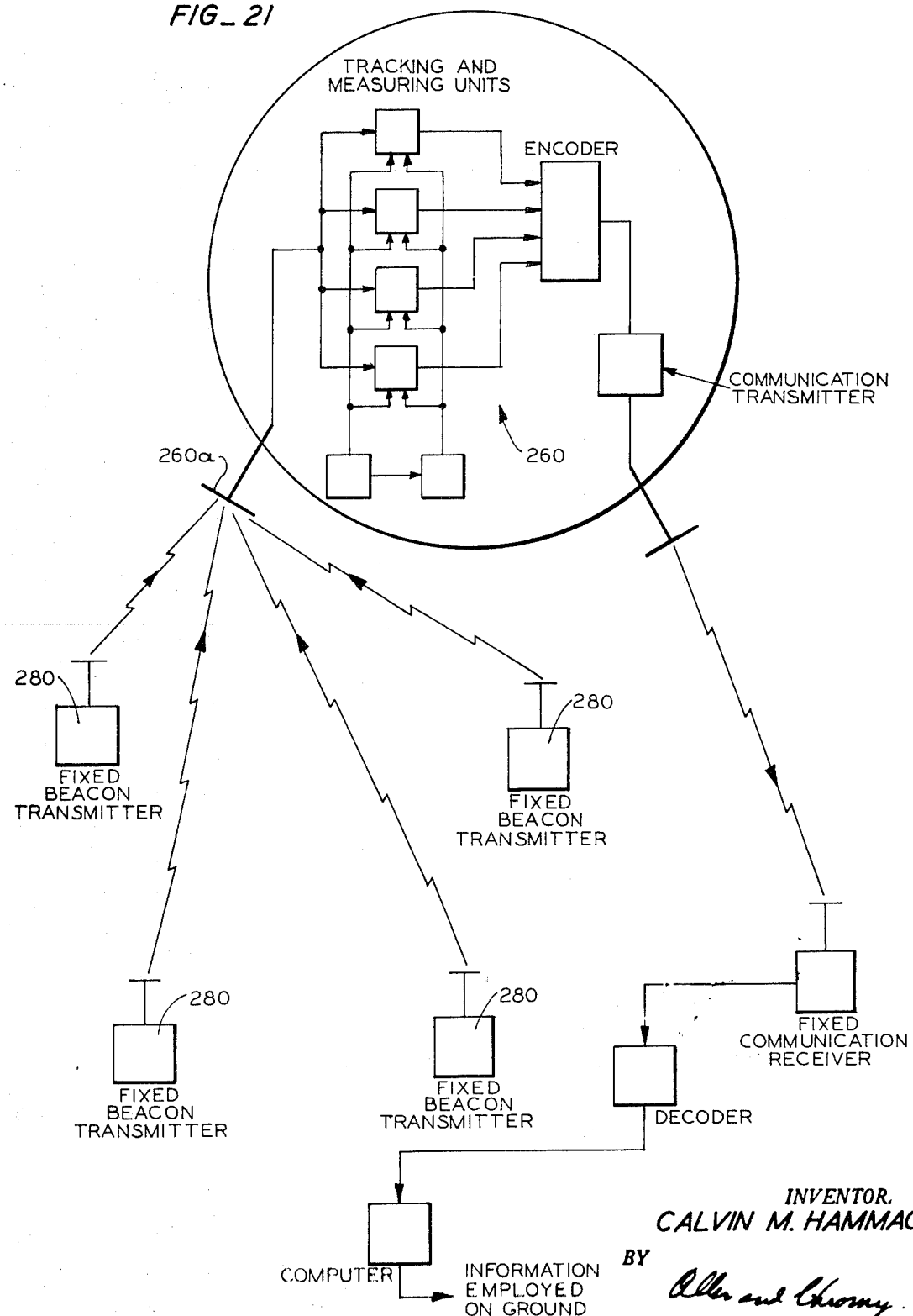

Dec. 12, 1972     C. M. HAMMACK     3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961     27 Sheets-Sheet 14
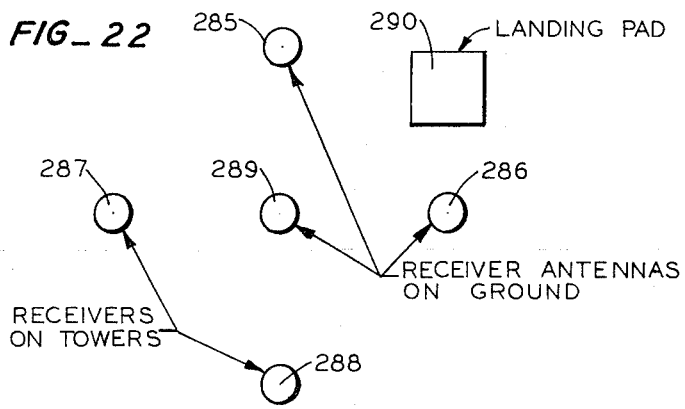
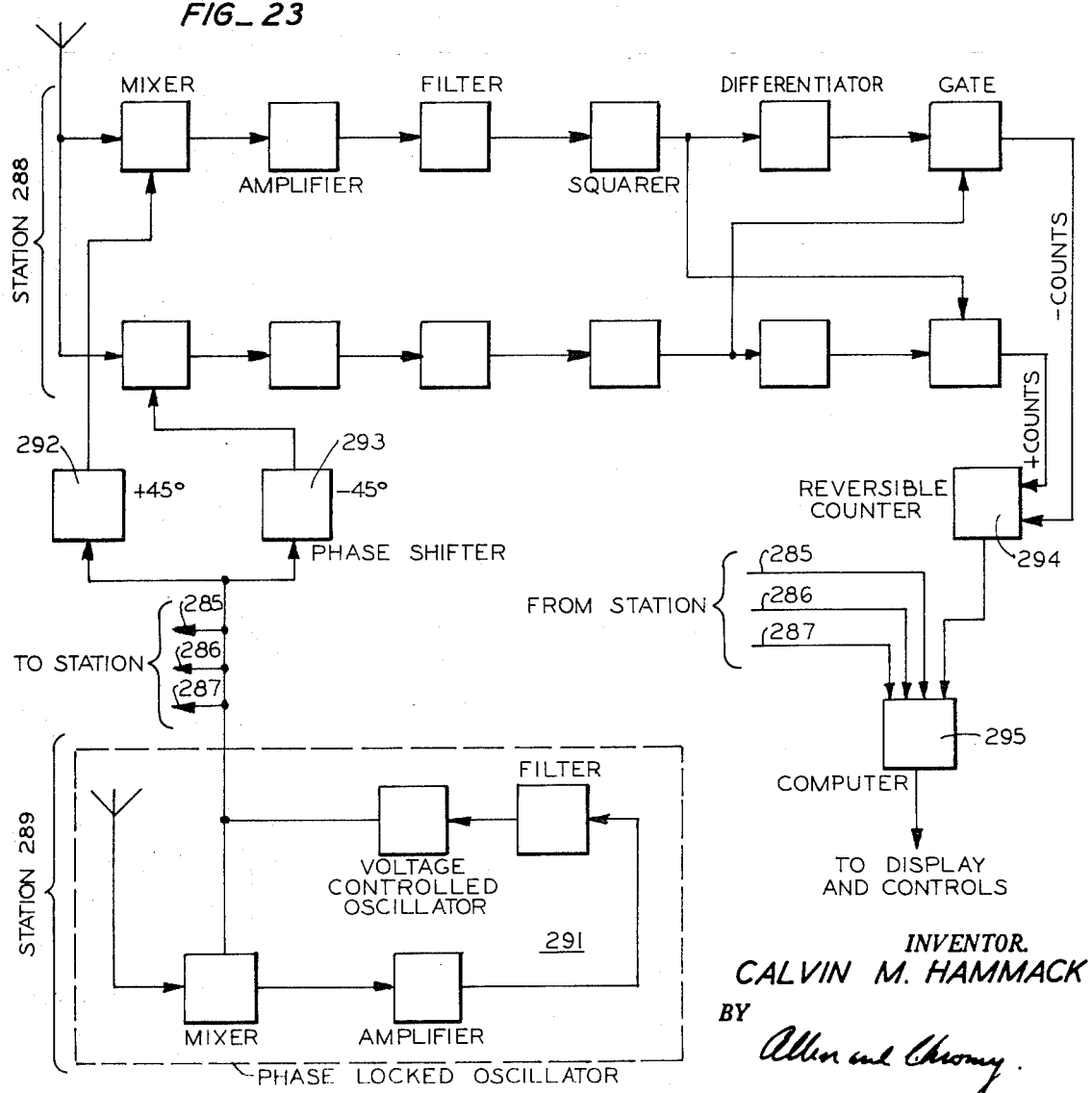
INVENTOR.
CALVIN M. HAMMACK
BY
ATTORNEYS

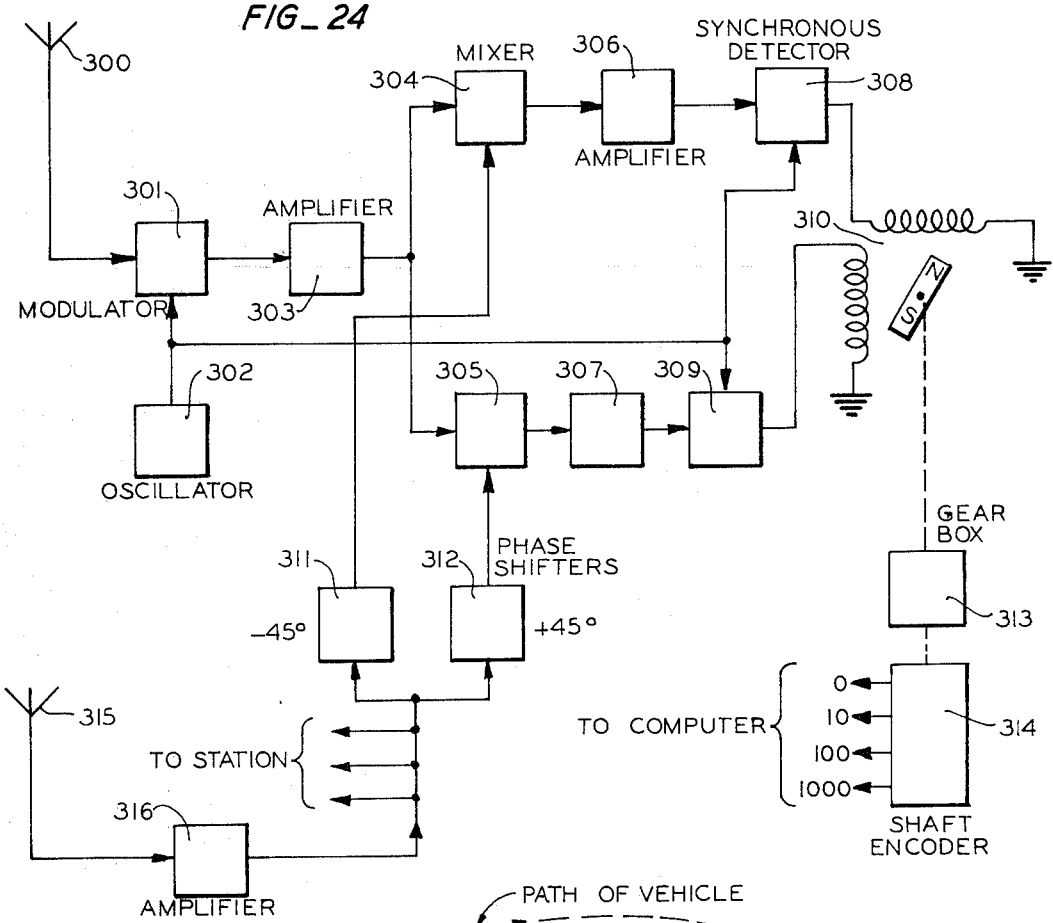
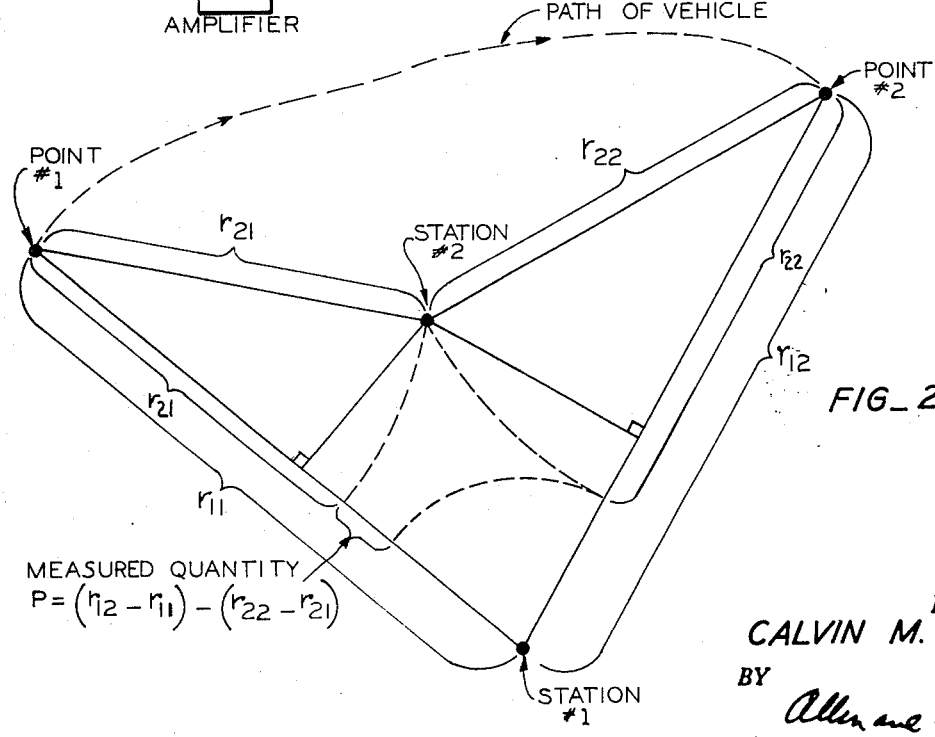

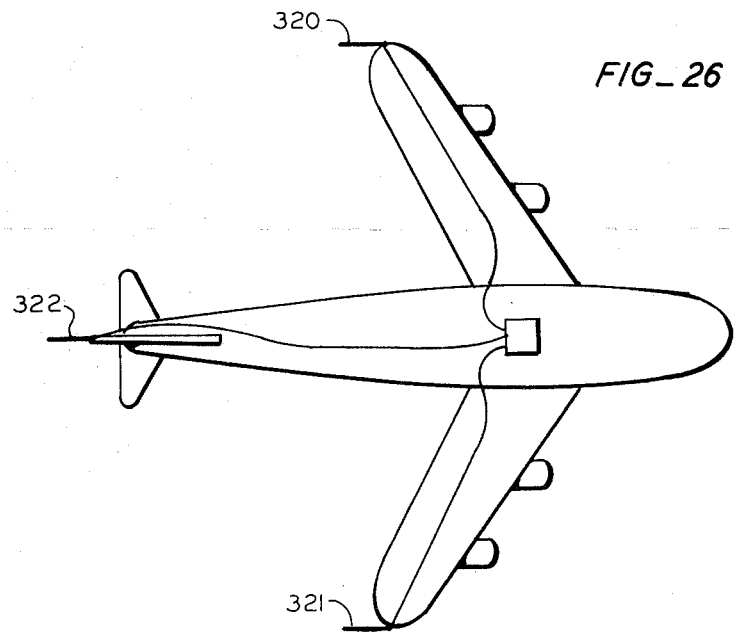
FIG_26
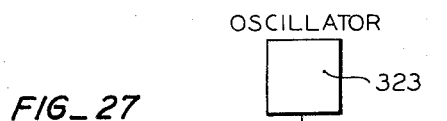
FIG_27
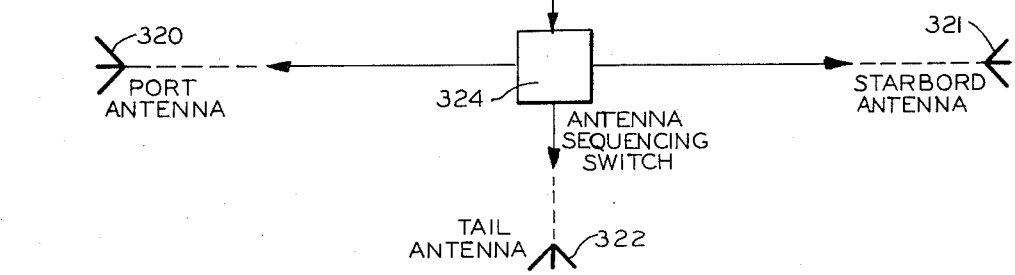
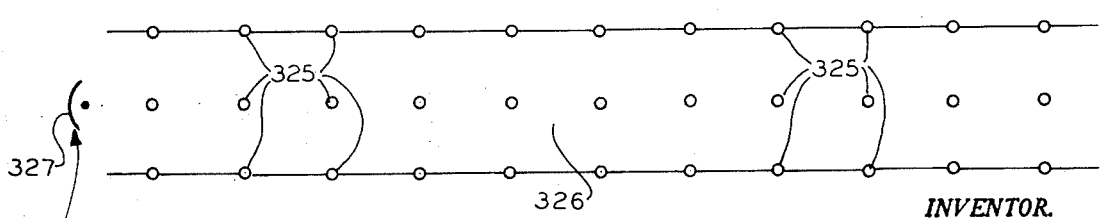
FIG_28

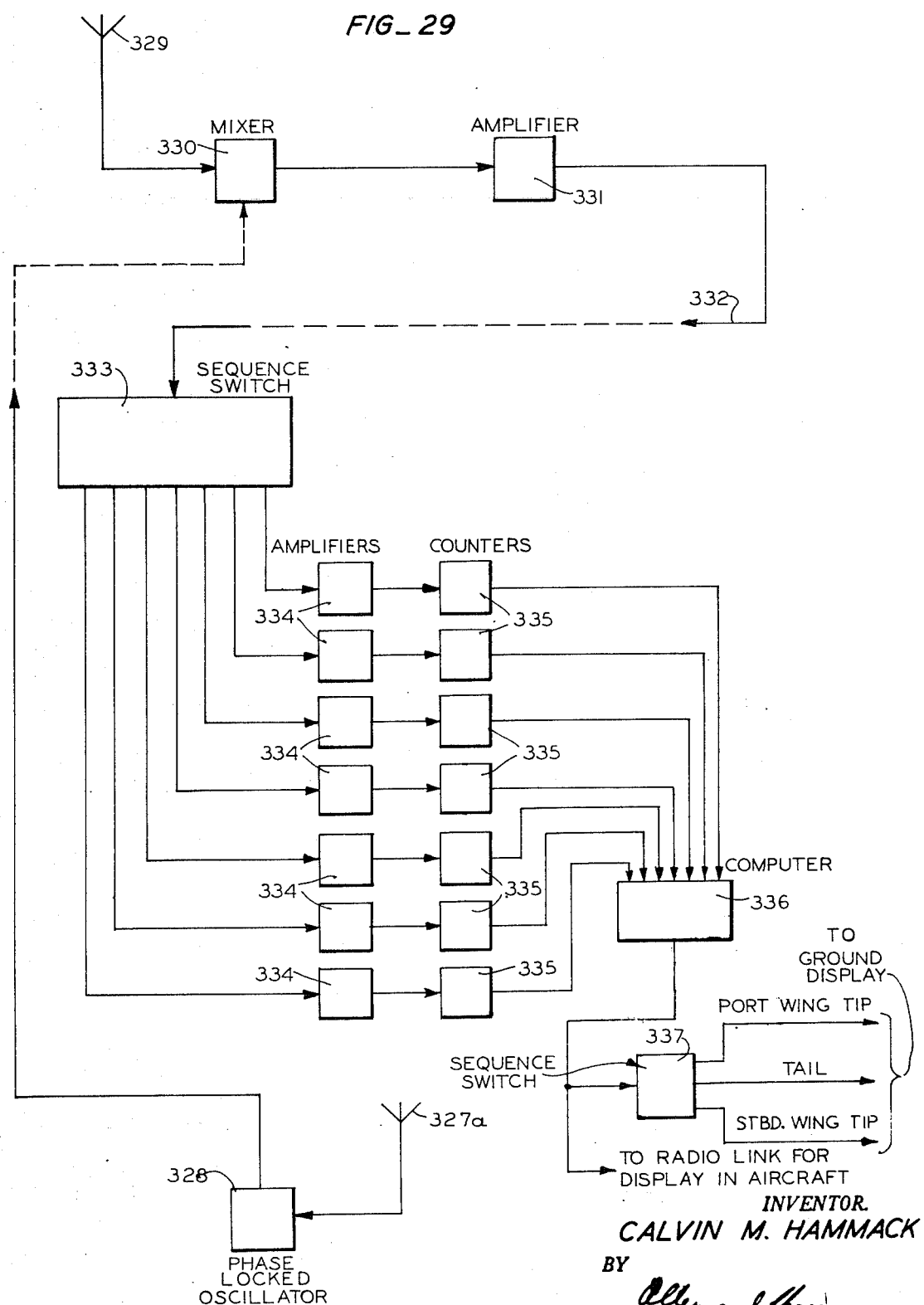

Dec. 12, 1972        C. M. HAMMACK        3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961        27 Sheets-Sheet 18
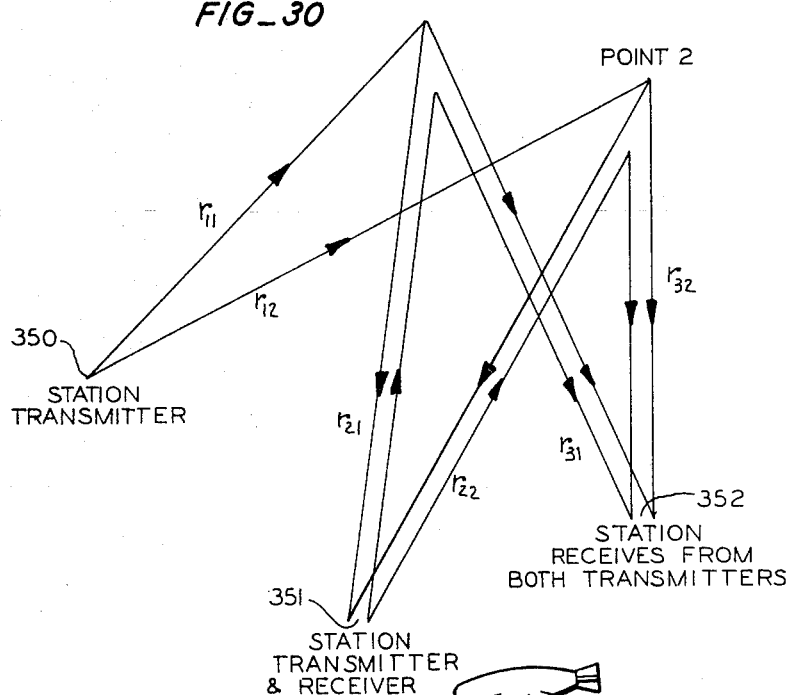
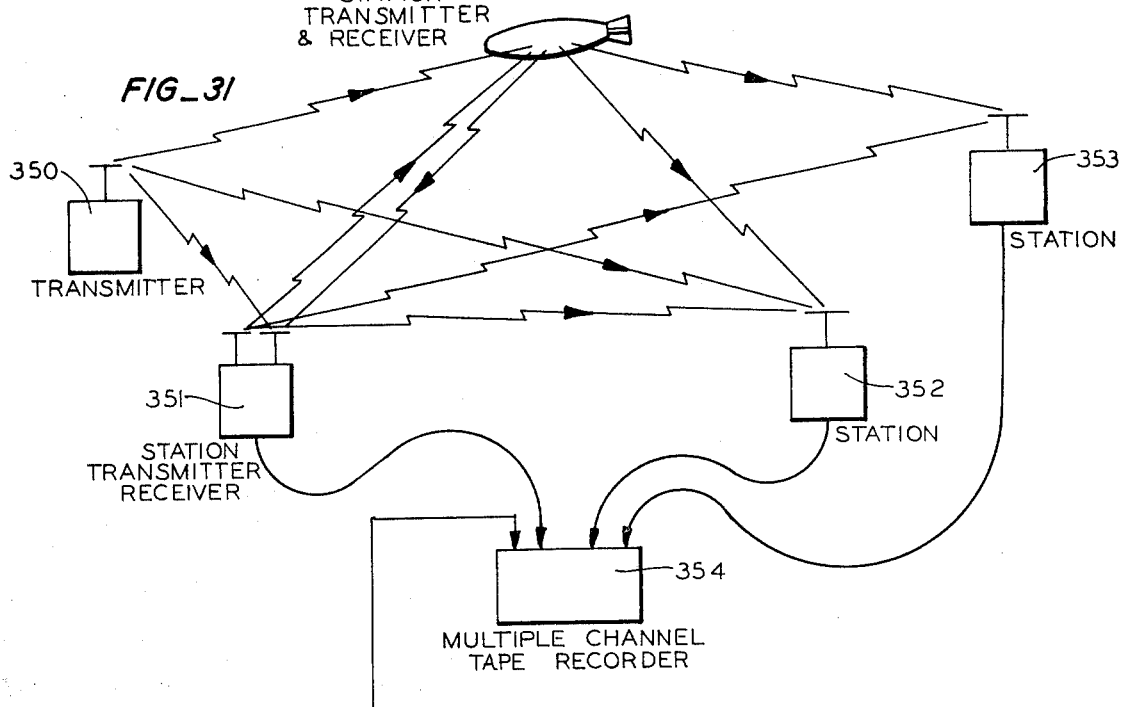
INVENTOR.
CALVIN M. HAMMACK
BY
*Allen and Chromy*
ATTORNEYS

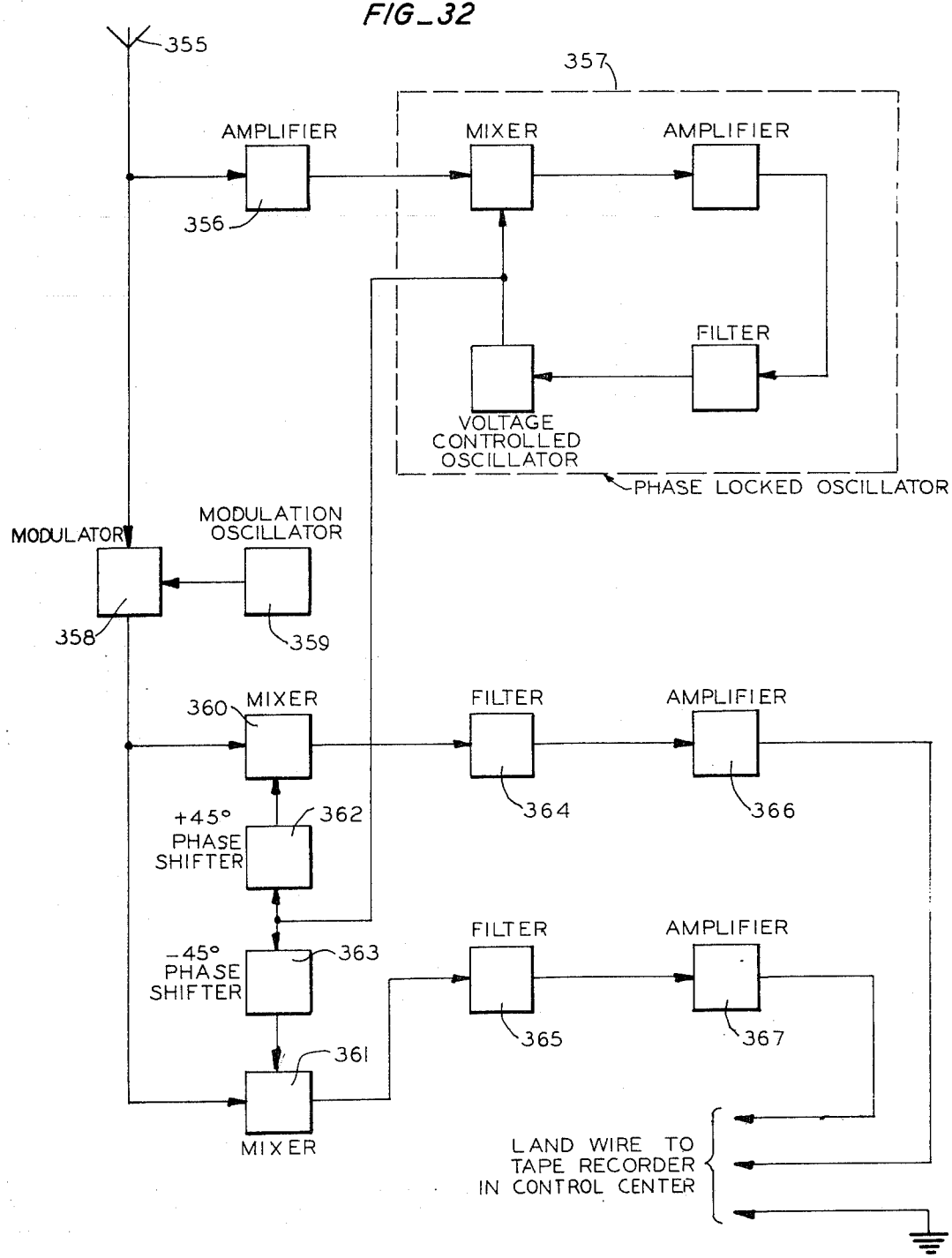

Dec. 12, 1972  C. M. HAMMACK  3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961  27 Sheets-Sheet 20
FIG_33
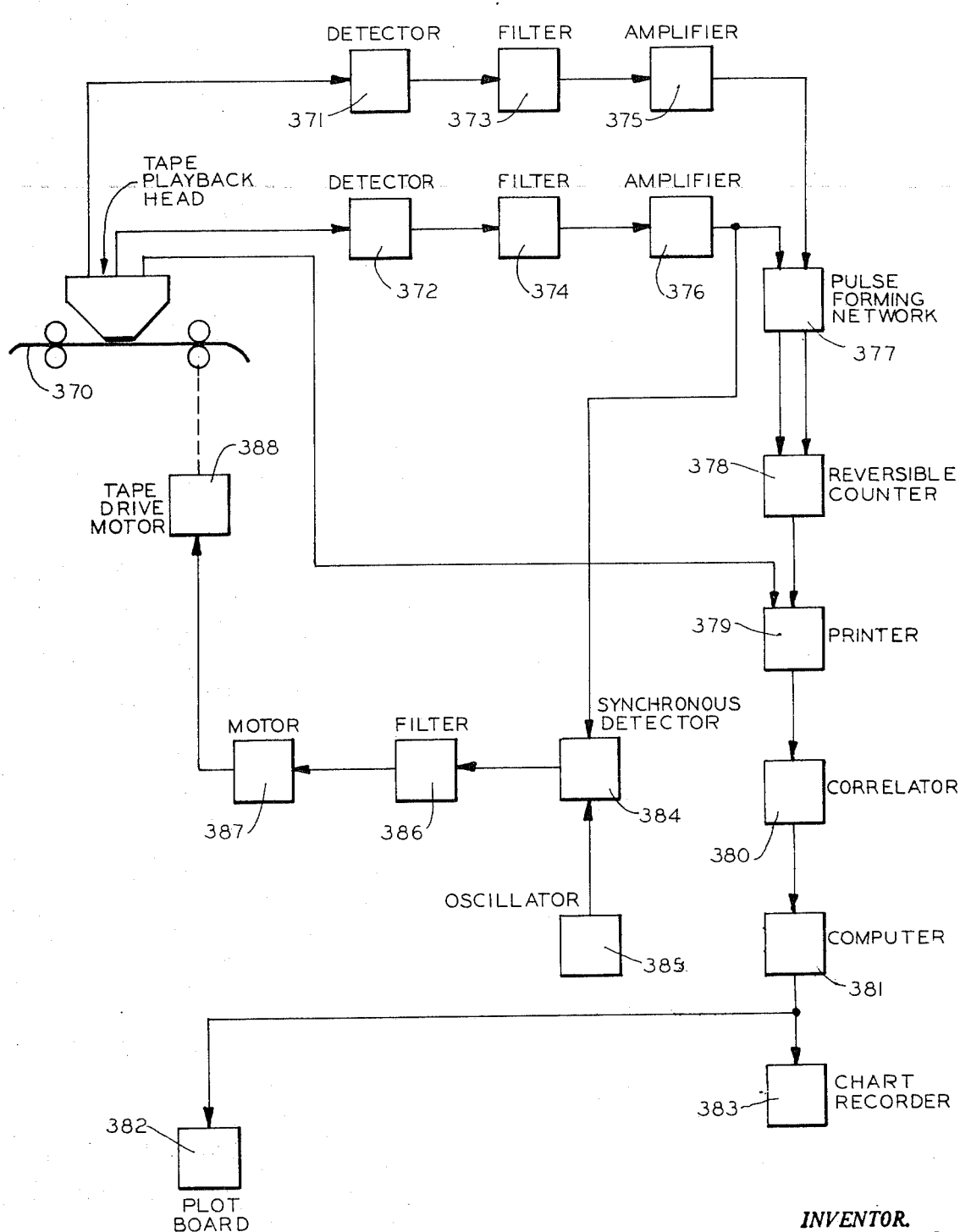
INVENTOR.
CALVIN M. HAMMACK
BY
ATTORNEYS

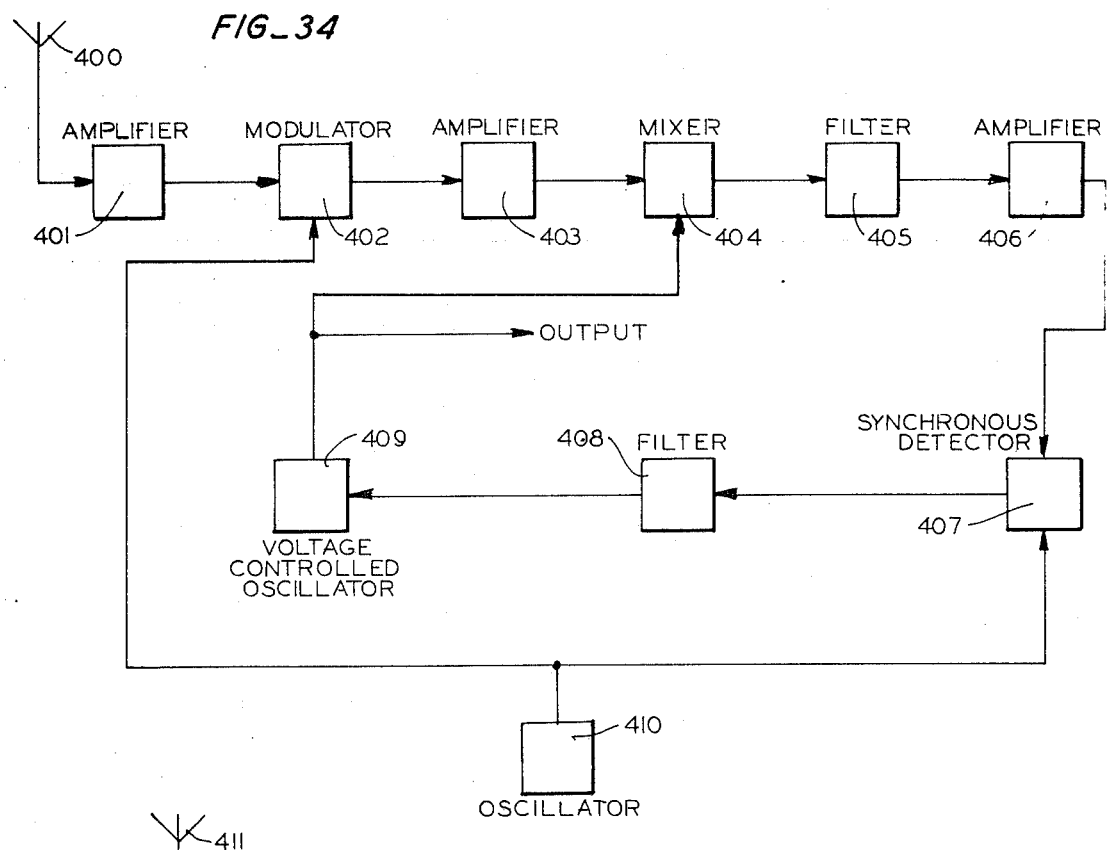
FIG_34
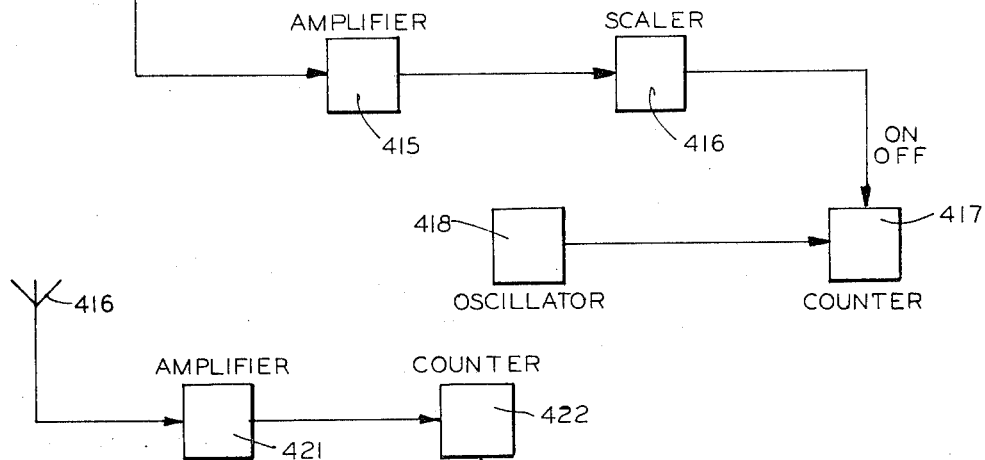
FIG_35
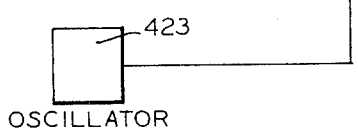
FIG_36
INVENTOR.
CALVIN M. HAMMACK
BY
ATTORNEYS Dec. 12, 1972  C. M. HAMMACK  3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961  27 Sheets-Sheet 22

FIG_37

ERROR EQUATION - 6 STATION -1 READING
RADIAL VELOCITY MEASUREMENT SINGLE LEGGED
GENERAL STATION DISTRIBUTION

INVENTOR.
CALVIN M. HAMMACK
BY
*Allen and Chromy*
ATTORNEYS

Dec. 12, 1972     C. M. HAMMACK     3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961     27 Sheets-Sheet 23

$$\begin{bmatrix} dm_1 & dm_2 & dm_3 & dm_4 & dm_5 & dm_6 \end{bmatrix}$$

$$=$$

$$\begin{bmatrix} dx_1 & dy_1 & dz_1 & dx_2 & dy_2 & dz_2 \end{bmatrix}$$

$$\begin{bmatrix}
\dfrac{x_1-a_1}{r_{11}} & \dfrac{x_1-a_2}{r_{21}} & \dfrac{x_1-a_3}{r_{31}} & \dfrac{x_1-a_4}{r_{41}} & \dfrac{x_1-a_5}{r_{51}} & \dfrac{x_1-a_6}{r_{61}} \\[6pt]
\dfrac{y_1-b_1}{r_{11}} & \dfrac{y_1-b_2}{r_{21}} & \dfrac{y_1-b_3}{r_{31}} & \dfrac{y_1-b_4}{r_{41}} & \dfrac{y_1-b_5}{r_{51}} & \dfrac{y_1-b_6}{r_{61}} \\[6pt]
\dfrac{z_1-c_1}{r_{11}} & \dfrac{z_1-c_2}{r_{21}} & \dfrac{z_1-c_3}{r_{31}} & \dfrac{z_1-c_4}{r_{41}} & \dfrac{z_1-c_5}{r_{51}} & \dfrac{z_1-c_6}{r_{61}} \\[6pt]
\dfrac{x_2-a_1}{r_{12}} & \dfrac{x_2-a_2}{r_{22}} & \dfrac{x_2-a_3}{r_{32}} & \dfrac{x_2-a_4}{r_{42}} & \dfrac{x_2-a_5}{r_{52}} & \dfrac{x_2-a_6}{r_{62}} \\[6pt]
\dfrac{y_2-b_1}{r_{12}} & \dfrac{y_2-b_2}{r_{22}} & \dfrac{y_2-b_3}{r_{32}} & \dfrac{y_2-b_4}{r_{42}} & \dfrac{y_2-b_5}{r_{52}} & \dfrac{y_2-b_6}{r_{62}} \\[6pt]
\dfrac{z_2-c_1}{r_{12}} & \dfrac{z_2-c_2}{r_{22}} & \dfrac{z_2-c_3}{r_{32}} & \dfrac{z_2-c_4}{r_{42}} & \dfrac{z_2-c_5}{r_{52}} & \dfrac{z_2-c_6}{r_{62}}
\end{bmatrix}$$

ERROR EQUATION — 6 STATION — 1 READING
RADIAL DISPLACEMENT MEASUREMENT SINGLE LEGGED
GENERAL STATION DISTRIBUTION

FIG_38

*INVENTOR.*
CALVIN M. HAMMACK
BY
*ATTORNEYS*

$$\begin{pmatrix} dp_2 & dp_3 & dp_4 & dp_5 & dp_6 & dp_7 \end{pmatrix}$$

$$=$$

$$\begin{pmatrix} dx_1 & dy_1 & dz_1 & dx_2 & dy_2 & dz_2 \end{pmatrix}$$

$$\begin{pmatrix}
\frac{x_1-a_1}{r_{11}}+\frac{x_1-a_2}{r_{21}} & \frac{x_1-a_1}{r_{11}}+\frac{x_1-a_3}{r_{31}} & \frac{x_1-a_1}{r_{11}}+\frac{x_1-a_4}{r_{41}} & \frac{x_1-a_1}{r_{11}}+\frac{x_1-a_5}{r_{51}} & \frac{x_1-a_1}{r_{11}}+\frac{x_1-a_6}{r_{61}} & \frac{x_1-a_1}{r_{11}}+\frac{x_1-a_7}{r_{71}} \\
\frac{y_1-b_1}{r_{11}}+\frac{y_1-b_2}{r_{21}} & \frac{y_1-b_1}{r_{11}}+\frac{y_1-b_3}{r_{31}} & \frac{y_1-b_1}{r_{11}}+\frac{y_1-b_4}{r_{41}} & \frac{y_1-b_1}{r_{11}}+\frac{y_1-b_5}{r_{51}} & \frac{y_1-b_1}{r_{11}}+\frac{y_1-b_6}{r_{61}} & \frac{y_1-b_1}{r_{11}}+\frac{y_1-b_7}{r_{71}} \\
\frac{z_1-c_1}{r_{11}}+\frac{z_1-c_2}{r_{21}} & \frac{z_1-c_1}{r_{11}}+\frac{z_1-c_3}{r_{31}} & \frac{z_1-c_1}{r_{11}}+\frac{z_1-c_4}{r_{41}} & \frac{z_1-c_1}{r_{11}}+\frac{z_1-c_5}{r_{51}} & \frac{z_1-c_1}{r_{11}}+\frac{z_1-c_6}{r_{61}} & \frac{z_1-c_1}{r_{11}}+\frac{z_1-c_7}{r_{71}} \\
\frac{x_2-a_1}{r_{12}}+\frac{x_2-a_2}{r_{22}} & \frac{x_2-a_1}{r_{12}}+\frac{x_2-a_3}{r_{32}} & \frac{x_2-a_1}{r_{12}}+\frac{x_2-a_4}{r_{42}} & \frac{x_2-a_1}{r_{12}}+\frac{x_2-a_5}{r_{52}} & \frac{x_2-a_1}{r_{12}}+\frac{x_2-a_6}{r_{62}} & \frac{x_2-a_1}{r_{12}}+\frac{x_2-a_7}{r_{72}} \\
\frac{y_2-b_1}{r_{12}}+\frac{y_2-b_2}{r_{22}} & \frac{y_2-b_1}{r_{12}}+\frac{y_2-b_3}{r_{32}} & \frac{y_2-b_1}{r_{12}}+\frac{y_2-b_4}{r_{42}} & \frac{y_2-b_1}{r_{12}}+\frac{y_2-b_5}{r_{52}} & \frac{y_2-b_1}{r_{12}}+\frac{y_2-b_6}{r_{62}} & \frac{y_2-b_1}{r_{12}}+\frac{y_2-b_7}{r_{72}} \\
\frac{z_2-c_1}{r_{12}}+\frac{z_2-c_2}{r_{22}} & \frac{z_2-c_1}{r_{12}}+\frac{z_2-c_3}{r_{32}} & \frac{z_2-c_1}{r_{12}}+\frac{z_2-c_4}{r_{42}} & \frac{z_2-c_1}{r_{12}}+\frac{z_2-c_5}{r_{52}} & \frac{z_2-c_1}{r_{12}}+\frac{z_2-c_6}{r_{62}} & \frac{z_2-c_1}{r_{12}}+\frac{z_2-c_7}{r_{72}}
\end{pmatrix}$$

ERROR EQUATION – 7 STATION – 1 READING
RADIAL DISPLACEMENT MEASUREMENT DOUBLE LEGGED
GENERAL STATION DISTRIBUTION  6–1 STATION RATIO

FIG_39

Dec. 12, 1972     C. M. HAMMACK     3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961     27 Sheets-Sheet 25

FIG_40

ERROR EQUATION - 4 STATION - 3 READING
RADIAL DISPLACEMENT MEASURE SINGLE LEGGED
GENERAL STATION DISTRIBUTION $$\begin{pmatrix} dm_{11} & dm_{21} & dm_{31} & dm_{12} & dm_{22} & dm_{32} & dm_{13} & dm_{23} & dm_{33} & dm_{14} & dm_{24} & dm_{34} \end{pmatrix}$$

$$=$$

$$\begin{pmatrix} dx_1 & dy_1 & dz_1 & dx_2 & dy_2 & dz_2 & dx_3 & dy_3 & dz_3 & dx_4 & dy_4 & dz_4 \end{pmatrix}$$

$$\begin{pmatrix}
-\frac{x_1-a_1}{r_{11}} & -\frac{y_1-b_1}{r_{11}} & -\frac{z_1-c_1}{r_{11}} & -\frac{x_2-a_1}{r_{12}} & -\frac{y_2-b_1}{r_{12}} & -\frac{z_2-c_1}{r_{12}} & 0 & 0 & 0 & 0 & 0 & 0 \\
-\frac{x_1-a_2}{r_{21}} & -\frac{y_1-b_2}{r_{21}} & -\frac{z_1-c_2}{r_{21}} & -\frac{x_2-a_2}{r_{22}} & -\frac{y_2-b_2}{r_{22}} & -\frac{z_2-c_2}{r_{22}} & 0 & 0 & 0 & 0 & 0 & 0 \\
-\frac{x_1-a_3}{r_{31}} & -\frac{y_1-b_3}{r_{31}} & -\frac{z_1-c_3}{r_{31}} & -\frac{x_2-a_3}{r_{32}} & -\frac{y_2-b_3}{r_{32}} & -\frac{z_2-c_3}{r_{32}} & 0 & 0 & 0 & 0 & 0 & 0 \\
-\frac{x_1-a_4}{r_{41}} & -\frac{y_1-b_4}{r_{41}} & -\frac{z_1-c_4}{r_{41}} & -\frac{x_2-a_4}{r_{42}} & -\frac{y_2-b_4}{r_{42}} & -\frac{z_2-c_4}{r_{42}} & 0 & 0 & 0 & 0 & 0 & 0 \\
-\frac{x_1-a_1}{r_{11}} & -\frac{y_1-b_1}{r_{11}} & -\frac{z_1-c_1}{r_{11}} & 0 & 0 & 0 & -\frac{x_3-a_1}{r_{13}} & -\frac{y_3-b_1}{r_{13}} & -\frac{z_3-c_1}{r_{13}} & 0 & 0 & 0 \\
-\frac{x_1-a_2}{r_{21}} & -\frac{y_1-b_2}{r_{21}} & -\frac{z_1-c_2}{r_{21}} & 0 & 0 & 0 & -\frac{x_3-a_2}{r_{23}} & -\frac{y_3-b_2}{r_{23}} & -\frac{z_3-c_2}{r_{23}} & 0 & 0 & 0 \\
-\frac{x_1-a_3}{r_{31}} & -\frac{y_1-b_3}{r_{31}} & -\frac{z_1-c_3}{r_{31}} & 0 & 0 & 0 & -\frac{x_3-a_3}{r_{33}} & -\frac{y_3-b_3}{r_{33}} & -\frac{z_3-c_3}{r_{33}} & 0 & 0 & 0 \\
-\frac{x_1-a_4}{r_{41}} & -\frac{y_1-b_4}{r_{41}} & -\frac{z_1-c_4}{r_{41}} & 0 & 0 & 0 & -\frac{x_3-a_4}{r_{43}} & -\frac{y_3-b_4}{r_{43}} & -\frac{z_3-c_4}{r_{43}} & 0 & 0 & 0 \\
-\frac{x_1-a_1}{r_{11}} & -\frac{y_1-b_1}{r_{11}} & -\frac{z_1-c_1}{r_{11}} & 0 & 0 & 0 & 0 & 0 & 0 & -\frac{x_4-a_1}{r_{14}} & -\frac{y_4-b_1}{r_{14}} & -\frac{z_4-c_1}{r_{14}} \\
-\frac{x_1-a_2}{r_{21}} & -\frac{y_1-b_2}{r_{21}} & -\frac{z_1-c_2}{r_{21}} & 0 & 0 & 0 & 0 & 0 & 0 & -\frac{x_4-a_2}{r_{24}} & -\frac{y_4-b_2}{r_{24}} & -\frac{z_4-c_2}{r_{24}} \\
-\frac{x_1-a_3}{r_{31}} & -\frac{y_1-b_3}{r_{31}} & -\frac{z_1-c_3}{r_{31}} & 0 & 0 & 0 & 0 & 0 & 0 & -\frac{x_4-a_3}{r_{34}} & -\frac{y_4-b_3}{r_{34}} & -\frac{z_4-c_3}{r_{34}} \\
-\frac{x_1-a_4}{r_{41}} & -\frac{y_1-b_4}{r_{41}} & -\frac{z_1-c_4}{r_{41}} & 0 & 0 & 0 & 0 & 0 & 0 & -\frac{x_4-a_4}{r_{44}} & -\frac{y_4-b_4}{r_{44}} & -\frac{z_4-c_4}{r_{44}}
\end{pmatrix}$$

INVENTOR.
CALVIN M. HAMMACK
BY
ATTORNEYS

Dec. 12, 1972     C. M. HAMMACK     3,706,096
POLYSTATION DOPPLER SYSTEM TRACKING OF VEHICLES, MEASURING
DISPLACEMENT AND RATE THEREOF AND SIMILAR APPLICATIONS
Filed Feb. 2, 1961     27 Sheets-Sheet 26

$$\begin{bmatrix} dm_1 & dm_2 & dm_3 & dm_4 & dm_5 & dm_6 & dm_7 \end{bmatrix}$$

$$=$$

$$\begin{bmatrix} dx_1 & dy_1 & dz_1 & dx_2 & dy_2 & dz_2 & dB \end{bmatrix}$$

$$\begin{bmatrix}
-\frac{x_1-a_1}{r_{11}} & -\frac{x_1-a_2}{r_{21}} & -\frac{x_1-a_3}{r_{31}} & -\frac{x_1-a_4}{r_{41}} & -\frac{x_1-a_5}{r_{51}} & -\frac{x_1-a_6}{r_{61}} & -\frac{x_1-a_7}{r_{71}} \\
-\frac{y_1-b_1}{r_{11}} & -\frac{y_1-b_2}{r_{21}} & -\frac{y_1-b_3}{r_{31}} & -\frac{y_1-b_4}{r_{41}} & -\frac{y_1-b_5}{r_{51}} & -\frac{y_1-b_6}{r_{61}} & -\frac{y_1-b_7}{r_{71}} \\
-\frac{z_1-c_1}{r_{11}} & -\frac{z_1-c_2}{r_{21}} & -\frac{z_1-c_3}{r_{31}} & -\frac{z_1-c_4}{r_{41}} & -\frac{z_1-c_5}{r_{51}} & -\frac{z_1-c_6}{r_{61}} & -\frac{z_1-c_7}{r_{71}} \\
-\frac{x_2-a_1}{r_{12}} & -\frac{x_2-a_2}{r_{22}} & -\frac{x_2-a_3}{r_{32}} & -\frac{x_2-a_4}{r_{42}} & -\frac{x_2-a_5}{r_{52}} & -\frac{x_2-a_6}{r_{62}} & -\frac{x_2-a_7}{r_{72}} \\
-\frac{y_2-b_1}{r_{12}} & -\frac{y_2-b_2}{r_{22}} & -\frac{y_2-b_3}{r_{32}} & -\frac{y_2-b_4}{r_{42}} & -\frac{y_2-b_5}{r_{52}} & -\frac{y_2-b_6}{r_{62}} & -\frac{y_2-b_7}{r_{72}} \\
-\frac{z_2-c_1}{r_{12}} & -\frac{z_2-c_2}{r_{22}} & -\frac{z_2-c_3}{r_{32}} & -\frac{z_2-c_4}{r_{42}} & -\frac{z_2-c_5}{r_{52}} & -\frac{z_2-c_6}{r_{62}} & -\frac{z_2-c_7}{r_{72}} \\
-1 & -1 & -1 & -1 & -1 & -1 & -1
\end{bmatrix}$$

ERROR EQUATION – 7 STATION – 1 READING
RADIAL DISPLACEMENT MEASUREMENT SINGLE LEGGED
GENERAL STATION DISTRIBUTION
VEHICLE STANDARD OSCILLATOR FREQUENCY UNKNOWN

FIG–41

INVENTOR.
CALVIN M. HAMMACK
BY
*Allen and Chromy*
ATTORNEYS

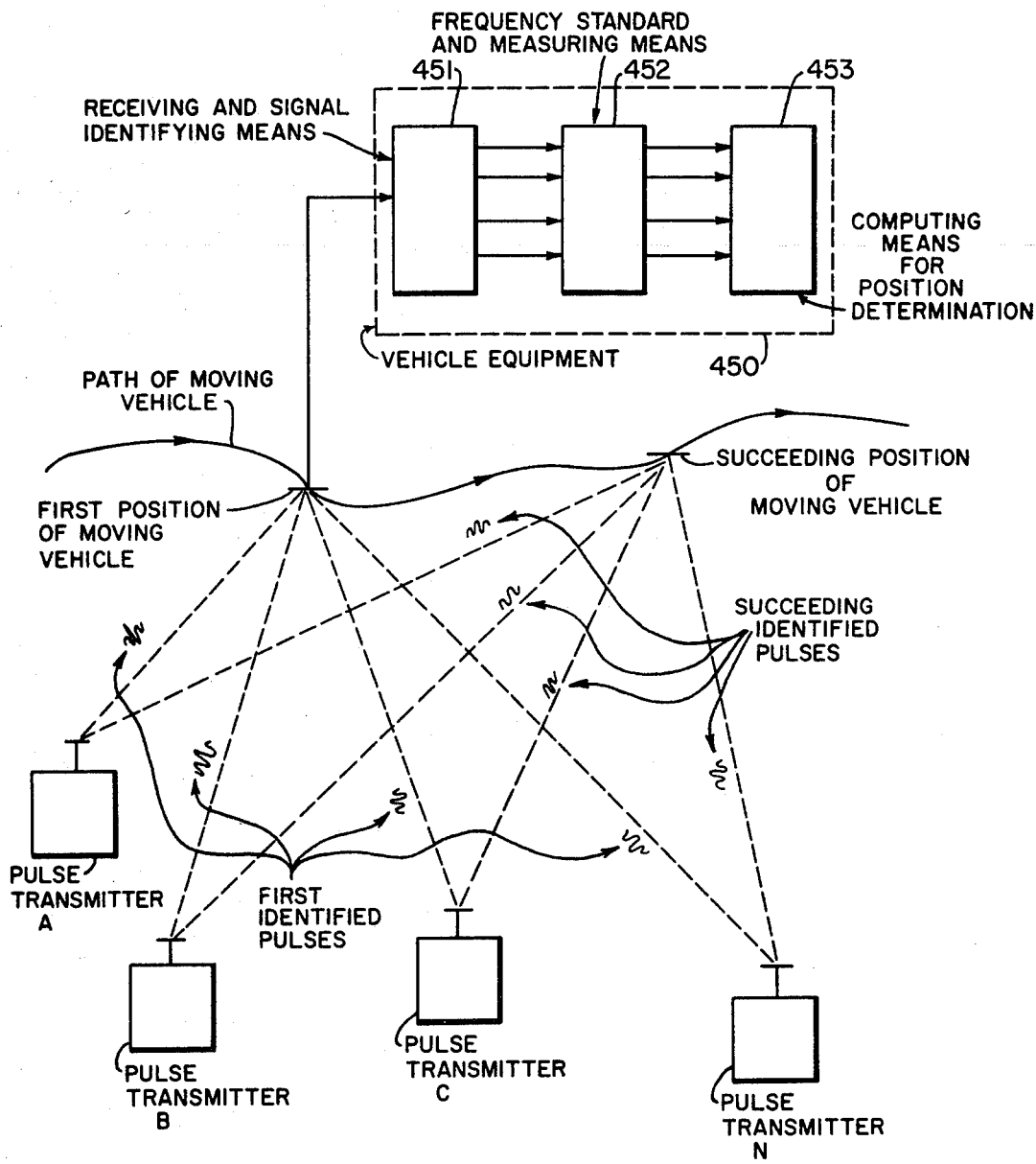
FIG_42

3,706,096
Patented Dec. 12, 1972

3,706,096
POLYSTATION DOPPLER SYSTEM TRACKING OF VEHICLES, MEASURING DISPLACEMENT AND RATE THEREOF AND SIMILAR APPLICATIONS
Calvin Miles Hammack, P.O. Box 304,
Saratoga, Calif. 95070
Filed Feb. 2, 1961, Ser. No. 86,770
Int. Cl. G01s 9/04, 9/44
U.S. Cl. 343—9
7 Claims My invention relates to the art of detecting and tracking moving targets by means of sonic waves, electromagnetic waves, or other waves.

An object of my invention is to provide a method and apparatus for determining the position and velocity of a moving target by measuring simultaneously the component of the target's velocity in the direction of each of several fixed or moving stations whose position or path is known.

Another object of my invention is to provide a method and apparatus for determining the position and velocity of a moving target by measuring the first, second and third or more time derivatives of the range to the target from each of several moving or fixed stations whose position or path is known.

Another object of my invention is to provide a means of navigation by measuring by radiation receiving means simultaneously the component of the velocity of the navigating craft in the direction of each of several fixed or moving transmitting stations whose position or path is known.

Another object of my invention is to provide a means of navigation by measuring by radiation receiving means simultaneously the first, second, and third or more time derivatives of the range from the navigating craft to each of several fixed or moving transmitter stations whose position or path is known.

Another object of my invention is to provide a means of navigation by measuring simultaneously by radiation receiving means either once or several times in continuous succession the displacement of the navigating craft in the direction of each of several fixed or moving transmitting stations whose position or path is known.

Another object of my invention is to provide a system including a plurality of pairs of signal transmitting and receiving stations for determining the position and velocity of a moving target by measuring the sum of the components of the velocity of the target in the directions of both of the stations of each of the several pairs of fixed or moving stations whose positions or paths are known, each of the pairs of stations consisting of a transmitter and a receiver located at separate points thereby eliminating by geographical separation the residual interference of the transmitter with the receiver and rendering the system more sensitive and more immune to countermeasures.

Another object of my invention is to provide a system including several pairs of signaling stations and means for determining the position and velocity of a moving target by measuring the first, second, third and higher time derivatives of the sum of the ranges of the target with reference to both stations of each of several pairs of fixed or moving stations whose positions or paths are known, one station of the pair being a transmitter and the other station of the pair being a receiver tuned to the transmitter, the two stations of the pair being located at separate points thereby eliminating by geographical separation the interference of the transmitter with the receiver and rendering the system more sensitive and also thereby increasing resistance to countermeasures.

Another object of my invention is to provide a method and apparatus for determining the position of a moving target by simultaneously measuring either once or several times in continuous succession the sum of the displacements of the target in the directions of both of the stations of each of several pairs of fixed or moving stations whose positions or paths are known, each pair consisting of a transmitter and a receiver located at separate points thereby eliminating by geographical separation the residual interference of the transmitter with the receiver and rendering the system more sensitive and also thereby increasing the resistance of the system to countermeasures.

It is another object of my invention to provide a method and apparatus for detecting the position and motion of a moving target by means of the radiation and detection of continuous waves with no modulation whatever other than that produced by the doppler effect as a result of the motion of the reflecting target.

It is another object of my invention to provide a means of navigation of a moving craft by means of the radiation of continuous waves from each of several fixed or moving stations whose position or path is known and the measurement of the frequency of this radiation by receiving means aboard the navigating craft.

Another object of my invention is to detect the position and motion of a friendly moving vehicle by placing aboard the vehicle a simple oscillator which emits continuous unmodulated waves and the detection and the measuring of the frequency of the radiation of the oscillator simultaneously by each of several stations geographically separated.

Another object of my invention is to detect the position and motion of a moving object by measuring the interval between two pulses of wave energy reflected by the target, the pulses being emitted by other stations at known intervals.

It is another object of my invention to provide a means of navigation of a moving craft through the measurement of the interval between pulses of wave energy arriving at the navigating craft from each of several fixed or mobile stations whose position or path is known, the intervals between the pulses transmitted also being known.

It is another object of my invention to provide a system for detection and accurate tracking of moving targets, said system making it unnecessary to employ highly accurate pointing or tracking antennas.

Another object of my invention is to provide a means comprising a station complex for tracking of moving objects with high accuracy at extreme range, the several stations of the complex being separated by wide distances for maximum accuracy and the distance across the station complex being approximately the same as the distance from the center of the complex to the target.

Another object of my invention is to provide a method and apparatus for determining the position of a moving target without the necessity of measuring directly any range or angle.

Another object of my invention is to provide a method and apparatus for measuring the position of a moving target independently of the path of the target in time or space.

Another object of my invention is to provide a means of navigating a moving vehicle independently of the path of the vehicle in time or space.

Another object of my invention is to provide a method and apparatus for the determination of the position and course of a moving target without any knowledge of any previous position or velocity of the target.

Another object of my invention is to provide a means of navigating a moving craft without any knowledge of any previous position or velocity of the craft.

Another object of my invention is to provide a method and apparatus for detection, tracking, and navigation using continuous waves in the making of the required measurements so as to allow a maximum of average measurement power to be employed.

Another object of my invention is to conserve the available radiation spectrum for both commercial and military applications by the use of continuous waves for such purposes an air traffic control, detection of satellites, detection of intercontinental ballistic missiles, blind landing of aircraft, and the tracking of friendly missiles on test ranges.

Another object of my invention is to achieve a system for the tracking of moving targets of vastly improved accuracy by removing the requirement for phase coherence between the various stations in the system.

An object of my invention is to provide a means of sorting the various signals resulting from detection of echos from a number of targets in a polystation doppler system.

In any reflecting system wherein non-cooperative targets are illuminated by an external source of radiant energy the reflected signals being detected by receiving means that do not include antennas so directional as to exclude all but one target, there is the possibility that two or more targets may be in the surveillance area of the system at the same time. Such coincidence of targets results in each of the receivers detecting two or more signals but being unable to identify which of the targets corresponds to which echo signal. It is therefor an object of my invention to provide a system of several stations with correlation means to separate the various signals detected at the various stations into proper sets of data each set corresponding to a single target.

It is possible to design a ballistic missile to come apart after leaving the atmosphere on the way toward its target, the separate parts of the missile such as the engine, fuel tanks, airframe, and warhead all being given sufficient velocity away from each other that a number of targets are formed sufficiently separated that they cannot all be destroyed by a single antimissile missile and also they are indistinguishable from each other by ordinary means. It is therefore also an object of my invention to provide a means for exceedingly accurate resolution and tracking of each of the various parts of a fragmenting missile so that the warhead may be identified through its trajectory.

It is further an object of my invention to provide a means for directing the antimissile missile with extreme precision especially at the closing end of its path.

It is a further object of my invention to provide a method and apparatus for determining the position and motion of a moving target by means of independent simultaneous measurements at each of several stations of the apparatus, there being no communication other than the signal from the target required between the stations for the purposes of making any of the fundamental measurements, thereby permitting as wide a separation between the measuring stations as desired.

It is a further object of my invention to provide a common means for both the tracking of moving objects and the navigation of moving craft by means of several transmitting stations whose reflected emissions may be detected by one or more receiving tracking stations and at the same time received for the purposes of its own navigation by a moving craft carrying appropriate receiving equipment, the navigating craft not necessarily being the target being tracked by the tracking receiving station.

In the application of sonar equipment for operation against submarines there is a problem of coupling of large amounts of electrical power into the water medium in the form of pulses. The water tends to caviate around the transducer resulting in distorted and wasteful energy distribution in the transmitted frequency spectrum. It is therefore an object of my invention to employ continuous waves as the means of making the primary measurements in sonar thereby making it possible to attain greater range and accuracy through the use of larger average radiation power for the measurement purposes.

For military purposes it is desired to be able to detect and to determine the position and course of a moving target without resorting to illumination of the target through artificial means nor placing equipment on the target. Such targets often radiate emissions unintentionally or naturally which can be used to track the target. It is therefore an object of my invention to provide a means of locating and tracking moving targets which emit either coherent signals or noise radiation by means of several separate receiving stations, the separate stations being able to identify identical points in the envelope of the signal emitted by the target and to communicate this identification and the intervals between the arrival of two or more such points to a central station where the position of the emitting target and its course may be computed.

In some tracking systems employing measurements similar to those employed in the use of my invention, it is necessary that continuity of measurement be maintained as the vehicle travels from some known point to the present point. It is therefore an object of my invention to provide a means for tracking moving targets which is not dependent upon tracking continuously from some point whose position is known.

There is a military requirement for a tracking system that is able to track a moving vehicle without it being possible to determine by means of detecting radiation falling on the vehicle whether or not the vehicle is actually being tracked. It is therefore an object of my invention to forestall such determination by keeping the vehicle continuously illuminated while it is in the surveillance area thus preventing the vehicle from becoming aware of either the beginning or the termination of observation. It is further an object of my invention in other instances to forestall such awareness of tracking by employing radiation emitting from the vehicle either naturally or for other purposes such as communications.

One of the great problems with the conventional radar equipment is the echo return from targets that are of no interest. Such returns tend to mask the target. By restricting the sensitivity to those targets that move relative to the observation station the amount of background clutter is greatly reduced. Therefore, another object of my invention is to provide a means for the detection of moving targets and the determination of the position and velocity of such targets that is insensitive to the presence of fixed reflectors.

It is another object of my invention to determine the position and motion of a moving target employing multiple station means, each station operating entirely independently and without reference to the other stations in the system in the making of the fundamental measurement and the generation of all measurement data.

It is another object of my invention to measure the position and motion of a moving object by multiple station means in which all of the measurements are performed by equipment located at a single station, the other stations being employed solely to illuminate the target with radiation.

Another object of my invention is to provide a means for resolving the ambiguity which results when a plurality of targets exists simultaneously in the surveillance volume by employing additional or redundant stations, that is, more stations than are required, for the determination of position and course by the particular method and configuration being employed and obtaining resolution by means of postcomputational correlation.

Another object of my invention is to provide a means of resolving the ambiguity resulting from a plurality of paratus for the calculation of the position coordinates additional, or redundant, observations and resolving the ambiguity by providing postcomputational correlation means.

Another object of my invention is to provide an apparatus for the circulation of the position coordinates of a target, whose position is to be determined by polystation doppler means, in which apparatus the calculation is simplified by arranging the stations in certain configurations which permit a simplification of the mathematical expressions relating the various parts of the geometrical relationships of the system, said configurations comprising arranging the stations uniformly spaced along a straight line, confining the stations to a plane, or spacing the stations uniformly around a circle.

Another object of my invention is to provide a method of approximate solution of the non-linear equations relative to the methods employed for calculation of the position of a vehicle by reference to a table of possible values of positions of the moving vehicle arranged opposite the values of the measured data corresponding to that particular position or positions of the target. In general, the number of position dimensions is equal to the number of elements of data measured and there is no one-to-one correspondence between a particular measurement and a particular dimension. However, the set of dimensions for one or more points occupied by the vehicle (the number of points depending on the method used for position determination) does correspond uniquely to the set of readings derived for that set of positions. When velocity of a vehicle is measured, say at a single point, the three cartesian elements of velocity take the place of three of the position dimensions.

Another object of my invention is to provide a method and apparatus for the determination of the position of a vehicle carrying doppler equipment cooperative with a ground system without the necessity of employing a highly accurate frequency standard aboard the vehicle.

Another object of my invention is to provide a means for making radial displacement and radial velocity measurements from a single station which transmits and receives on the same frequency channel by employing a moving responding beacon which generates and transmits sidebands on the signal received from the ground transmitter and does not retransmit the received continuous wave signal.

Another object of my invention is to provide an arrangement for maintaining a local oscillator at a station in close phase coherence with a received signal without the necessity of D.C. amplification.

Other and further objects of this invention will be apparent to those skilled in the art to which it relates from the following specification, claims and drawings.

Referring to the drawings briefly:

FIG. 1 is a schematic diagram showing a single legged reflective system;

FIG. 2 is a schematic drawing of a radial velocity measuring station;

FIG. 3 is a schematic drawing of a radial displacement measuring station;

FIG. 4 is a schematic drawing of a measuring station provided with a reversible counter;

FIG. 4A is a fragmentary drawing showing a cathode ray tube used in the arrangement shown in FIG. 4;

FIG. 4B is a schematic drawing of a pulse forming network adapted to be used in connection with the circuit shown in FIG. 4 and in some of the other circuits;

FIG. 5 is a diagram of the space track station distribution;

FIG. 6 is a schematic drawing of a space track station;

FIG. 7 is a diagram of a submarine detection system;

FIG. 8 is a schematic drawing of a submarine detection station;

FIG. 9 is a diagram of a pulsed light tracking system;

FIG. 10 is a schematic drawing of a pulsed light tracking station;

FIG. 11 is a drawing of an arrangement for getting one legged data to be used in accordance with this invention;

FIG. 12 is a drawing of a four station tracking system;

FIG. 13 is a schematic diagram of a transpondor circuit;

FIG. 14 is a schematic diagram of a tracking station;

FIG. 15 is a diagram of the air traffic control system;

FIG. 16 is a schematic diagram of the circuit used in airborne equipment such as used in the system shown in FIG. 15;

FIG. 17 is a schematic diagram of the circuit used in the air traffic control system;

FIG. 18 is a schematic diagram of the circuit used in the control center equipment of the air traffic control system;

FIG. 19 is a schematic diagram of the circuit of the airborne navigation receiver;

FIG. 20 is a schematic diagram of the circuit used in the ground beacon transmitter of the navigation system;

FIG. 21 is a diagram of the navigation system arranged in accordance with this invention;

FIG. 22 is a diagram of the sation distribution for the vertical landing aid arranged in acocrdance with this invention;

FIG. 23 is a schematic drawing of the circuit used in the ground of the vertical landing aid;

FIG. 24 is a schematic drawing of an alternative circuit used in the vertical landing aid for recording phase change;

FIG. 25 is a diagram used to facilitate explanation of the two station measurement in the vertical landing aid;

FIG. 26 is a diagram showing the antenna arrangement on an aircraft as used in the ground controlled landing sensor system;

FIG. 27 is a schematic diagram of connections used in the aircraft transmitter;

FIG. 28 is a diagram showing the ground station distribution;

FIG. 29 is a schematic diagram of connections of the individual runway station 325;

FIG. 30 is a diagram used to facilitate explanation of an arrangement for obtaining single legged data from double legged data;

FIG. 31 is a diagram showing the arrangement of stations used in the mortar locator system;

FIG. 32 is a schematic diagram of connections used in the remote mortar locator station;

FIG. 33 is a schematic diagram of connections used in the control center of the mortar locator;

FIG. 34 is a schematic diagram of connections of an improved phaselocked oscillator;

FIG. 35 is a schematic diagram of connections adapted to be used in a cycle timing station;

FIG. 36 is a schematic diagram of connections adapted to be used in a cycle counter station;

FIGS. 37–41 inclusive illustrate selected error equations used to facilitate explanation of this invention; and FIG. 42 is a diagram showing a navigating system employing pulses.

MULTIPLE RATE FINDERS

A practical embodiment of my invention, shown in FIG. 1, is a simple system designed to track a single aircraft or space vehicle without relying on equipment placed aboard the vehicle. This system may be placed to practical use for obtaining the position of a missile where it is desired to eliminate entirely, for weight reduction purposes, the need for additional equipment to be carried aboard the tested missile or aircraft. Another application may be in blind landing of aircraft where it is desirable from the point of view of maintenance and reliability for all of the equipment of the system to be a part of the stationary system. This system also may be employed in range and tracking applications where the highest accuracy is desired.

The actual detecting equipment consists of six fixed transmitter and receiver stations designated as stations 1, 2, 3, 4, 5, and 6 in FIG. 1, each of which is capable through radio means of detecting the component of the total velocity of the target in its own particular direction. These six stations may be arranged in a straight line or in various geometric patterns including locating them on the locus of a circle. While it is true that a wide variety of means for making this measurement are available from the current practice, the system shown is chosen for its simplicity and it is not desired to restrict it to the embodiment illustrated.

Each of the stations 1–6 is identical to the others and consists of a transmitter to illuminate the target and a receiver tuned so as to receive signals reflected to it from the target. The receiver of a particular station is tuned to receive signal frequencies that are near but not equal to the frequency of the corresponding transmitter. Each of these stations is adjusted to its own operating signal frequency so as to prevent the reception of the signals transmitted by one station of the group by the receiver of another station of the group. Each station then makes a completely independent measurement of radial velocity with reference to the missile or target simultaneously with the other five stations of the system. The measured radial velocity is then transmitted by each station to a central point where the position and velocity of the vehicle at the time of the measurements is calculated.

In FIG. 2 there is shown a diagram of connections for one of the six stations shown in FIG. 1 and each of the stations 1 to 6, inclusive, is connected as shown in FIG. 2. It is seen that the transmitter and the receiver share some elements of their respective systems namely, the antenna and the local standard oscillator 11, which may be a piezoelectric crystal controlled oscillator or any other type of frequency stabilized oscillator. The use of a common oscillator 11 for both transmitter and receiver effectively eliminates the effects of small frequency drifts which might occur in the oscillator frequency and thereby increases the practical precision with which the fundamental measurement is made. The transmitter and the receiver are coupled to the single antenna 10 by a directional coupler 12 which is well known in the art, so that the receiver is protected from the power of the transmitter. However, separate antennas so arranged as to provide a minimum of coupling between them may be employed for the receiver and for the transmitter if desired. Thus the transmitter output which is the output of the power amplifier 13 may be connected to a separate antenna from the antenna 10 and in such case the directional coupler 12 may be eliminated from the receiver antenna circuit if desired.

A diode mixer 14 is connected to the received signal output of the directional coupler 12. The diode mixer 14 also receives a signal from the frequency translator 18 which is connected to the oscillator 11 and translates the frequency of the signal supplied to the mixer 14 by the oscillator 11 as will be described further under the operation of this circuit. The output of the mixer 14 is fed to the rejection filter 15 which is tuned to reject signals of undesired frequencies such as the signal produced by the mixing of the transmitter signal and the mixing signal. Other signals of constant frequency may also be eliminated by this filter. The output of the filter 15 is amplified by the amplifier 16 and the amplified output is fed to the frequency meter 17.

The operation of each of the stations is as follows: The emitted signal is a monochromatic continuous wave with no modulation whatever imposed upon it. The station is similar in concept to the common doppler equipment employed by police departments to determine the speed of automobiles along the highway. The signal transmitted is changed in frequency upon being reflected by an object having a component of motion in the direction of the station. As a consequence of this change in frequency upon reflection from a moving target the signal so reflected upon returning to the station from which it was transmitted is different from the frequency of the emitted signal. It is precisely this difference in frequency which provides a measure of the velocity of the target in the direction of the station.

This apparatus is provided with a local standard oscillator 11 as described above which may employ a conventional piezoelectric crystal for frequency stabilization and control. The frequency of the oscillator is in the radio frequency spectrum and is the operational frequency of the station. The output of the oscillator is fed into both the transmitting and receiving equipments. Thus the oscillator is connected to supply the radio frequency power amplifier 13 of the transmitter and the output of this amplifier is fed through the directional coupler 12 to the antenna 10. The antenna requires no particular directional characteristic and in operation the transmitted signal and the received signal are transmitted and received respectively on the same antenna. The returning signal enters the receiving equipment through the directional coupler 12 which functions to reduce the level of the transmitter frequency signal to values that can be tolerated by the diode mixer 14, to which the output of the coupler is fed. Also fed into the mixer is a signal derived from the standard oscillator 11 by means of the frequency translator 18. This signal is removed from the transmitter frequency by a value somewhat greater than the maximum shift in the transmitter frequency resulting from the doppler effect and lower than the frequency of the transmitted signal. As will be explained this mixing signal is introduced to provide the station with sense as to whether the target is approaching the station or going away from it. The frequencies of the signals at the output of the mixer 14 are equal to the difference between the frequencies of the signals at the output of the directional coupler and the frequency of the mixer signal. These signals are of relatively low frequency. There is also at the output of the mixer a signal of constant frequency equal to the difference between the mixing signal and the transmitter signal. The presence of this signal is not harmful as it could only interfere with signal echos equal to the transmitter frequency. These signals come from stationary reflectors and are of no interest. To prevent interference with succeeding equipment, however, these signals are attenuated by a band rejection filter 15 which is tuned to reject these frequencies. The output of the band rejection filter is amplified by amplifier 16 and fed into the frequency meter 17. It is necessary to subtract from the reading of the frequency meter a value equal to that of the difference between the frequency of the mixing signal and the frequency of the radiated signal. When the result of this subtraction is positive the target is approaching the station and when the result of the subtraction is negative the target is receding from the station. The value of the result of the subtraction is proportional to the component of the velocity of the target in the direction of the station.

The radial velocity of the target from the station is the component of the target's velocity in the direction of the station and is related to the doppler frequency shift in the following manner:

$$V = \frac{(f_o - f_e)}{(f_o + f_e)} C$$

where:

V is the radial velocity away from the station
$f_o$ is the frequency of the radiated signal
$f_e$ is the frequency of the reflected signal
C is the velocity of light
$\pm |f_o - f_e|$ is the frequency shift owing to the motion of the reflector in the direction of the station.

The upper sign applies if the target is approaching the station. The lower sign applies if the target is receding from the station.

The equation may be rearranged to show the frequency shift as a function of the radial velocity as follows:

$$f_o - f_e = 2\frac{V}{C} f_o \left( \frac{1}{1 - \frac{V}{C}} \right)$$

Since the radiated frequency is controlled by the local standard oscillator of the station it is seen that the measured frequency shift is a very accurate indicator of the radial velocity of the reflecting target. Frequency stability of one part in ten billion is readily obtainable.

The measurement of the velocity in the direction of each of the stations is accomplished without cooperation with the other stations of the system. There is no need for the maintenance of a phase reference or phase coherence between the stations as is required in many other multiple station systems. This freedom from the requirement for the maintenance of phase coherence is of great importance in that the stations may be as widely separated as desired without affecting the accuracy of the fundamental measurement.

The calculation of the position and velocity of the moving reflector rests upon the assumption that the determinations of radial velocity are made simultaneously. In practice it is not possible to attain perfect simultaneity between the observations at the several stations. In practice independent clocks operating at points separated by the earth's diameter are capable of maintaining a timing error of less than one thousandth of a second. For proper operation of my system it is only necessary that the total vector velocity of the target vehicle (the speed) not change appreciably during this interval. Since a maximum G force of thirty might be expected to destroy most structures, the maximum change of velocity in the direction of a single station would be limited to about one foot per second during the span of the observation times of all the stations of the system. In the problem of tracking space vehicles whose velocities are measured in thousands of feet per second, timing between stations by conventional clocks is quite adequate.

To make the required computation it is necessary that the results of the various measurements be transmitted to a common point where the calculation of the position and velocity may be performed manually or by machine means. If it is desired only to calculate the path of the vehicle at some time after its flight the data may be carried by messenger to any central point for computation. If greater speed is required the data may be sent by Teletype. For systems with still faster response the data may be coded and transmitted by land line or radio to a central station where it may be automatically introduced into a high speed computer. For each station may be written the well known equation relating the slant range from the target to the station and the cartesian coordinates of the target. Each of these equations may be differentiated with respect to time to attain a new and independent equation for each differentiation. Thus twelve equations are available whose simultaneous solution yields twelve unknowns. The equations are:

$$r_i^2 = (x=a_i)^2 + (y-b_i)^2 + (z-c_i)^2$$

$$r_i \dot{r}_i = (x-a_i)\dot{x} + (y-b_i)\dot{y} + (z-c_i)\dot{z}$$

$a_i$, $b_i$, $c_i$ are the cartesian coordinates of the $i$th station and are known and constant.

The twelve unknowns are $r_1$, $r_2$, $r_3$, $r_4$, $r_5$ and $r_6$, the six slant ranges the three cartesian coordinates of the target $x$, $y$, $z$, and the time derivatives of these coordinates $\dot{x}$, $\dot{y}$, $\dot{z}$. The time derivatives of the slant ranges are measured and therefore known, $\dot{r}_1$, $\dot{r}_2$, $\dot{r}_3$, $\dot{r}_4$, $\dot{r}_5$, $\dot{r}_6$. There are thus twelve independent equations that are solved simultaneously to determine not only the position of the vehicle but also its velocity.

MULTIPLE DISPLACEMENT FINDERS

In another embodiment of my invention the measurement performed at each station is that of displacement of the target in the direction of the station. A finite increment of distance radial to the measuring station is measured rather than the time rate of change of the radial distance to the target as described in some other embodiments of this invention. This displacement, positive or negative, occurs in a finite length of time rather than in an infinitesimal length of time as described for measurement of radial velocity. This measurement then is not a rate or velocity measurement but a measurement of range difference or change of range of the target from a single station.

The configuration of the system is identical to that shown in the previous embodiment illustrated in FIG. 1.

The station equipment is somewhat different from the first embodiment. It would be quite possible to employ the equipment previously described by adding to it a device for the integration of the radial velocity over the finite measuring interval. However, the equipment arrangement shown in FIG. 3 is cited as more conventional and more practical because of currently available equipment. It will be observed that this radial displacement measuring station includes parts that are identical to those used in the radial velocity measuring station shown in FIG. 2 with the exception that the frequency meter 17 has been replaced by a cycle counter 20 and a timer 21. The timer 21 determines the interval over which the cycle counter 20 counts the cycles of the signal by turning the counter on at the beginning of the predetermined interval and turning the counter off at the end of the interval. The timer 21 then determines not only the duration of the count but the time of its initiation also. The duration of the count is an important item in the determination of the range change and in the accuracy of the system. In tthis system the timer 21 employs the standard oscillator 11 as the timing standard. The timer 21 is simply a combination of flip-flops or multivibrators and mixing circuits that increase the period of the timing signal to the desired interval. Since there is no other timing or frequency standard employed in the timer the counting or measuring interval which it determines is inversely proportional to the frequency of the frequency standard 11. Therefore, should there be a small error in the frequency of the standard, the corresponding error in the measurement of the displacement will be only in direct proportion to the error in frequency. The ratio of the error in frequency averaged over the counting interval to the value of the frequency will be directly proportional to the ratio of the error in displacement to value of the displacement. With current frequency standards this error will be less than errors caused by other factors such as knowledge of the velocity of light in the medium, or errors caused by only counting integral cycles.

The cycle counter is normally equipped with display lights and printer or teletype encoder for transferring the data to the computer as shown in FIG. 1.

For each station of the system may be written the well known equation relating the slant range from the target to the station and the cartesian coordinates of the target $$(x_1-a_i)^2 + (y_1-b_i)^2 + (z_1-c_i)^2 = r_{i,1}^2$$

$$(x_2-a_i)^2 + (y_2-b_i)^2 + (z_2-c_i)^2 = r_{i,2}^2$$

where: $i=1, 2, 3, 4, 5, 6$, $x_1$, $y_1$, $z_1$ are the cartesian coordinates of the location of the target at the time the measurement is initiated.

$x_2$, $y_2$, $z_2$ are the cartesian coordinates of the location of the target at the time the measurement is terminated.

$a_i$, $b_i$, $c_i$ are the cartesian coordinates of the $i$th station.

$r_{i,1}$ is the slant range from the $i$th station to the target at the initiation of the measurement.

$r_{i,2}$ is the slant range from the $i$th station to the target at the termination of the measurement. There is also the simultaneous equations resulting from the measurements as follows:

$$r_{i,2} - r_{i,1} = m_i$$

$m_i$ is the range increment measured at the $i$th station. There is one set of each of these three equations for each station resulting in a total of eighteen equations. There are eighteen unknowns, the three cartesian coordinates of the initial point, the three cartesian coordinates of the final point, the six ranges from the stations to the initial point, and the six ranges from the stations to the final point. The simultaneous solutions of these equations provides the values of the unknowns.

MULTIPLE DISPLACEMENT FINDERS WITH REVERSIBLE COUNTERS

In this embodiment of my invention the measurement performed at each station is that of radial displacement toward or away from the measuring station. A finite increment of distance radial to station is measured rather than the time rate of change of the radial distance to the target as described in some other embodiments. This displacement, positive or negative, occurs in a finite length of time rather than in an infinitesimal length of time as described for measurement of radial velocity.

The configuration of the system is identical to that shown in FIG. 1.

The station equipment differs from the previous embodiments in several aspects and a schematic diagram of connections is shown in FIG. 4. This system is capable of a high degree of accuracy for any given accuracy of the frequency standards employed.

The local standard oscillator 11, determines the frequency of the radiated wave as is also the case in the apparatus shown in FIGS. 2 and 3. The output of the local standard oscillator is amplified by the transmitter power amplifier 13, and is fed through the directional coupler 12 to the antenna 10 from which it is radiated into space. The signal is then reflected, with its frequency changed, by the moving target, reentering the antenna 10 and entering the receiver mixers 23 and 24 through the directional coupler 12. Since in this embodiment the mixing frequency is the same as the transmitted frequency it is necessary to employ two channels in the receiver in order to provide the system with a sense of direction. There is little problem with the residual transmitter signal entering the mixers from the directional coupler because the mixing signal applied to the mixers and derived from the local standard oscillator 11 may be made much greater than the residual signal thereby reducing the effect of the residual signal on the phase of the effective mixing signal to negligible values. The effect of this residual signal is limited to the very slight phase shift and there is no extra fixed frequency which must be filtered out of the receiver circuits as in the case of the previous embodiments.

The signal returning from the target and shifted in frequency by the doppler effect is fed into the diode mixers 23 and 24 along with two mixing signals of the radiation frequency which are ninety degrees out of phase with each other. These mixing signals are derived from the local standard oscillator 11 through phase shifting circuits 25 and 26. One of these phase shifting circuits advances the phase of the mixing signal forty-five degrees and the other phase shifting circuit retards the mixing signal by forty-five degrees. The output signals from the mixers are then of frequency equal to the difference between the frequency of the transmitted signal and the frequency of the received signal entering the antenna from the target. The frequency of the signals coming out of the two mixers is the same; however they are ninety degrees out of phase with each other. If the target is approaching the station the frequency from the antenna is higher than the transmitted frequency which is also the mixing frequency and the output of one of the mixers will be ahead of the other. Which mixer leads is dependent on the polarity of the various connections and is easily changed by reversing connections of the mixing signals. When the target is receding from the station the relative phase of the outputs of the mixers is reversed and the one that was leading before is now lagging. The relative phase of the signals coming from the two mixers is then an indication as to whether the target is approaching the station or receding from it.

The outputs of the mixers 23 and 24 are amplified by low-pass amplifiers 27 and 28, which contain limiters so as to provide output signals of nearly constant amplitude. The outputs of the amplifiers 27 and 28 are fed into gates 29 and 30, respectively which are controlled from the timer 21 which is connected to the timing oscillator 22 to provide the timing signal. These gates under control of the timer 21 control the duration of the cycle count. The output of the gates 29 and 30 is a two-phase signal on three wires including the ground 31. The direction of rotation of this two phase signal indicates whether the target is approaching or receding from the station. Each revolution of the signal is indicative of a change in the distance to the target of one-half wavelength of the transmitted wave. The change in range is then measured by noting the amount of rotation of this two-phase signal from the amplifiers. This operation may be performed electronically by supplying these signals to the magnetic deflection coils 35 and 36 of a cathode ray tube 38 as shown in FIG. 4A, so the beam of the cathode ray tube is rotated either clockwise or counter clockwise. However a very satisfactory electromechanical device similar in all respects to a two-phase synchronous motor employing two windings 33 and 34 in space quadrature may be used and the signal from one amplifier 27 is applied to one winding 33 and the signal from the other amplifier 28 is applied to the other winding 34. The rotor 32 of the motor consists of a small permanent magnet and the rotation of this magnet indicates the sense and the magnitude displacement of the target from the station.

Since both the radiated signal and the mixing frequency are from the same source with perfect phase coherence, the error produced in the incremental range measurement through an error in the local standard oscillator 11 is proportional to the error in the oscillator frequency. This situation is in sharp contrast to systems where the dependence is placed in the stability existing between two separate oscillators. Other systems so dependent are described in this application.

If the interval of the count is sufficiently reduced, the reading may be converted to a measurement of the rate of change of range by dividing by the time of the measurement.

Where the output supplied to the two phase motor shown in FIG. 4 is of a rather high frequency, such as may be impractical for use to energize this motor, a circuit such as shown in FIG. 4B may be used for converting the outputs of the amplifiers 27 and 28 into command signals to be fed into a reversible electronic counter of conventional construction. This circuit includes two branches, the upper branch is connected to the amplifier 27 and comprises apparatus 40 for converting the output of the amplifier into a square wave which is fed to the differentiating circuit 41. The pulses derived from the differentiating circuit are fed to the diode circuit 42 which cuts off the negative pulses and the positive pulses are fed through the AND gate 43 to the electronic counter. The lower branch is connected to the amplifier 28 and includes a square wave circuit 44, a differentiating circuit, 45, a negative cut off circuit 46 and an AND gate 47. One input of the gate 43 is connected to the output of the square wave circuit 44 and likewise one input of the gate 47 is connected to the output of the square wave circuit 40.

SPACE TRACK SYSTEM

A practical embodiment of my invention is a system to detect the presence of a strange or hostile space vehicle and to determine its course and position by electromagnetic means. It is a current military problem to determine the position and course of powered vehicles or vehicles that are under the influence of other than ballistic forces, such as, air friction. The paths of such vehicles are not predictable as in the case of true ballistic vehicles or true satellites. With current technology it is possible to place a vehicle into orbit, leave it in orbit for a period of time, and then adjust the path of the vehicle to a new orbit or cause the vehicle to return to earth possibly to explode over a specified area. In the case of the intercontinental ballistic missile a similar problem of unpredictable behavior exists especially as a result of unknown aerodynamic qualities. It is therefore essential that the equipment employed to track such vehicles for the purposes of defense against them be able to provide continuous data regardless of the path of the vehicle. Furthermore, it is essential that tracking of the missile be of a high order of accuracy so that small variations from the expected path can be quickly determined and any threat countered at the earliest possible moment. Accuracy is also required for the direction of antimissile missiles at the hostile vehicle. As the number of vehicles in orbit is expected to be exceedingly great, it is essential that the tracking and surveillance system be capable of tracking simultaneously a very large number of targets while simultaneously maintaining a close watch over the rest of the space to be sure that no other target appears. Sudden appearance of a target in the middle of the surveillance area is possible either because of effective radar screening or high looping trajectories which could bring the hostile vehicle in from out of range. It is another part of this military problem to achieve a system of maximum sensitivity. A maximum of power is employed in the transmitter along with the most sensitive receiving equipment to achieve maximum range. This requirement for sensitivity makes mandatory the geographical separation of a receiver from the transmitter whose signal it receives, if one is to employ a system operating with continuous waves rather than pulses. The use of continuous waves is highly indicated for this problem as it is possible to obtain higher average transmitting power with continuous waves than with pulses. A multiple station system is indicated in this problem to avoid the necessity of having to direct beams of tremendous power. As the system must be capable of close surveillance of all space traffic in its assigned region simultaneously, the equipment must be capable of handling a large number of targets at once.

The polystation doppler type system is ideally suited to this particular set of requirements. Any type system employed for this purpose will necessarily be complex. However, the inherent simplicity in the use of continuous waves eliminates high power modulators, broad beamed fixed transmitting antennas and fixed receiver antennas are great assets of my invention for this particular purpose. To provide an optimum meeting of requirements the total system is preferably composed of a number of subsystems. These subsystems share some of their components with other subsystems. For instance a transmitter may operate with several groups of receivers, each group forming a subsystem. The large amount of traffic to be tracked and the wide variety of the targets recommends this use of several subsystems. Small targets at extreme altitude present the requirements for high sensitivity in the system. For these targets high antenna gain is required. For lower targets and targets of large reflecting cross-section systems employing broader beamed antennas are in order particularly for very low targets.

This system covers a circular area on the ground about 1500 miles in diameter and is designed to operate to altitudes of 2000 miles or more. Greater or lesser design altitudes are possible by varying the parameters of the system components and the values presented are merely typical.

The system contains four transmitters 50 which are of extremely high power and each of which is provided with a relatively broad beamed antenna. Three of the transmitters are located around the perimeter of the circle and the fourth is located at the center of a large area having a diameter of a thousand miles or more as illustrated in FIG. 5.

The transmitters required to reach ranges extending up to 3000 miles are quite large having an R.F. output, for example of one hundred million watts from each and each is provided with an antenna having a gain of ten decibels. It must be remembered that the sensitivity of a two way system such as a radar diminishes with the fourth power of the range. In the case of the system presented here the power requirement of the transmitter could be reduced to one megawatt by simply reducing the range requirement to one thousand miles. Tubes of this amount of power are currently available on the market. The power for each transmitter may be produced at sixty cycles by a single turbogenerator set such as available on the market. The transmitter stations may of course be located as favorably as possible to known sources of fuel or hydro power. Also the transmitter would preferably consist of a single vacuum structure employing a crossed field amplifier known in the trade as the Amplitron and the horn type antenna provided to the transmitter may be mounted directly on the vacuum structure in a fixed position.

The four transmitters 50 emit continuous unmodulated waves, each station operating on a different frequency. The transmitters operate collectively and separately with various groups of receivers 51 and 52 to form a variety of subsystems for the detection of targets of various characteristics and locations.

As these several subsystems which will make up the large space tracking system are described as separate embodiments elsewhere in this application the description of each individual system and the mathematical analysis associated with the system will not be included in this part. The means for resolving ambiguity likewise will not be included here but will be taken up separately hereinafter.

In each of the subsystems of the composite system one of the full seven station configurations is employed in order to insure maximum accuracy and reliability. In the event that there is a failure in one of the stations it will still be possible to carry on tracking with configurations requiring a reduced number of stations but more readings. Iterative techniques are preferably employed for the final and most accurate solution in any given case.

The receiving systems comprising groupings of the receiving stations 51 and 52 are grouped according to whether the particular subsystem is intended to work at high altitudes, medium altitudes or low altitudes. Each of the receivers 51 and 52 is connected as illustrated schematically in FIG. 6. The main differences in the design of the stations 51 and 52 of the individual groups is in the gain of the antennas employed. While directional antennas are not required as a means of determining the coordinates of the target, they may be used to provide a practical means of increasing the sensitivity of the system and thereby extend its range. Since it is desired to make full use of the continuous illumination of the sky provided by the four transmitters, the high altitude stations each employ several receivers each with its own high gain antennas. The antenna of each receiver is fixed in position and keeps a given segment of the sky under surveillance continuously. The single antenna and receiving equipment is capable of receiving the signals of all four transmitters 50 and is provided with signal selecting circuits tuned to receive the separate signal frequencies employed by these transmitters. The later stages of each of the receivers also are provided with tracking filters to separate the signals from the various targets and transmitters as will be described hereinafter.

The high altitude system employs three receiving stations 52 located around the perimeter of the circle of the transmitters uniformly spaced between the transmitters 50 as shown in FIG. 5. Exact spacing, however, is not critical although it is important that the coordinates of the various stations be known as exactly as the art will allow. Each of the receiving stations 52 consists of about two hundred separate receiver and antenna combinations of the type illustrated in FIG. 6 adapted to operate on a frequency of 300 megacycles, for example.

The antenna of each receiver is a simple hyperboloid 53 as shown in FIG. 6, which may be molded of concrete or the like since it is never necessary to change the pointing direction thereof. Each antenna has a gain of about 30 db and a beam width of three degrees to the eighty percent power point. The total of two hundred such receivers permits continuous monitoring of the space above the circle of the composite system out to three thousand miles when employed with proper transmitters. Pointing accuracy of the antenna of one-tenth degree is readily obtainable in the art and quite adequate for the system operation.

The signal receiving antenna is provided with a fixed parabolic reflector 53 and the pickup element 55 of the receiver is mounted at the focus to minimize power loss. A mixing signal is also supplied to the pickup 55 from the translator 54 which translates the frequency of the standard oscillator 53. The signal output from the receiver is transmitted at an I.F. frequency to the main control apparatus 56 of the station which determines whether or not the signal has sufficient intensity. This control apparatus may be in the form of the multiple filter or delay line sampling filter made by the Federal Scientific Company. When the signal is determined to have sufficient intensity above the noise so that it may be tracked it is assigned by the switchboard 57, such as used in automatic telephone exchanges, to one of many tracking filters 58 which are maintained on standby. These tracking filters are currently marketed by several firms for example, the Interstate Electronics Co., and possess characteristics quite satisfactory for the purpose at hand. The output of the tracking filter is fed to the counter 59 which is provided for each tracking filter. The counter 59 is controlled by a timer 62 which may be a flip flop or multivibrator oscillator that times the counting interval of the counter 59. The output of the counter is then fed to the encoder 60 where it is encoded for transmission by land wire or radio to the central computer station 61.

The mode of measurement chosen for this space tracking system is that of range difference rather than rate of change of range. This selection is made to increase the accuracy of the system. In general the longer the count the more accurate the data derived from the reading.

Each station of the system also is provided with a local standard oscillator 63 as previously described, which may be a piezoelectric crystal stabilized oscillator or other oscillator of similar accuracy and stability. The oscillator of this system must be more accurate and stable than the oscillators of the type of system previously described in this application where each station contained a transmitter and receiver working together so that a single oscillator served both. In the case of the system presently being described any error in the difference of the frequencies of the oscillators of a transmitter and receiver is directly added to the value of the doppler reading. Thus an error between the frequencies of the two oscillators is an error frequency. This error frequency multiplied by the time interval of the count produces an error in the cycle count which when multiplied by the wavelength of the transmitted wave results in the error of the range increment measurement. It is seen then that this particular error is greater for slow moving targets than it is for fast moving targets. If a target were to move instantaneously from the initial point of a measurement interval to the final point of the measurement interval this type of error would be essentially reduced to zero. There would of course remain the error associated with assuming a wrong wavelength in calculating the displacement associated with a given cycle count. The error in frequency existing during a given cycle count multiplied by the duration of the count is the error in the measurement of the range increment.

It will be remembered that as the target altitude becomes lower there are two reasons for the requirement for a change in system configuration. The first and most obvious is the curvature of the Earth which prevents line of sight transmission. The second is the decrease in accuracy as a result of a flattening of the geometry resulting from the approach to the approximate plane of the stations. If the station configuration (FIG. 5) was as deep in the third dimension as it is across in the other two dimensions this situation would not exist. However for practical systems on the Earth this situation is bound to occur.

This change in configuration is accomplished through the use of different receiver configurations using other sets of stations. One might employ additional sets of transmitters retaining the same receivers. The additional transmitters however require additional radio frequency spectrum for the system as a whole thereby requiring each of the receivers to have a wider bandwidth. Furthermore no increase in traffic handling capability would result. With additional receiving systems employing the same transmitters the total traffic tracked can be markedly increased.

As the target altitude is decreased the gain or sensitivity of the tracking system may be decreased considerably. According to the inverse fourth power law reducing the altitude by a factor of three makes possible the use of antennas of about one hundredth the gain used in the high altitude system. The beam width of the antenna of reduced gain is about thirty degrees. It is obvious that far fewer receivers are required at each station for complete coverage of the space at a thousand miles above the station complex.

The thousand mile altitude still permits line of sight coverage of the surveillance space from all of the receiving sights employed by the high altitude system. These secondary receivers of broader beam serve to fill in holes at the thousand mile level left by the higher gain beams. Also it is possible with the broader beams to follow a target over a wider angle without having to shift from one beam to the other. Beam shifting of the receiver antennas is required when targets are tracked over wide angles. For greater accuracy it is necessary to avoid losing the count as tracking is shifted from receiver to receiver in a given station. This shifting is accomplished through conventional diversity means.

The low sensitivity receiving stations 51 are distributed throughout the pattern of the other stations as shown in FIG. 5. The receivers provided with high gain antennas may also be provided with low gain antennas if desired. Seven station coverage is thus maintained down to very low levels. The low gain stations having fewer receiving equipments may be entirely automatic. Furthermore it may be desirable to place auxiliary computing stations in the neighborhoods of these subsystems.

SEVEN STATION MATHEMATICS

The mathematics of the seven station system is essentially the same regardless of the combination of station types employed. In this analysis no transmitter is located at the site of any receiver. Any combinations of transmitting stations may be employed for location of the target as long as there is at least one transmitter and at least one receiver and the total number of stations is at least seven. This condition applies when there is to be only a single reading. When more than one reading is taken it is possible to reduce the number of stations as described elsewhere in this application. Each receiver can read on all transmitters simultaneously under normal conditions. In this analysis only a single simultaneous reading is taken by whatever number of stations is employed, a single station making its measurements on all the transmitters at one time. The number of readings refer to the number of consecutive observations employed and refer to the time intervals rather than the stations.

In this single reading case, the total number of equations required is twenty as there are twenty unknowns, the three cartesian coordinates of the initial position of the target, the three cartesian coordinates of the final position of the target, the seven ranges from the stations to the initial point of the measurement, and the seven ranges to the position of the target at the termination of the measurement. There are fourteen equations of the type $$r_{i1}^2 = (x_1-a_i)^2 + (y_1-b_i)^2 + (z_1-c_i)^2$$
$$r_{i2} = (x_2-a_i)^2 + (y_2-b_i)^2 + (z_2-c_i)^2$$

two for each of the seven stations as described for the six station system described earlier. There are also six independent equations of the type $$r_{i2} - r_{i1} + r_{j2} - r_{j1} = p_{ij}$$

where:
- $i$ is any number from 1 to 7 not including $j$
- $j$ is any number from 1 to 7 not including $i$
- $b_{ij}$ is the change in the sum of the ranges from the $i$th and $j$th stations to the target.
- $r_{i2}$ is the range from the $i$th station to the position of the target at the termination of the reading.
- $r_{j2}$ is the range from the $j$th station to the position of the target at the termination of the reading.
- $r_{j1}$ is the range from the $j$th station to the position of the target at the initiation of the reading.
- $r_{i1}$ is the range from the $i$th station to the position of the target at the initiation of the measurement.

Examination of this later group of equations will show that for the cases where there is either a single transmitter or a single receiver there will only be six such equations. However, when there are either two transmitters or two receivers there are additional redundant equations. In the five-two case there are ten equations of which one may choose only six that will be independent. In the three-four case there will be twelve equations yet only six will be independent. The choice of which of the available equations to employ is determined operationally by the relative quality of the individual readings. Of course the signal from at least one transmitter has to be observed from each receiver. However there is great flexibility both in the particular combination of receivers and transmitters employed and upon the observations selected from those available. This high order of redundancy permits performing the calculation using various combinations of data to employ in statistical evaluation of the data and selection of most probable solutions. The redundancy is also available for the resolution of ambiguity resulting from multiple targets as described elsewhere in this application.

AMBIGUITY

When low gain antennas are used for tracking, it is possible for the signals from two or more targets to enter the receiver at the same time, causing an ambiguity problem. This problem is usually present in any system in which operation is dependent on the cooperation of two or more non-scanning stations. In the Polystation Doppler System, there are several methods for resolving such ambiguity.

One method, involving redundancy, is quite useful with low altitude targets and broad beam antennas, but is not necessarily limited to such targets or antennas. In this method of target resolution, at least two receiving and at least two transmitting sites are used. When a vehicle is moving in the overlapping beams of two or more continuous wave transmitters the currents induced in the skin of the vehicle by the incident radiation have a frequency spectrum that is a function not only of the frequencies of the transmitters, but also of the velocity vector of the vehicle. Since it is these currents that are responsible for the radiation of the reflected energy from the vehicle, their frequencies determine the frequency of the radiated signals in the reference frame of the vehicle. The various frequencies, one for each transmitter, which constitute the spectrum radiated from the vehicle retain their relative positions in the spectrum to a very close approximation, regardless of the direction of the radiation. The spectrum of frequencies of reflected signals is shifted as a function of the angle between the direction of the reflected energy and the velocity vector of the reflecting vehicle. Thus, any fixed receiver of the reflected energy determines the various frequencies to be in approximately the same relative position in the spectrum as a receiver at any other location. If the spectrum is normalized to account for the shift of the entire spectrum the frequencies retain their exact positions in the spectrum. However, this correction is not required in practice as it is exceedingly small. Two vehicles moving in the same transmitter fields, but at different positions and at different velocities, could produce sets of frequencies that are identical. However, this happen stance is unlikely; and when the number of transmitters is seven, it is impossible. The probability of such a condition existing for a system of as few as two transmitters for any substantial period of time is quite remote. The total spectrum of any single receiving station at any instant will reveal a number of spectra from various targets, generally all interleaved and indistinguishable. At another receiving station the same signals will appear and again the individual spectrums representing individual targets will be indistinguishable. However, the individual spectra from the individual targets will be, in the general case, displaced in the total frequency spectrum by different amounts from their relative positions in the total spectrum of the first receiving station. This unequal displacement of the individual spectra permits identification of the spectra by means of cross correlation between the signal spectrums of two or more receiving stations. Of course, the more transmitting and receiving stations, the stronger the correlation.

Even stronger correlations are obtained when rates of change of the relative positions of the frequencies within a given individual spectrum are compared. This operation may be performed in an infinitesimal interval, in which case the necessary derivatives of the frequency shifts must be determined. Alternatively the changes occurring in the spectrum as the target moves between two or more points may be correlated. In this case the signals must be continuously tracked between the points so as to preserve the identification of the particular signal.

The same principles apply to measurements of displacement. In this case one correlates the displacement readings rather than frequencies. The displacement measurements at a given station resultant from the simultaneous existance of a number of targets may be grouped in the same manner as frequencies are grouped in spectra. These spectra may be cross correlated as described before. Multiple readings are useful in strengthening the correlation.

An interesting aspect of this method of ambiguity resolution is that additional system capability is always required over that necessary for the simple determination of the position of a single target. This additional capability is that of being able to receive at each receiving station the signals from more of the transmitters than would otherwise be required. In practical operation this requirement is usually met by additional tracking filters and counters to the existing receiving equipment. Ambiguity may also be resolved by the use of narrow beams at either the receivers of the transmitters, or both. The appearance of the signal in the overlapping narrow beams from two or more receivers would provide strong indication as to the identity of the signal and the target. This method is particularly effective when employed in combination with post-computational methods of resolution.

Another method of ambiguity involves keeping a continuous record of each target as it appears so that a new target is immediately identified with the appearance of new signals in the system and the signals then are identified with each other and with the target. Here again, continuous tracking must be maintained on all signals. This method of ambiguity resolution is called "precomputational correlation" since it is not necessary to go through the process of computing position in order to perform the correlation. Other methods of ambiguity resolution involve performing the computing operation on a number of data combinations and correlating the results of the computations. This process is called post-computational correlation.

Another aid in the resolution of ambiguity is in the identification of proper groups of data. Not all possible groups of data when used in the normal computation processes result in realistic target coordinates. There are many possible groupings of data for which there are no possible solutions. There is no one-to-one correspondence between the measured data, and the derived data even though there is a one-to-one correspondence in the other direction.

Another method of employing redundancy to resolve ambiguity resulting from more than one target is the use of additional stations in a given subsystem. In a seven station system employing either one transmitting station and six receivers, or one receiving station and six transmitters, there is not enough information provided for the determination of the ambiguity. All six available equations are required for the determination of position and there are no others to provide redundant data. If an additional station is added so as to make a seven-one configuration, there is redundant data and one additional equation is available. If now there were two targets in the field simultaneously whose echos allow of more than one solution, each of the solutions would be applied to the data derived from another combination of stations omitting one of the stations used previously and employing the station that was not used in the previous solution. From a single six-one configuration working on two targets one can assemble a vast number of possible solutions. Some of these solutions would no doubt be ruled out by one or more of the foregoing tests. In the eight-one configuration there would be many more possible solutions. Correlation means are then employed to select from this large number of solutions the solution that indicates the same two positions for the targets a predetermined number of times no greater than six, after each of the six possible combinations has been employed to obtain all possible solutions.

In the event that for a particular solution one has available either two transmitters or two receivers so as to be able to employ a five-two configuration, one may be able to employ pre-solution ambiguity resolution in addition to post-solution ambiguity resolution by the use of an additional station. The number of possible combinations of stations available for resolution by correlations means quickly becomes exceedingly large and beyond the scope of this application to include them all.

Submarine tracking

Another practical embodiment of my invention is a system to detect the presence of a strange or hostile submarine moving in the oceans depths and to determine the position and path of such a submarine by means of sonic waves. In this embodiment of my invention continuous waves are employed for the same reasons as they are employed in the space tracking system. It is possible with continuous waves to radiate a greater average power more efficiently than it is with pulsed or other modulated waves because the probabilities of cavitation in the medium at the lower peak power levels. Since a narrower spectrum is employed there is less difficulty in accounting for frequency dependent aberrations in the straight line paths of the radiation. The low velocity of propagation make practical the use of very short wavelengths permitting excellent accuracy. Resonant transducers may be employed which provide a much more efficient and convenient means of coupling to the medium than otherwise available.

The problem of maintaining frequency stability between the stations in this application is essentially non-existent.

The system configuration of the submarine system is much the same as that of the space track system and comprises four receiving stations 71 each equipped with a transducer 70 for converting acoustic energy into electrical signals as shown in FIG. 7. The system also includes three transmitting stations 73 each equipped with a transducer 74 for transmitting acoustic signals. All of these stations are connected to the computer and data reduction apparatus 72. The receiving stations themselves are relatively simple in that they consist simply of electro acoustical transducers which may be piezoelectric transducers and which are connected to suitable amplification equipment. The transmitting stations also are relatively simple and include an oscillation amplifier 73 for generating electrical oscillations of the desired frequency which are supplied to the sound emitting transducer 74. The output of the receiving transducer 70 is amplified and fed directly into a cable connecting with a central station 72 where all data reduction and computation is performed. The transducers 70 and 74 may be affixed to the ocean bottom or anchored at certain depths. In this regard the acoustical system has some advantage not possessed by the space tracking system in that it is possible to employ a three dimensional configuration of stations since the stations are much more easily suspended in the ocean.

The range increment type of measurement is employed because of its greater accuracy. As in the other systems described in this application there is no need to maintain phase coherence between the stations. This item could be of some importance to other multiple detector systems which attempt to obtain angle data by measuring the difference of phase of waves arriving at two separated transducers. The required phase coherence would be difficult to maintain over exceedingly long submarine cables.

Another advantage of my system for underwater sound applications is in the avoidance of the difficulty of building a highly accurate directional transducer. Even if such a device could be successfully built the reflections from objects near the transducer can render it highly inaccurate. In a similar manner the phase of the signal reaching one of a pair of stations employed as a phased directional device may be badly distorted in the region around the transducer thereby rendering the advantages of a long baseline quite useless. In the present system very severe aberrations of phase may be tolerated.

For the mathematics associated with the determination of position by means of the observation of the Doppler phenomenon reference is made to those portions of the space tracking embodiment that deal with this subject. Resolution of ambiguity is likewise accomplished in the manner of the space track system and will not be duplicated here.

The transducers 70 may be made with a sufficiently broad frequency response so that they may also be employed to serve as pickups for submarine propellor and other noises in addition to pickups for submarine propellor other noises in addition to pickups for the Doppler signals. The Doppler signals are amplified by the amplifier 75 shown in FIG. 8 and then fed to the mixers 76 and 77 which are also supplied with electrical oscillations from the phase shifters 80 and 81 respectively. These phase shifters are connected to the standard frequency generator 83, which generates a low frequency which may be an audio frequency or above audio frequency. The output of the generator 83 is supplied to the amplifier 82, which energizes the transmitting transducer 74, and to the phase shifters 80 and 81. Phase shifter 80 advances the phase by 45 degrees and phase shifter 81 retards it by 45 degrees so that the standard frequencies supplied to the mixers 76 and 77 are 90 degrees out of phase. The outputs of the mixers are supplied to the amplifiers 78 and 79 and the outputs of these amplifiers supply command signals to a reversible counter which may be connected as described in connection with FIGS. 4, 4A and 4B.

Tracking system employing light pulses

There is a practical requirement for tracking systems employing light which may be visible or invisible, such as, infrared light, rather than radio waves for the transmission of the required intelligence. Systems now exist using photographic means to determine the path followed by a missile. However the photographic process is slowed by the time required to develop the film and to read it. The advantage of using light in missile tracking is that it tends to travel in straight lines to a much greater degree than does radiation of radio frequencies. In the present art it is difficult to measure with precision the change in frequency, or the change in color, of light that would be the result of the Doppler effect resulting from the movement of conventional vehicles. There is a further difficulty in the present art of providing a perfectly monochromatic source of light. Current systems employing light pulses and photoelectric means for their detection measure the difference in arrival times at separated receiving stations. This process requires a close timing or phase coherence between stations. The accuracy of the timing diminishes as the stations are separated and communication between the stations by wire, radio, or light becomes less precise in the phase or timing sense. Such systems sometimes resort to the transmission of light between the stations to achieve adequate timing thereby limiting the system to configurations which allow line of sight communications between stations.

A practical embodiment of my invention is a system for the determination of the position and motion of a moving missile which is emitting pulses of light as known intervals. The light so emitted is detected by six ground stations whose positions are precisely known by photoelectric means. The layout of the system is shown in FIG. 9 in which the strobe type lights 91 are mounted on the missile 98 and transmit short bursts of light energy at known time intervals. If two lights 91 are used then they must be synchronized so that they emit light pulses simultaneously. The light energy is received at separate ground receiving stations 92, 93, 94, 95, 96 and 97 which are arranged so that they can all view the missible 98 at the same time. These ground stations are provided with light responsive cells 92a, 93a, 94a, 95a, 96a, and 97a, respectively, for converting light signals into electrical signals. The outputs of all the receiving devices 92-97 are connected to the computer 99. At each station the interval between successive pulses is measured. The difference in the time interval between the transmission of two pulses and the time interval between the reception of the two pulses is a direct measure of the velocity of the vehicle in the direction of the measuring stations. This may be expressed as follows: $r_2 - r_1 = C(T_m - T_0)$ where:

$r_2 - r_1$ = change in range from the station during the time interval between the two transmitted pulses
$C$ = velocity of light
$T_0$ = time interval between transmission of pulses
$T_m$ = time interval between reception of pulses Each of the receiving stations is provided with instruments for measuring the time interval between the reception of the two pulses and these instruments are connected as illustrated schematically in FIG. 10. The light pulses from the flashing strobe 91 aboard the moving vehicle 98 are concentrated by the wide angle lens 100 which focuses the light on the photoelectric cell 101. The cell 101 emits an electric pulse each time there is a light pulse incident upon it. This electric pulse is then amplified by pulse amplifier 102. The pulse signal from the pulse amplifier 102 is then supplied to the readout device 103 which is used to control the readout time of counter 104. The local standard oscillator 105 provides a local timebase for the station and the output of this oscillator is fed continuously into counter 104 which is in continuous operation. The count registered on the counter is readout by the readout 103 upon command given by the pulse of light received by the photocell 101. The counter 104 comprises a series of flip-flops and no reset thereof is required as any given measurement is obtained by subtracting a previous reading from the last reading. A number of readout devices are available on the market which record the reading on the counter at the instant a readout signal is received.

Thus the intervals between a single point and several consecutive points may be determined by subtracting from each of the successive readings after the first the value of the first reading. This data is then exactly the same as used in the methods of displacement measurement previously described wherein a continuous sine wave is employed. It is observed that there is no precise synchronization required between stations. The only precise time standard is the independent frequency standard at each station. Only the time difference between epochs at a single station is measured. There is then the same independence of operation between stations as exists in the continuous wave systems. The timing between stations is even more relaxed than in the case of the C.W. systems because the target actually provides a good timing signal. It is only necessary that the stations all be able to identify in time each of the pulses so that the time measurement may be started and stopped on the same pulses by all measuring stations. Such an aid is not possible with the straight C.W. system because of the impossibility of identifying the separate cycles of the wave.

In this system it is assumed that the time between pulses is large compared to the time required for light to travel the distance of the range increment. The error involved in the use of this assumption is in the ratio of the velocity of the vehicle to the velocity of light.

As in the case of the C.W. systems the measurements of the separate stations are transmitted by land line, radio or carrier pigeon to the central station 99 where computations are made in accordance with procedures described elsewhere in this application. Both single and multiple readings may be taken.

It is to be noted that this pulsed system is also applicable to underwater sound operation. In this case the error for a given displacement is substantitally greater than in the case of electromagnetic propagation because the speed of the vehicle is much closer to the speed of propagation of waves in the propagating medium. Current pulse type transducers commonly employed in sonar systems would be effective in this pulse type doppler system.

Four station tracker

There is a requirement in the space art for a system which can determine the track of a friendly vehicle or missile. In this application it is not necessary to become instantly aware of changes in direction and computations can be based upon readings taken over substantial portions of the trajectory of the vehicle. Such applications are ideal for the use of multiple reading systems, where saving in stations is well worth the use of a total observation somewhat longer than would be required for a single reading system of the same accuracy. Because of the great distances involved and to preserve simplicity in the system, equipment is employed in the vehicle to co-operate with the ground equipment. It is desirable that this equipment be as simple and as light as possible.

In this system for determination of the track of the vehicle there need be no accurate frequency standard aboard the vehicle. A transmitter 116 is provided aboard the vehicle 114, shown schematically in FIG. 12 having a nominal transmission center frequency corresponding to the Doppler shifted signal frequency that it receives from a transmitter 113 on the ground.

My invention provides a simple method of making a single legged measurement employing both transmission and reception to and from a single station and to and from the vehicle. Rather than to rebroadcast from the vehicle a signal of one frequency that is translated from the received signal by an exact amount, my method is to rebroadcast a pair of signals each removed in frequency from the received signal of the ground transmitter the identical fixed amount but in opposite directions. This operation is achieved by generating sidebands by modulation using the frequency of the received signal as the center frequency. Balanced modulation means and filtering means are employed to reduce the radiation, of the center frequency from the vehicle so as to reduce the degree of uncontrolled coupling between the transmitter output and the receiver input. The frequency or even the wave shape of the modulation is not too important and may be used for communication or identification of the vehicle. The modulation may also be employed to initiate counting at the various stations thereby reducing still further the small error owing to the inexactness of timing between stations. At the ground station the sidebands are employed to reestablish the carrier frequency. An immediate advantage of this system accrues from the use of only a single channel for the entire operation. It is unnecessary to translate frequencies in the vehicle, and therefore the total number of channels assigned to the system is a minimum. Only two transmitters 113 and 116 are employed, one on the ground and one in the vehicle.

In any continuous wave transmitter there is always present a minimum amount of noise modulation on the transmitted carrier. This noise is the result of a number of phenomena, namely, ionization of residual gases within the vacuum device forming the final amplifier, cathode surface noises, ionization of the air around the antenna, instability in the power supplies. This noise is concentrated in the spectrum immediately surrounding the carrier frequency, diminishing as the frequency of observation is moved away from the carrier frequency. This phenomenon reduces the sensitivity which may be achieved by a station which both transmits and receives on the same nominal signal frequency.

It is helpful to be able to transmit and receive from at least one station in the system. When it is possible to transmit and receive from even one station in the system it is then possible to employ the same methods of computation that are employed for a simple single legged system. This factor is of particular importance when it is desired to use closed algebraic solutions and when the other conditions are met which permit such solutions. Furthermore the use of single legged mathematics reduces by one the number of stations required for a given number of readings.

FIG. 11 is a diagram indicating the manner in which it is possible to derive single legged data from one element of single legged data combined with double legged data. In this diagram station 110 includes both a transmitter and a receiver which is capable of receiving the echo signal of the transmitter reflected from the moving object 111. Thus $r_{12}-r_{11}=m_1$ is measured at station 110. $(r_{12}+r_{22})-(r_{11}+r_{21})=p_{12}$ is measured at station 112 and $r_{22}-r_{21}=m_2$ is obtained by computation.

FIG. 12 shows a diagram of the system in which continuous waves of constant frequency are radiated in all directions from the transmitter of the transmitter-receiver station 113. These waves are intercepted at the satellite 114 or other vehicle by receiving antenna 115. The signal is tracked in frequency, suppressed carrier amplitude modulated, and amplified by equipment 116 which is aboard the vehicle 114. Special efforts are made to attenuate completely the carrier, which is at exactly the frequency of the received waves and the two sidebands are then radiated over transmitting antenna 117. The modulated signal minus the carrier is transmitted in all directions from the satellite and its received and measured by identical receiving stations 118, 119 and 120 and by transmitter-receiver station 113. The data collected by the receiving stations 118, 119, 120 and the transmitter-receiver station 113 are transferred by normal communications means to computer 121.

Each station is equipped with a highly precise and stable local standard oscillator. The equipment in the vehicle is shown schematically in FIG. 13 includes a receiving antenna 115 that is connected to the band pass filter 135 and to the amplifier 136. The output of the amplifier is connected to the mixer of the phase locked oscillator 130 which tracks the incoming signal from the ground transmitter 113. The phase locked oscillator 130 includes the voltage controlled oscillator 131, mixer 132, D.C. amplifier 133 and low pass filter 134. The output of the phase locked oscillator 130 is amplitude modulated by the balanced modulator 137 to provide a continuous set of sidebands. The modulation signal may contain the identification of the vehicle, timing marker and communications if desired. Balanced modulation and filters 138 are employed to suppress the carrier before the signal is fed into the transmitting antenna 117. Transmission of the carrier would not reduce the effectiveness of the rest of the system, however noise on the carrier could reduce the sensitivity of the input end of the vehicle equipment through the introduction of noise around the frequency of the received signal.

The ground receiving and measuring equipment is the same in all four stations and a block diagram of the receiving equipment in one of the ground stations is shown in FIG. 14. The signal from the vehicle 114 consists of two sidebands without a carrier. Synchronous detection is employed to detect the modulation thereby permitting the use of the system to convey any desired communications or timing signals. The synchronous detection device employs the sidebands to control the frequency of a local oscillator in such a manner as to restore the carrier to the signal. This restored carrier is of the same frequency and phase as the carrier would have been had it been transmitted. The carrier is also shifted in frequency by the Doppler effect in the same manner as the carrier from the vehicle 114 would have been had it been transmitted. Inadvertent transmission of a residual carrier signal will not effect this synchronous receiver circuit as it is only sensitive to sideband pairs.

The signal from the vehicle 114 is received on Omnidirectional Antenna 140 at each of the ground receiving stations 113, 118, 119 and 120 and it is amplified in band pass radio frequency amplifier 141 from whence it enters the two diode mixers 142 and 143. The signals are mixed in these mixers with locally generated signals which are derived from phase shifters 144 and 145 in such a manner that they are ninety degrees out of phase with each other. Consequently the outputs of the two mixers 144 and 145 are ninety degrees out of phase with each other. The frequency of the output signal of the mixers is the frequency of the amplitude modulation imposed upon the carrier at the vehicle. This frequency is generally in the region below one hundred kilocycles. In the event that it is merely desired to identify the vehicle, and no communications are required, the modulation in the vehicle may consist of a simple sinewave of a fixed frequency. The frequency of this modulation may be used to identify the vehicle. The sidebands thus serve two purposes; they aid in the tracking operation and they identify the vehicle.

After amplification in amplifiers 146 and 147 the signals are filtered by filters 148 and 149 to narrow the spectrum and to include only desired signals. If no other communications than identification are required these filters may be of a very narrow band pass type. The two signals are then fed into synchronous detector 150 in the output of which is generated a direct current signal which upon being filtered by the filter 151 to remove the high frequency signals coming from the detector, is used to control the frequency of the voltage controlled oscillator 152, whose frequency is thus maintained at exactly the value the carrier would have had had it been transmitted from the vehicle 114. There is of course a slight frequency shift of the sidebands owing to the Doppler effect and the filters 148 and 149 must be capable of passing the entire probable Doppler spectrum of the modulation signal.

The modulation signal itself is available at the output of one of the filters 148 or 149 depending upon the polarity connections into the voltage controlled oscillator 152. In the presence of noise the modulation signal may be obtained from both channels through the adder 153, thereby improving the quality of the signal derived and the output of this adder is the communications output. The action of the narrow band pass filters 148 and 149 is to render the system largely immune to any tracking signal which does not modulate with the desired frequency. Communications signals could be obtained ahead of the filters 148 and 149 if desired thus permitting selection of the identification signal from the rest of the modulation that may be placed on the carrier for other purposes.

The output of the voltage controlled oscillator 152 is then used for comparison with the local signal to generate the actual Doppler signal which is measured. The output of the phase locked circuit just described is fed into two synchronous detectors 154 and 155 and it is there mixed with signals from the local standard oscillator 156 through phase shifters 157 and 158 which are ninety degrees out of phase with each other. The signal inputs to the synchronous detectors 154 and 155 are of substantial voltage derived from low impedance sources of excellent quality. The output signals of these detectors are also of substantial voltage and from a low impedance source. The frequency of these output signals is the difference between the frequency of the local standard oscillator 156 and the center frequency of the two sideband signals received from the vehicle 114. The signal can vary from direct current to very high audio depending upon the wavelength of the signal radiated from the ground transmitter 113a which is located in station 113 and the amount of the Doppler frequency shift. This signal is then squared in squarers 159 and 160. These squaring circuits each may be simply a diode limiter. However, in order to remain operative at very low frequencies or what amounts to slowly varying direct current, it is better to employ the familiar Schmidt flop-flop in this application. The output of the Schmidt circuit remains constant at a predetermined D.C. level until the input voltage passes beyond a set critical value. At that value of input voltage the Schmidt circuit suddenly changes to another output voltage. The time of the transition is independent of the rise time of the input signal. This produces clean waveforms for the operation of subsequent equipment that is dependent upon the leading edges of the square wave output from squarers 159 and 160.

The fundamental components of the two square waves generated by the squarer circuits are ninety degrees out of phase with each other. In the event that the frequency of the incoming signal from the voltage controlled oscillator 152 is higher than the frequency of the local standard oscillator 156, the phase of the signal from squarer 159 will be ninety degrees ahead of the signal from squarer 160. This condition exists because phase shifter 157 advances the signal while phase shifter 158 retards it. Each phase shifter operates through 45 degrees to produce a resulting ninety degree phase difference between the two channels. When the frequency from the voltage controlled oscillator 152 is lower than the frequency of the local standard oscillator 156 the phase of the signal from squarer 160 will be ninety degrees ahead of the signal from squarer 159. The outputs of the two squarers are differentiated in differentiators 161 and 162, forming positive and negative spike pulses at the leading and trailing edges respectively of the square waves. The negative spikes are removed by diode negative limiters 163 and 164. The output of each squarer is also used to gate the spike signal from the differentiator of the opposite channel. In this manner one obtains a spike from the output of gate 165 in the upper channel when the relative phase of the two signals from the squarers is positive and from the gate 165 in the other channel when the relative phase is negative. When one channel is emitting pulses there is of course no output from the other channel. In the above manner pulses are obtained from one channel when the center frequency from the vehicle is higher than that of the local standard oscillator 156 and pulses from the other channel when the signal is lower than the local standard. A pulse occurs in one channel or the other for each beat between the incoming signal and the local standard, thereby indicating a lengthening or shortening in the distance traveled from the ground transmitter 113a to the vehicle 114 and back to the receiver 141 by one wavelength for each pulse, one channel recording the shortening of the path and the other recording lengthening of the path. The outputs of the two channels may each be connected to a separate counter, the count on one counter being subtracted from that on the other counter and the appropriate sign applied to result to indicate the net change in path. In this system reversible counter 167, of which there are several on the market, is employed. There are two inputs to this type of counter and signals into one channel add to the total count and signals from the other channel subtract from the total count. The counter is turned on and off by Timer 169 which employs local standard oscillator 156 as a time standard.

Station 113 only is equipped with a transmitter. This transmitter 113a is shown by dotted lines in the FIG. 14 and employs the local standard oscillator 156 as a frequency standard. The receiving circuits employed in receiving stations 118, 119 and 120 are the same as the receiving circuit shown in FIG. 14 and do not include the transmitter 113a. Each is provided with a counter such as the counter 167 and the outputs of all of these counters are connected to a central computer station 121.

Air traffic control system

An important embodiment of my invention is a system for the control of airborne traffic around busy airports and in regions where several busy airports are located in proximity. It is becoming an ever more complex problem to keep track of the tremendous amount of air traffic entering modern metropolitan areas. The total amount of radio frequency spectrum that may be allotted to air traffic control in these areas diminishes as the need for that spectrum increases with the need for more radars. Furthermore it is essential that the traffic control radar in these areas be provided with a three dimensional capability.

Another problem in air traffic control is the maintenance of adequate stability in the aircraft communications receivers and transmitters. The drift inherent in even crystal controlled equipment is at times incapacitative. In smaller craft the pilot must often divert his attention from his flying to retune the receiver. Similarly the tower must follow the drift of the transmitter on the individual aircraft. My system provides a means for stabilizing the reception and transmission of all signals in air traffic control network, conserving the allotted spectrum to the utmost and providing a means for the accurate determination of the position of all aircraft carrying the required equipment.

In my system equipment such as shown schematically in FIG. 16, must be carried in the aircraft capable of operating with the ground equipment. The ground equipment shown in FIG. 15 includes a main transmitter 170 which is amplitude modulated for communications purposes and whose carrier serves as a frequency standard for all equipment of the system. This station radiates at least its carrier at all times whether it is modulated or not. In addition to the transmitter there are six receiving stations 171, 172, 173, 174, 175 and 176 specially distributed about the area of the control system.

The receiving stations each contain two receivers equipped with separate antennas as shown in FIGS. 15 and 17. One receiver receives the signal radiated by the transmitter 170 and has an antenna 177 so designed and adjusted as to maximize the signal from the transmitter. It is the function of this receiver to make available at the receiving station a c.w. signal whose frequency is exactly that of the carrier of the transmitter 170. The other receiver is provided with an antenna 177a and an R.F. amplifier 178 that is tuned to a frequency that is somewhat removed from the frequency of transmitter 170 and receives signals from the aircraft 190 operating cooperatively with the aircraft control system.

The aircraft 190 under control carries a receiver shown in FIG. 16 which is automatically tuned to the frequency of the ground transmitter. This receiver employs a local oscillator whose frequency is automatically controlled to maintain a fixed relationship with respect to the frequency of the signal arriving at the aircraft from the ground transmitter, this difference frequency being the intermediate frequency of the receiver.

Phase coherence is maintained between the local oscillator and the transmitter frequency as received by the aircraft and modified by the Doppler effect. The receiver has the normal I.F. components and detector for the purposes of receiving communications from the control central over the modulated transmitter.

The local oscillator is then to generate the carrier to determine the center frequency of a tracking signal to be transmitted by the aircraft continuously while the aircraft is in the control area. The tracking transmitter employs double sideband suppressed carrier modulation and the identifying modulation is a simple sinewave whose frequency determines the channel on which the aircraft operates. The exact channel to be employed is assigned by the ground control station to the aircraft through the voice circuit maintained by amplitude modulation of the ground transmitter. The voice transmitter of the aircraft may be controlled from the local oscillator either through a frequency translation device or directly. Since this is not a part of the tracking system the details of the voice circuit are not included here.

There are fifty channels in the system spanning a band width of 100 kilocycles, making it possible to track and control this number of aircraft in the control region. The channel separation is 1000 cycles per second. This channel separation is adequate to handle conservatively aircraft traveling with a speed of 1000 miles per hour when the system employs a carrier frequency of 300 megacycles per second. Though greater speeds may be employed it is reasonable to expect that reduced speeds will be employed in congested areas in preparation for landing and during climbout. For each channel there are of course a high and a low sideband frequency. The first channel has a modulation frequency of 1000 cycles per second and the second channel has a modulation frequency of 2000 c.p.s. The side bands of the second channel occur above and below the sidebands of the first chanel thus spanning it. The third channel spans the first two. The spectrum between sidebands of a given channel is a multiple of 2000 c.p.s. By increasing the separation between channels by a factor of two it is possible to employ the tracking signal as the carrier for a voice link. In this manner each tracked aircraft would have its own clear channel for addressing the controller. This capability is valuable in situations where seconds count and a garbled message may mean disaster. The extra bandwidth required may come from reducing the number of channels, increasing the main operating frequency, or increasing the total system bandwidth. Increasing the frequency of the main carrier, that is transferring the system to a higher frequency band, has the advantage of removing the system to a less congested spectrum and in addition increasing the accuracy of the system. However, the bandwidth required for the Doppler tracking at the higher frequency increases in direct proportion to the increase in frequency.

The signal emitted by each aircraft under control is received by each of the ground stations, detected, and transmitted to a central control center where frequency trackers and counters determine simultaneous range increments for each aircraft. This information is transmitted to a high speed digital computer which determines the position of the aircraft. Iterative techniques may be employed in the computer as described under the section on computations, the initial position approximation being provided by the navigation of the pilot using conventional navigation aids. Multiple readings may also be employed to achieve an approximation through the use of closed linear solutions.

In system block diagram, FIG. 15 there is shown a transmitter 170 for radiating a continuous wave constant frequency signal the carrier of which may be amplitude modulated in the usual fashion if desired for communications. The signal from this transmitter is received by the aircraft 190, transferred in frequency by the Doppler effect to another frequency somewhat removed from the frequency of the ground transmitter 170 as it is received at the aircraft. This translated frequency is transmitted by the aircraft in all directions toward the ground. The signal from the aircraft is identified or tagged by a modulation frequency which is assigned to the aircraft by the ground control operator. The signal from the aircraft is received by all six stations 171, 172, 173, 174, 175 and 176 continuously.

The circuits of the six receiving stations (shown in FIG. 17) are identical and very simple since the actual detection of the I.F. signal, the frequency tracking and data reduction are accomplished at the central control point. These receiving stations are not manned. Each receiving station has two antennas 177 and 177a, antenna 177 being directed and tuned to pick up the signal from the ground transmitter 170 and antenna 177a having a wide angle to cover the space region over which air traffic control is to be maintained. The signal from the transmitter is mixed with the signal from the aircraft to obtain the I.F. signal of the receiving station. This I.F. signal is amplified by a conventional amplifier 178a and transmitted without detection to the central control point 191 by cable 178b or microwave link. Should it be desired to translate the frequency of the signal up or down for the purposes of communication with the central control point, the mixing signals should be derived from the signal received from the ground transmitter 170. Upon receipt of the signals from the receivers 171, 172, 173, 174, 175, and 176 at the central control point 191 they are introduced to sets of frequency trackers 192. Each of these sets of trackers consists of six trackers tuned to one channel frequency. There are fifty such sets, one for each aircraft to be tracked. The output of the frequency tracker is fed into the counter 193 which counts the number of wavelengths of the signal of the ground transmitter by which the total propagation distance increases or decreases as the aircraft moves along its course. This incremental distance data is introduced into the computer 194 which determines the positions of the various aircraft, this information being employed by the controller 195 which is connected to the transmitter 170 by the voice link 196 to direct the aircraft traffic.

The equipment carried by the aircraft 190 being directed and tracked by the aircraft traffic control system is shown in FIG. 16. The signal is received from the ground transmitter 170 with a frequency equal to that of the ground transmitter modified by the Doppler effect. The signal is received by receiving antenna 200, amplified by RF amplifier 201 and fed into mixer 202 where it is reduced in frequency to the IF frequency. The IF signal is amplified in a conventional manner by IF amplifier 203. For the purposes of communication the voice modulation on the signal is detected by second detector 204, amplified by audio amplifier 205 and fed into headset 206. The mixing signal employed in mixer 202 is controlled by the IF signal output from that same mixer in the following manner. The IF signal after amplification is fed into the balanced detector 207 the low frequency and D.C. output of which is used to control the frequency of the voltage control oscillator 209. Filter 208 is a low-pass filter whose characteristics determine the speed and stability of the overall phase locked loop thus formed. The voltage controlled oscillator 209 then oscillates at the IF frequency and a signal from its output is fed around to the balanced detector 207 for balance against the signal from the IF amplifier 203. The output of the voltage controlled oscillator 209 is also fed into the mixer 202 after being multiplied in frequency in the multiplier 210 by an integer sufficient to result in the proper IF frequency.

The output of the voltage controlled oscillator 209 is also fed into frequency divider 211 which comprises flip flops for reducing the frequency to 1000 cycles per second. This signal is then multiplied in the multiplier and channel selector 212 which determines the channel upon which the aircraft will operate. The output of the selector 212 is then employed to modulate and thereby identify the signal to be transmitted by the aircraft 190. Balanced modulation is employed in balanced modulator 213 for this purpose. The carrier for this purpose is obtained from the output of the multiplier 210 and is the mixing signal used in the receiver. The signal is amplified in driver amplifier 214 before being modulated. The carrier is suppressed in the balanced modulator 213 and only the two sidebands are amplified in Class B amplifier 215 and radiated over tracking antenna 216.

The voice transmitter of the aircraft may be controlled in frequency by using the output of the voltage controlled oscillator 209 as the stable frequency control. Although this signal is subject to the Doppler effect, its drift may be better than what can be obtained by an inexpensive crystal control. For this purpose the output of the oscillator 209 is multiplied in multiplier 217 to the desired value and transmitted over voice transmitter 218.

The equipment of each of the ground receiving stations 171, 172, 173, 174, 175 and 176 is shown in FIG. 17. This receiving equipment is unmanned and requires no control, remote, automatic, or manual. The signal from the transmitter is received directly on high gain antenna 177 which is tuned precisely to the frequency of the ground transmitter 170 and so pointed as to receive this signal at maximum amplitude. A phase locked oscillator 220 is employed to track this signal and ensure a solid signal of constant amplitude for use in the receiver proper. The phase locked loop 220 operates as follows: The signal from the high gain antenna 177 is fed into mixer 222, the D.C. and low pass output of which is amplified in amplifier 223 and fed into filter 224. Filter 224 is a low-pass filter whose characteristics determine the stability and speed of the phase locked loop circuit. The output of the filter is employed to control the frequency of oscillation of voltage controlled oscillator 225, the output of which is employed as the mixer signal in mixer 222. The output of the oscillator is then stabilized on the frequency of the signal received directly from the ground transmitter.

The signal from the aircraft 190 is received over the low gain antenna 177a and amplified by RF amplifier 178 before being mixed with the output of the phase locked loop 220. The output of the mixer 226 is then at the same nominal frequency as the IF frequency in the aircraft. This signal is amplified in IF amplifier 178a and thence transmitted to the central control by land cable 178b The circuit of the frequency tracker and channel filter 192 is shown in FIG. 18. The IF signal from each outlying unmanned receiver is fed into a phase lock loop circuit which has several functions, namely, identification of the channel, establishing the center frequency between the two side band frequencies which made up the modulation envelope, and stabilizing the signal by its effective narrowing of the accepted spectrum. This type of circuit permits the pass band of the system to follow the signal as it moves in frequency owing to the Doppler effect. The circuit is similar to one commonly employed to detect double side band suppressed carrier communications signals. The only difference is the use of narrow band filters so that the tracker will follow the selected pair of sidebands that are peculiar to a signal on the desired channel.

If it is desired to employ communications over the tracking channel these filters may be made broad enough to accommodate the speech band without seriously effecting the performance of the system for tracking. It would only be necessary then to add a detector to extract voice modulation from the channel subcarrier.

The signal received from the receiving stations is fed into mixer 230 and mixer 231 where it is combined with mixing signals of the same frequency as the input signal and ninety degrees out of phase with each other. The outputs of the two mixers are fed into identical bandpass filters 232 and 233 which are tuned to the frequency of the channel subcarrier. This is the frequency employed in the aircraft 190 to modulate the carrier originally derived from the main transmitter signal by translation by the amount of the IF signal. The bandwidth of the filters is determined by the amount of the expected Doppler shift. The bandwidth would be somewhat wider if required to accommodate communications modulation on the subcarrier. The output of the filters is amplified by conventional means in amplifier 234 and amplifier 235. If desired, of course, these amplifiers and filters may be combined, providing two identical tuned amplifiers. The outputs of the two amplifiers are mixed in the balanced detector 236 the output of which contains low frequency and D.C. control signals which after passing the low pass filter 237 is used to control the frequency of voltage controlled oscillator 238. This oscillator oscillates at the same nominal frequency as the signal coming from the receiving stations. The output of the oscillator is shifted ahead and behind by 45 degrees and fed into mixers 239 and 240 so that the two mixer signals are ninety degrees out of phase with each other upon leaving these phase shifters.

The operation of the frequency tracker may be explained by considering mixer 230, filter 232, and amplifier 234 to form one of two identical channels and mixer 231, filter 233, and amplifier 235 to form the other channel. For reference and obvious reasons we may call these channel odd and channel even. One of these channels, which one depends upon the sense of control of the voltage controlled oscillator 238 and balanced detector 236, is operated in phase with the incoming signal. That is, the injection signal into the mixer is in phase with the input to the mixer from the receiving stations. This channel is at maximum signal level. The other channel, say channel even, has no signal through it since the mixer injection signal is ninety degrees out of phase with the incoming signal. Under these conditions there is no correction signal from the output of the balanced detector 236 and the voltage controlled oscillator is at the proper frequency and phase. Now should there be a drift between the frequency of the voltage controlled oscillator 238 and the incoming signal there will be a small component of the incoming signal in phase with the injection voltage of channel even with a consequent small signal of subcarrier frequency progressing through channel even. The signal level in channel odd is not altered appreciably. The output of detector 236 now contains a small correction signal which is applied to the voltage controlled oscillator countering the drift in that oscillator from the desired phase relationship with respect to the incoming signal.

The signal coming from the receiving station contains a signal pair for each aircraft under control. The center frequency of each pair, which need not actually be present carries the Doppler information, and it is quite exactly determined. The frequency separation of any pair is not exact and is only sufficiently accurate to permit channel identification and separation. The center frequencies of the different pairs are generally different although they may be coincidentally the same. The frequency tracker determines this center frequency and provides a stable signal of constant amplitude equal to that frequency for counting purposes.

To obtain the displacement it is necessary to subtract from the output of the frequency tracker a signal of the same nominal frequency derived from the ground transmitter signal so that the Doppler effect or interference can be conveniently observed and the interference cycles counted. To stabilize the signal received from the main ground transmitter and reduce it to the appropriate frequency for comparison with the signal output of the frequency tracker a phase lock loop 230 similar to that shown in FIG. 17 employed in the aircraft receiver is employed operating on a signal received from a high gain antenna 250 which is tuned to the frequency of the main ground transmitter 170 and so pointed as to maximize the signal from that station. It is a further function of this phase locked oscillator or phase locked loop 230 to remove the modulation from the signal when the main transmitter 170 is modulated for communication with the aircraft. The phase locked loop used in this system is quite common and sometimes it is called tracking filter because of the manner in which it keeps tuned to the signal as its frequency changes once it is "locked on."

The output of the phase locked loop 230 and the output of the frequency tracker are combined in a reversible counter 251. The output of this counter when multiplied by the wavelength of the signal transmitted by the main ground transmitter 170 is the change in the total distance from transmitter to target and target to receiver occurring during the time interval of the count.

A reversible counter of conventional design may be employed although it is not required as one may employ instead a comparison frequency removed from the signal frequency by a fixed amount greater than that expected from the doppler effect as described elsewhere in this application.

It is to be observed that no direct use is made of the residual carriers that may be transmitted by the aircraft as a result of improper balance of the balanced modulator 213 shown in FIG. 16. Transmission of this signal in event that the modulators of one or more aircraft are not balanced causes no problem as the system is insensitive to a signal whose frequencies lie in this region. If several aircraft under surveillance transmitted these frequencies the signals would lie in a group around the IF frequency of the ground receiver being removed from the exact IF frequency thereof by the magnitude of the doppler effect. This group of signals would be crossing and recrossing each other and make frequency tracking of them more difficult. Also it would be much more difficult to identify the signals. In the system as described the carriers play no role whatsoever in the tracking or in the use of the channel identification as a subcarrier for communications. Leakage from modulators in the aircraft causes no problem. While the system employs twice the bandwidth that would be required by an equivalent single sideband system it is much more simple and reliable.

Navigation system

Another practical embodiment of my invention is a system and a method of navigating by taking doppler displacement measurements with receiving and measuring equipment 260, FIGS. 19 and 21 in the vehicle, the transmitting equipment being located on the ground. Such a system is just the reverse of the other systems, however the mathematics does not change. Whatever number of stations and readings one wishes to choose of the many combinations available, the calculation is same as that same system employed for ground determination of the position of the vehicle. One may use pulsed, modulated, or continuous waves for this application.

Any of the single legged systems may be the basis for a navigational system. For the purpose of this example a four station system is chosen. Four transmitters 280 are located on the ground as shown in FIG. 21. (Actually some or all of the transmitters could be located in satellites or other moving vehicles whose positions were precisely known.) The receiving equipment is located in the vehicle. The transmitters radiate a suppressed carrier-double sideband signal of high frequency stability and phase stability. No attempt is made to hold any particular phase angle between stations. All of the transmitter stations employ the same nominal center frequency. Each station is amplitude modulated by a simple sinewave and its carrier is suppressed. Each station has a particular modulation frequency assigned to it so that it may be identified. The modulation serves also as an aid in tracking the frequency of the signal by the equipment in the vehicle. The means of tracking such a signal and reestablishing at the receiver the carrier removed at the transmitter have been discussed elsewhere in this application.

Four such synchronous receivers are employed and each tuned to the same center frequency but each being tuned to a separate audio identification signal corresponding with the particular transmitting station with which it is to operate. Each receiver reestablishes the center frequency in the process of detecting the modulation envelope. This signal is of the same frequency as the carrier would have been at the receiver antenna had it not been suppressed at the transmitter. FIG. 14 shows one of the four tracking and measuring equipments. The communications output may be employed for identifying the particular transmitter and also for receiving voice communications from the transmitter. In the event that voice communication is employed the identifying tone is the subcarrier and the voice communication must be obtained by detection of this signal. The transmitter shown in FIG. 14 is not employed. There is only one local standard oscillator and only one timer in the airborne equipment, all four tracking units operating from one set of these two devices. The outputs of the four tracking and counting units are the measurement signal from the reversible counters. This information is in parallel form and is transferred, all digits at once, by a plurality of wires to a digital computer in the aircraft. The computer employs an iterative solution with four readings and determines the position of the aircraft with respect to the four stations. Furthermore with this solution it is possible to adjust the local standard oscillator to the frequency of the ground system or to merely note the difference existing between the two. This solution is based upon the assumption that the oscillator in the vehicle is stable in frequency during the course of the measurement. The oscillator frequency need not be exactly known. Of course the locations of the four transmitters must be exactly known to the computer in the aircraft.

Refering tor FIG. 19 there is shown a schematic diagram of the airborne receiving, measuring and computing equipment, such as the equipment 260 shown in FIG. 21. The signals from all four transmitters 280 are received by the vehicle on a single antenna 260a and amplified in a common amplifier 261. The signal is then fed into tracking and measuring units 262, 263, 264, and 265 which receive frequency standard and time signals from local standard oscillator 266 and timer 267. The measurement data is fed as stated into computer 268. This computer may be located on the ground as shown in FIG. 21 and a suitable radio link provided between it and the vehicle as shown. The communications outputs of each receiving unit is fed to a point on switch 269 so that the modulation on any of the subcarriers may be selected and heard over the headphones 272 after being detected by detector 270 and amplified by amplifier 271.

In FIG. 20 is shown the very simple transmitter used in the four stations 280. At each station there is a highly stable and accurate local standard oscillator 273, whose signal is modulated by balanced modulator 274 which suppresses the carrier and leaves only the two sidebands. If there is no voice communication the modulation is a simple sinewave and the radiated signal consists of just two frequencies. The modulated signal is amplified by Class B amplifier 275 and radiated by antenna 276. If voice is to be transmitted over the transmitter the modulation signal is itself modulated by modulator 277 with signals derived from microphone 278. The voice link makes it possible for the pilot to receive verbal identification of the station, weather reports, traffic reports and other broadcasts as is now done in the omnirange system.

This system is readily adapted to tracking a friendly satellite with minimum power levels used in the vehicle. In such application the computer may be retained on the ground. The measurement data would be transmitted to the ground by teletype or telemetry circuits established between the remote vehicle and the system complex. In this manner large power levels could be achieved from which to make the measurements since the transmitters on the ground may be made very powerful. The information sent back from the vehicle would be in digital form and could be sent with great redundancy with far less power than it would take to send the equivalent data in analog form. The main advantage of this method of tracking lies in the power that may be employed in the transmitter. In the vehicle the amount of power and energy available for tracking purposes is severely limited because the available space is taken up by the mass of the necessary equipment and fuel necessary for the length of time the vehicle is to be aloft. The amount of primary power required by a receiver of a given sensitivity is limited. Therefore in order to improve the signal to noise ratio in the measuring system the only procedure available is to increase the transmitter power. The increased power is much more available on the ground than in the vehicle. The antenna problem remains the same whether the transmitter or the receiver is in the vehicle.

The complete solution for the errors of this system involves sixteen simultaneous equations when one retains the unknown though constant frequency. When the frequency is eliminated from the equations and is still unknown the set is reduced to fifteen equations. Should the local standard oscillator 266 in the vehicle be of sufficient accuracy and stability only three readings would be required. The error equation in this case would involve a 12 by 12 matrix rather than a 16 x 16 matrix as is the case when the frequency is unknown. Furthermore if the frequency is known and the ground stations can be located in a plane one may resort to rather simple algebraic equations. Use of five ground stations instead of four increases the various options as to system configuration. The stations need not lie in a plane to achieve algebraic solutions if four readings are taken though the algebra is somewhat more extensive than in the system of four stations in a plane. On the other hand if an iterative solution is employed only two readings need be taken when five stations are employed on the ground and the frequency of the local standard oscillator in the vehicle may be determined. The associated error matrix is then 10 by 10. With five stations one also has the option of taking three readings and, with an iterative solution, determining not only frequency of the local standard oscillator but also the variation of the average frequency between each of the three measurements. It is readily apparent that there are a number of various configurations and computing procedures that are available. All of these configurations will not all be listed here as it is clear that one familiar with the art can employ the techniques and methods of computation set forth here to evolve many systems of varied design.

Navigation system employing pulses

FIG. 42 shows a method of navigation employing the detection, aboard a navigating vehicle, of pulses transmitted from each of a plurality of transmitters. As indicated on p. 71 of this specification pulsed waves may be employed in such a navigation system as well as sine waves or modulated waves.

The Navigation System Employing Pulses shown in FIG. 42 combines certain features of the Navigation System pages 71 to 75, FIGS. 14, 19, 20 and 21, and certain features of the Tracking System Employing Light Pulses pages 45 to 49, FIGS. 9 and 10. Similar to both these other embodiments of the applicant's invention, this Navigation System Employing Pulses employs a plurality of simultaneous measurements using a plurality of reference points each of which points is the location of a wave aperture; and, of course, there is a wave aperture on the moving vehicle.

The Navigation System Employing Pulses is similar to the Navigation System and dissimilar to the Tracking System Employing Light Pulses in that waves are transmitted, for the purpose of performing the required measurements, from the ground stations to the vehicle. The Navigation System Employing Pulses is similar to the Tracking System Employing Light Pulses and dissimilar to the Navigation System in that pulses are employed to make the required measurements.

Each position determination is achieved by the simultaneous performance of a plurality of measurements. One measurement alone is not sufficient for the determination of the position of the moving vehicle just as such a single measurement is not adequate for position determination in either the Navigation System or the Tracking System Employing Light Pulses referenced above. It is of course necessary to understand in detail the nature of the single measurement in order to understand how a plurality of such measurements is employed to determine the position of the moving vehicle.

Each measurement is performed by determining the time interval between the arrivals at the moving vehicle of a first wave pulse and a successive wave pulse. Both of these pulses are transmitted by the same station. This measured quantity is linearly related to the variation (change) of the distance between the single transmitting station and the vehicle, which variation occurs between the epoch of the reception of the first pulse and the epoch of the reception of the second pulse. This variation of the distance (change of range) is a direct consequence of the variation (change) of the position of the moving vehicle occurring between the first epoch and the second epoch. It is thus seen that the quantity actually measured, the time interval between the arrivals of the two pulses, is dependent upon the motion of the moving vehicle, i.e., the variation (or more particularly the change) of the position of the moving vehicle occurring between the two epochs. One actually measures a quantity, the time interval, that is linearly related to the variation of the distance; and thus this quantity actually measured is dependent upon the variation of the position of the moving vehicle.

The linear relationship between the variation (change) of the distance (range) and the measured quantity (time interval) is shown at the bottom of page 46 of this specification. The manner in which the time interval between the arrivals at the vehicle of the first pulse and the successive pulse is measured is shown in FIG. 10 of this specification. This equipment is aboard the vehicle of course, rather than on the ground as in the case of the Tracking System Employing Light Pulses.

The process of performing a plurality of such measurements and the several options that are available in the configuration of stations and the number of measurements to be performed by each is explained in the specification relative to the Navigation System. It is readily seen that the distances (ranges) whose variations are measured as described above form the edges of a solid geometrical configuration of points. These points are of course the reference points which are the positions of the stations and the point which is the position of the vehicle. As the vehicle moves the geometrical configuration of points varies (changes), the distances (ranges) vary accordingly, and the time intervals described are linearly related to the variation of the ranges and are thus dependent upon the variation of the geometrical configuration. There is thus a relationship between the time intervals described and the positions of the moving vehicle at the epochs of the initiation and termination of the measurement. A plurality of such relationships defines these positions.

One may alternatively describe the operation of this modification of the invention in terms of a plurality of static geometric configurations of points. A first configuration of points exists which is a configuration comprising the locations of the stations (the reference points) and the vehicle at the epoch of the initiation of the measurement. A successive configuration of points exists comprising the locations of the stations (the reference points) and the location of the vehicle at the epoch of the termination of the measurement. There may be two or more of such configurations depending upon the number of stations employed. In this explanation of this modification of the invention there must of course be at least two configurations of points. The differences of corresponding parameters (the distances of ranges) of the successive configurations of points is dependent upon the differences in the shapes of the configurations. Each configuration corresponds to one of the above mentioned epochs at which the vehicle traverses that point of the configuration that is not one of the reference points, and each configuration has only one point that is not a reference point.

It should be clear that it is the variation of the configuration (or the difference between successive configurations) that produces the measureable phenomena, and permits thereby the determination of the configuration (configurations, in the above alternative explanation).

The transmitters must transmit their respective pulses sufficiently close together in time that the vehicle does not move sufficiently between the transmission of the first pulse corresponding to a given epoch and the transmission of the last pulse corresponding to that same epoch that the geometric model upon which the determination of position is based is destroyed. Such interstation synchronization is easily achieved either by timing means at each station or communication means between the stations. The critical item relative to the timing of the pulses is not the timing between the stations but rather is the timing between the successive emissions at each single station. This intrastation timing is easily accomplished by frequency reference means at each station.

FIG. 42 shows a plurality of pulse transmitters A, B, C ... N which serve as beacons for the navigation of the vehicle. The vehicle equipment 450 is carried aboard the vehicle. The vehicle equipment 450 comprises receiving and signal identifying means 451. From these means signals corresponding to the signals of the several transmitters are fed into frequency standard and measuring means 452. In means 452 the time intervals between successive pulses from each transmitter are measured. The measured quantities from apparatus 452 are fed into computing means 453 for position determination. Means 453 convert the measured quantities into the cartesian coordinates of the first and successive positions of the moving vehicle corresponding to the epochs of initiation and termination of the measurements.

Sensor system for aiding the guidance of vertical landings

Another embodiment of my invention relates to a system for the direction and control of landings by helicopters, rockets, and other vehicles capable of vertical takeoffs and landings.

During landing of a rocket vehicle the vehicle is turned around so that it proceeds toward the landing area stern first, and the thrust of the main propulsion engines is employed to decelerate the rocket and cushion the shock of contact with the landing pad. It is important to have exact knowledge of the speed, position, and deceleration of the vehicle during this procedure. The rate of fuel consumption by the rocket when providing power is enormous. Only a limited amount of fuel is available for the landing; and, should this fuel be expended before the landing operation is complete the vehicle may be expected to fall to earth from whatever altitude the vehicle has at the time of fuel exhaustion. Corrections to errors in the landing trajectory from the planned trajectory must be accomplished at the earliest possible time, thus requiring the most accurate methods of detecting these errors. It is essential that the rocket be directed with extreme precision toward the exact landing point while it is still well removed from the pad since there is little fuel for holding the rocket in place while last minute corrections are applied to the position of the rocket before the engines are cut off. Another reason for avoiding this hesitation at the last second is because of the damage that can result to the landing pad from prolonged direction of the flame from the engine of the rocket against the pad's various components, especially those parts whose purpose it is to absorb the landing shock and maintain the vehicle upright after touchdown. Precise control of the trajectory is also required so that fuel may be expended at a rate which will result in the minimum of fuel in the tanks at the moment of touchdown thereby reducing the shock on the structure of the rocket. Another reason for speeding the landing process is the effect of winds. The faster the landing is accomplished the less will be the effect of wind gusts.

Some of these requirements are also present in the problem of controlled landings of helicopters and other such craft. In many of these vehicles the rate at which fuel is consumed is much greater when the craft is sustaining itself stationary in the air than when it is moving through the air. Furthermore such vehicles are generally much less stable when attempting to hold a stationary position than when they are moving. Consequently it is desirable that landings be accomplished with all possible dispatch.

The configuration of the system chosen for this application is one in which a continuous wave oscillator is mounted aboard the vehicle. There are five receiving equipments 285–289 located on the ground near the landing pad 290, as shown in FIG. 22. The antennas of stations 287 and 288 are mounted on towers in order to provide a better geometrical relationship for determination of the altitude of the aircraft. All of the stations are located on one side of the landing pad so as to view a single antenna on the vehicle. If the antenna could be located underneath or on the top of the vehicle it would be better to have the stations 285–289 located around the landing pad.

Only four of the stations of the system provide measurement data. The fifth station 289 serves as a phase reference. The four measuring stations 285–288 each record the total change in phase relative to station 289.

In FIG. 23 is shown a system for taking these measurements. In this system the phase change is measured in units of one cycle of the transmitted frequency. The equipment of these stations 285–288 is similar to that shown in FIGS. 4 and 4B and the operation of the circuit of FIG. 23 is described in connection with these figures. In general this equipment will measure the number of cycles of phase change that occur between the signal it receives over its antenna and the signal it derives from its own frequency standard. In this five station system the frequency standard as employed in some of the other embodiments is replaced by a fifth station 289 geometrically separated from the others. This fifth station comprises the phase locked oscillator 291 shown in FIG. 23 which is similar to the oscillator loops shown in FIGS. 13, 17 and 18. This oscillator furnishes a signal to the phase shifters 292 and 293 of station 288 and also to similar phase shifters of stations 285, 286 and 287. The output of the reversible counter 294 of station 288 is fed to the computer 295. Likewise the outputs of the counters of stations 285, 286 and 287 are also fed to computer 295. If the signal strength from the vehicle is strong enough the phase locked oscillator 291 may be replaced by a simple amplifier.

FIG. 24 shows an alternate circuit for the system which is capable of recording phase change regardless of how low the rate of change of phase becomes. This circuit also has the capability of measuring phase change in fractions of a cycle. The capability of measuring parts of a cycle is important when increased accuracy is desired. Also in this system it is assumed that sufficient signal strength is available from antenna of station 289 that it needs only be amplified in an amplifier, whose phase characteristic is sufficiently stable, for use as the reference signal.

The continuous wave signal is received on antenna 300 and modulated by modulator 301 employing the output of low frequency oscillator 302 as the modulating frequency. The modulating frequency should be higher by a factor of three or four than the frequency of the maximum expected Doppler shift. The modulated signal is then fed into mixers 304 and 305 which employ mixing signals which are derived from the reference station 289, amplifier 316 and which are separated in phase by ninety degrees by means of phase shifters 311 and 312. The outputs of the mixers 304 and 305 which now contain the modulating frequency are fed into amplifiers 306 and 307 which have a band pass characteristic centered around the modulating frequency. The signal outputs of the amplifiers are at modulating frequency and varying in amplitude and sign according to the phase relationship between the signals received on antenna 300 and antenna 315. The signal outputs of the amplifier 306 and 307 are synchronously detected in synchronous detectors 308 and 309. The outputs of the synchronous detectors are then used to excite the winding of a two phase motor 310 whose rotor is magnetically polarized. The motor 310 is coupled through gear box 313 to shaft encoder 314. Depending upon the particular encoder employed by gear box 313 may not be necessary. Shaft encoders are common in the art and commercially available in a variety of forms. The output of the encoder 314 is compatible with the input to the computer. The encoder provides a decimal or binary signal to the computer telling it the total angle through which the shaft of the motor has turned including whole turns and fractions of a turn.

The reference signal is obtained from station 289, which has no measuring function. This station consists solely of antenna 315 and radio frequency amplifier 316.

This system is capable of measuring changes of only a part of a cycle. The degree of fineness with which this measurement can be made is dependent upon the phase transfer characteristic of the various amplifiers and the connecting leads. Phase stability is an important characteristic in all of the amplifiers when the most exact measurements are to be made. Amplifiers 306 and 307 are a matched pair with identical phase characteristics. There are other systems possible for measuring the change occurring in the relative phase between two antennas. These systems would be equally applicable.

It should be borne in mind that it is a change in phase occurring in a given interval that is measured not the absolute value of the phase. Furthermore this measurement should not be confused with measurements of planar angles or space angles or the changes thereof. In the event that the distance from the target to the station complex is much greater than the distance between stations this measurement approximates a measurement of rate of change of angle. However this approximation is not made in this system. One can see the nature of the measurement by reference to FIG. 25. As the vehicle moves from point 1 to point 2 there is a change in the difference between the ranges to station 1 and station 2. One may say equivalently that there is a difference between the change of range occurring from one station and the change of range occurring from the other station. This measured quantity is shown in the diagram.

It is necessary to take at least three consecutive readings in this system. Writing the expression relating variation of the various ranges to the variation of measured quantity as before $$dr_{12} - dr_{11} - dr_{52} + dr_{51} = dp_{15}$$

and the four differential equations of the form $$(x_j - a_i)dx_j + (y_j - b_i)dy_j + (z_j - c_i)dz_j = r_{ij}dr_{ij}$$

where $i$ denotes the station and $j$ denotes the position point occupied by the vehicle at the start or termination of a measurement. From these equations one may write the error equation for three readings. This equation involves a twelve by twelve matrix of coefficients and each coefficient is the difference between two fractions. For this reason the matrix is not reproduced here. However it is a completely practical expression and easily handled on a computer. This relationship may then be employed to determine the position of the vehicle by an iterative computation as described elsewhere in this application.

The similarity between the type of measurement performed here and the double-legged measurement in which the vehicle acts as a reflector only is to be noted. The methematical problem is almost identical. An error equation can be written that is similar to that in FIG. 40 but in which each term is the difference of two fractions. This single legged system employing an extra station and measuring the difference between the changes of range may be employed using any of the simpler systems as a base. Furthermore the entire system may be reversed in its operation. Five transmitters may be placed on the ground and the receiving system placed aboard the moving vehicle for the purposes of either navigating in general or for performing a landing upon a landing pad adjacent to the system. It should also be noted that the system is independent of normal drift or excursions of the frequency of the oscillator in the vehicle. If one were to employ the reversed system and desired the highest possible accuracy for a given frequency it would be necessary to employ means for maintaining the phase between the ground transmitters as nearly constant as possible. The only requirement is for constancy over the measurement interval. No particular absolute values need be maintained or known.

Ground controlled land sensor system

A practical embodiment of my invention making full use of its high accuracy and mechanical simplicity is a system for aiding the blind landing of aircraft. One of the prime requirements of a blind landing system is an instrumentality for determining exactly the position, course, and attitude of the landing aircraft relative to the landing runway. The system described here employs a minimum of equipment in the aircraft for this purpose, thereby reducing the maintenance and reliability problems. By separate determination of the exact position of each wing tip and the tip of the tail of the aircraft, my invention provides instantaneous information as to the roll, pitch, and yaw angles, in addition to the position and course of the craft. This information, derived on the ground will be available to both the tower operator and the pilot of the aircraft, the pilot on board receiving his information by radio means. The plane, if properly equipped with remote control, may be landed by a pilot on the ground, the flight pilot on board and the engineer on board standing by. Since the pilot has no more information at hand than the ground operator, and since his display is much more limited because of weight and space limitations, it is to be expected that all high performance aircraft will be landed in the future by operators on the ground who will be much more aware of the landing situation than the pilot. Furthermore, there is also the advantage of having several crewmen on the ground to handle the various aspects of the landing and who will be specialists in this particular phase of the aircraft's operation. Another advantage of controlling the landing operation from the ground is the reduction of equipment required for display in the already crowded cockpit. The equipment required to control the aircraft in the manner of a drone is relatively simple.

If we assume completely blind conditions in which the pilot can see nothing whatever out of the cockpit window, the only information that he has that is not immediately available to the ground observer is the airspeed and power-plant data. These data could be transmitted to the ground controller by means of a conventional telemetering system. However, it is current practice for the engineer to handle the power plant during landing operations, taking his commands from the pilot aurally. It is a simple process to arrange a two way link between the engineer in the aircraft and the ground pilot who will confine his direct control to the airfoils of the aircraft, calling for powersettings and receiving reports on engine status form the engineer aboard the aircraft by radio telephone. Thus one avoids the necessity of telemetering the engine data to the ground pilot.

The information on airspeed is provided to the ground controller without reference to the equipment aboard the flying machine by subtracting the local ground wind on the runway from the observed velocity of the aircraft.

As the angle of attack of the aircraft is changed the angle of the air currents across the pitot tube of the aircraft changes and thereby alters the reading obtainable with the device. If the aircraft is required to slip or slide there is a further alteration of the normal angle of attack of the pitot tube, further indicating the advantages of ground-derived airspeed data.

The elimination of weight and space restrictions from the equipment that can be employed for display purposes increases the sophistication of the systems that may be employed. Furthermore, the use of more automatic functions can be expected. With complete ground control based on the doppler observations, the effects of lag and looseness of gyroscopic and aerodynamic instruments is avoided.

The success of a blind landing system hinges on being able to determine very closely the position, attitude and motion of the aircraft. The polystation doppler system is capable of the accuracy required for such a system.

Attitude of the aircraft is determined by the comparison of the positions of transmitting antennas on the extremities of the aircraft rather than direct measurement of the angles. These measurements may be made with extreme precision close to the ground, and this is precisely the region in which the system is to operate. Attitude control of the aircraft at the higher altitudes during the approach to the landing would be controlled from within the aircraft employing the gyros in the aircraft.

During the actual landing sequence no use is made of the automatic pilot equipment aboard the aircraft other than the actuating devices normally employed to position the airfoils.

The ground equipment could include an automatic programer which would assure that all operations were completed and checked, such as "gear down and locked." Such programming could be set to function on a much broader scale than can now be accomplished with human operators, providing of course that one wished to install and maintain the necessary telemetry equipment aboard the aircraft.

All transmitting equipment for the doppler ground controlled landing sensor system is in the aircraft. All receiving equipment is located on the ground. Special computing techniques and system configurations which are a part of my invention permit the use of ordinary piezoelectric crystal control for stabilization of the frequency of the oscillator in the airborne equipment. The frequency of the ground local oscillator is adjusted by automatic means to provide adequate counting signals. Very high frequencies are employed to reduce the size of the antennae employed on the aircraft and to increase the accuracy of the system. Three small transmitting antennae, 320, 321 and 322, are placed aboard the aircraft, one on each wing tip and one on the tail, as shown in FIG. 26. The airborne equipment shown schematically in FIG. 27 consists of a crystal controlled oscillator 323 whose output is switched sequentially by radio frequency switch 324 from the port antenna 320 to the starboard antenna 321, and to the tail antenna 322. The sequence is then repeated. The rate of switching is slow enough to permit an adequate length in the measuring interval, yet fast enough to allow adequate following of the motion of the aircraft. The switch timing is not critical and is accomplished by ordinary mechanical means. At each switchover the carrier is reduced to zero to provide a signal or a pulse for the initiation of a new count. One measurement of displacement is accomplished by the ground equipment for each transition of the switch 324. The switch actually acts as the timer of the system and sets the duration of each count measurement. The switching would of course be more rapid for highspeed aircraft than for low speed aircraft.

The signals from the aircraft are received on a plurality of receiving equipments 325 located along the runway 326, as shown in FIG. 28. Each receiving equipment on the runway is mounted below the surface of the runway and employs a flush type antenna.

FIG. 28 shows the distribution of the stations 325 in three rows along the runway, one row on each longitudinal edge and one row down the middle. Station 327 is located at the end of the runway and has a high gain antenna pointing down the runway. This station consists simply of a phase locked oscillator 328, shown in FIG. 29, which provides the mixing signal for the other stations at the identical frequency of the signal received by its antenna 327a. If the signal strength is sufficient then the phase locked oscillator 328 may be replaced by a simple radio frequency amplifier, otherwise this oscillator may be connected as previously described. Station 327 has no measurement function. Each of the runway stations 325 measure the difference between the change of range to the antenna thereof and the change in range to the antenna of station 327 at the end of the runway.

FIG. 29 also shows a schematic diagram of connections of the individual runway station 325. Each of these stations includes an antenna 329, mixer 330, and the low frequency amplifier 331. The single output from each receiving equipment is transmitted to the sequence switch 333 of the control center over the line 332. Each receiver along the runway has its own line to the sequence switch of the control center. By means of this sequence switch 333 a group of six receiving units is selected to form, with station 327, a system of seven active units, six of which are just behind the aircraft. As the aircraft proceeds down the runway the receiver units forming the group are changed so that group forming the active system is effectively maintained just behind the aircraft. Timing of the measurements is no direct problem in this system since all receivers are turned on and off together. The duration of the count is of no importance in the calculations of the position of the aircraft relative to a particular system of stations at the time when the measurement is started and when the measurement is terminated. All of the receiving equipments employ the same mixing signal which is transmitted to all receiver units from the phase locked oscillator 328. This oscillator is locked on a signal from a high gain antenna 327a located at the end of the runway and directed along the runway and in the direction in which the aircraft lands so that it receives a signal from the oscillator 323 on the aircraft. Thus the mixing signal supplied from oscillator 328 to mixer 330 is just lower than the lowest possible frequency in the spectrum covered by the Doppler shifted signals from the aircraft. One should be reminded that, although in this system one can control the frequency in this manner, one is not burdened with maintaining any particular phase adjustment between the receivers. This freedom from phasing problems is one of the significant aspects of my invention.

At the control center the output signals from the selected group of stations are amplified by amplifiers 334 and the cycles thereof are counted. Each time there is a pause in the received signal, as is caused by the switching in the aircraft, the counters 335 are read out to the computer 336 and recycled. The computer operates to solve in turn for the position of each of the aircraft extremities that carries an antenna. The position calculations are sorted by a sequence switch 337 which has the same sequence as the antenna sequence switch 324 in the aircraft. The switch advances one position each time a new computation is obtained from the computer. The position coordinates immediately indicate the desired position of the switch as any but the true position would require the aircraft to be moving down the strip backwards or sidewards. The data thus derived may be employed to position a model of the aircraft in the air above a model runway so that it could be guided down to a landing by an operator watching the model.

Alternately, a display may be arranged which simulates for the ground pilot the cockpit of the aircraft. Such simulators are already in a high state of development for use as trainers. Also a system providing a television camera that is moved along a model of the runway including all nearby buildings and other hazards may be used. The television camera is directed from the position information derived from the computer 336. The television signal may be relayed to the aircraft so that the crew could actually watch the landing in process. The picture tube may be placed before the pilot so that he can perform the landing with this aid.

Various modifications are possible in this system, and the goal of course is to provide, under conditions of zero visibility, the same traffic capability that exists in perfectly clear weather. The system shown provides equipment useful in accomplishing the final approach and actual touchdown after the aircraft is over the approach area of the runway. Less precise equipment would be required to direct the aircraft during other phases of the approach. Depending upon local conditions, this part of the approach may be controlled by the air traffic control system described herein. Also the number of receivers 325 on the runway may be reduced substantially by resorting to one of the multiple reading configurations described elsewhere in this application.

The seven station single reading system described herein permits independence of minor variation in the frequency of the vehicle oscillator and normal piezoelectric means are adequate for its stabilization without the necessity of thermal control thereof or other special precautions. There is no problem of sense determination in this application because the direction of the aircraft is known and the receiver 327 at the end of the runway is subject to the greatest Doppler shift. Since this receiver provides the mixing signals for all the other receivers, the beat from each receiver can have only one sense meaning.

The signals from the antennas on various extremities of the aircraft may be frequency-multiplexed rather than time-multiplexed as shown. This method would make possible longer observation but requires additional equipment. The method of solution of this system is very much the same as that for the six station single-legged single-reading system. Iterative computation is used and the error equation is identical with the exception that each coefficient is formed of the difference of two fractions instead of the sum. FIG. 39 shows the double-legged error equation. Station No. 1 in that equation may represent a receiver, the rest of the stations being transmitters or the reverse may be true. In the present system the No. 1 station in the equation corresponds to the Station No. 1 which is located in the end of the runway.

Mortar locator

It has long been a problem in infantry warfare to determine the position of hostile cannon, mortars, and other missile launching devices so that counter fire might be directed against such sites. The arts of modern war have not eliminated this requirement. The great progress in the miniaturization of computing elements has made the computer a battlefield tool. Since the purpose in this application is not to shoot down the shell but to detect the position of the launcher, one can gather data over a very substantial portion of the trajectory of the shell and take much more time for completing the calculation of the track accomplished from the data obtained. The system may also be used to adjust friendly fire. Whereas other mortar detection equipment has in the past depended upon the use of radar tracking devices employing large parabolic reflectors, my invention makes possible the use of whip antennas or other such antennas of low gain which are much less conspicuous. The requirements of this system do not include the simultaneous tracking of a number of missiles. However it is required that the system be able to track a single target even though there may be several targets in the air simultaneously. This system is relatively simple and therefore requires somewhat more effort in use than a more elaborate and consequently heavier system. To simplify the equations which must be solved and to keep the number of stations to an absolute minimum the system configuration consists of four stations in a plane as shown in FIG. 31. Small deviations from the planar condition such as are expected under battlefield conditions affect the accuracy of the system but do not disable it. The calculations involve only the solution of three simultaneous linear equations and the separate solution of a quadratic equation in one variable. A system employing five stations may be employed which does not require that the stations be located in a plane. Alternatively a system employing three stations could be devised if it were possible to position the stations along a line and to get along with two dimensional information regarding the path of the vehicle. The battlefield equipment may be arranged to work in a number of different modes dependent upon particular conditions existing on the battlefield at a given time. A further use for this type of system is the location of a submarine which fires a rocket missile such as the Polaris. In this instance there may be the additional problem of getting sufficient data to shoot down the missile. However there is also a prime requirement for locating the submarine before it can discharge the rest of its rockets. The system to be described here may be placed aboard four small naval craft whose position relative to each other is known and adjusted through radar readings. The coplanarity requirement is more easily met with ocean vessels since it is only necessary that they maintain their positions so that they are on a common circle. Again errors in exact location in the plane is not disabling to the system. Furthermore, for naval use the ship could carry a computer that is more sophisticated and able to handle a three dimensional station distribution by use of an iterative solution.

In both the land and the naval systems it is desirable to avoid the necessity of communications between stations in the performance of the tracking operation. It would be desirable to employ a single receiving station and have all the rest of the stations be transmitters. However two advantages are gained by employing two receiving stations; namely, (1) the number of stations required for this reflective type system is reduced by one, whereas without the use of the second receiver five stations would be required in the system, and (2) the second receiver makes possible the resolution of ambiguity under conditions when two or more targets enter the field of the system simultaneously. The communications between the two receiving stations need not be carried on during the actual tracking of the missile. Rather the complete recorded data for the entire track may be communicated to the station or vessel carrying the computer after the tracking operation is completed if desired. The data itself is in digital form and need not be voluminous in most applications. A dozen or so readings containing perhaps a dozen or so digits each would be enough to provide a great deal of information relative to the track and initial point of the track. This figure would also include the necessary timing information. In the land based system shown here data is transferred by analogue means.

To make possible a closed solution in the simplest form, the double legged information originally collected by the receiving stations is converted into single legged data. This data is then employed in a very simple computation to determine the positions occupied by the vehicle at each counting point. Two methods of computation employing single legged data are available. In one method four readings must be taken for a complete solution and a set of four linear equations in four unknowns results. In another method only three measurements need be made but one must solve a quadratic equation. The relative accuracies of the two methods and the relative ease of carrying out the computation process determines which method is employed in a particular application.

As mentioned elsewhere in this application there is a reduction of sensitivity in a C.W. system in which a station must detect the echo from its own transmission. Since the echo signal is only removed from the transmitted carrier by the amount of the Doppler shift the unavoidable residual noise near the carrier tends to mask the fainter echos. This interference of the receiver by the transmitter at the same station is greatly reduced if the receiver and transmitter operate at different frequencies.

In order to reduce double legged data to single legged data in any system comprised of four or more stations it is only necessary that one of the stations has the capability of transmitting and receiving, and it is not necessary that that station be capable of receiving the echos of its own signal. When one element of single legged data can be determined in some manner this element of information may be employed to convert all other double legged data into single legged data. In this system the required initial element of one legged data is derived from the data derived from three of the four stations of the system, one of these stations being the only station in the system which transmits and receives, another of the stations being a receiving station, and another being a transmitter station. The fourth station in the system is a receiving station and while double legged data is taken from it simultaneously with the other stations this double legged data is not employed to obtain the initial single element of single legged data. The double legged data from the fourth station is combined with the initial single legged data derived from the double legged data from the other three stations to provide the complete set of single legged data desired for a closed algebraic solution. FIG. 30 shows the relationship between the three stations used to derive single legged data. Only station 351 both transmits and receives. Station 350 transmits only and station 352 receives only. Station 352 and station 353 receive and measure data from both station 350 and station 351. Station 351 receives only from station 350 and does not record the echo of its own signal. Station 350 and station 351 transmit on different frequencies. Therefore station 351 transmits and receives on different frequencies. Stations 352 and 353 receive on two frequencies and are thereby able to distinguish between echos received from the two transmitters.

The computational procedure for deriving the desired single legged data from the observed double legged data is very simple and is as follows Let
$$(r_{12}+r_{22})-(r_{11}+r_{21})=p_{12}$$
$$(r_{22}+r_{32})-(r_{21}+r_{31})=p_{23}$$
$$(r_{12}+r_{32})-(r_{11}+r_{31})=p_{13}$$

where:

The $r$'s are the ranges indicated in FIG. 30, the first subscript indicating the number of the station and the second subscript indicating the number of the point representing the position of the vehicle at the beginning or ending of the measurement.

The $p$'s are the measured quantities, the first subscript representing the transmitter associated with the measurement and the second subscript representing the station where the signal was received. The following relationships are derived from the above equations:

$$r_{12}-r_{11}=\tfrac{1}{2}(p_{12}-p_{23}+p_{13})$$

This is the single legged data of change in range desired for the closed solution and is denoted by $m$ elsewhere in this application. Similarly the following equations are obtained $$r_{32}-r_{31}=\tfrac{1}{2}(p_{13}-p_{12}+p_{23})$$
$$r_{22}-r_{21}=\tfrac{1}{2}(p_{13}-p_{12}-p_{23})$$

Thus the change in range from each of the three stations is determined. The change in range from the fourth station is determined by subtracting the range data from one of the transmitters from the double legged data obtained by the fourth station using that same transmitter. Either transmitter would serve this purpose. Since the fourth station is capable of receiving from both transmitters redundant data becomes available for other purposes including resolution of ambiguity.

FIG. 31 shows the complete system. The frequency of each transmitter is controlled by its own crystal oscillator and this frequency is different from that of the other transmitter. In this application there is no problem of maintaining the frequencies to great accuracies since the receivers are synchronized to the transmitters by receiving directly the radiation from the transmitters. This mode of operation is possible in this case because of the relatively small distances involved. Both station 353 and station 352 have two receiving units, one for each transmitter. The transmitters are extremely simple being merely crystal controlled continuous wave generators coupled to their respective antennas. The echo signals received at each receiver unit are detected and modulated in such a manner that the signals may be conveniently amplified and transmitted to the control center 354 where they are recorded on magnetic tape simultaneously with the signals from the other receiver units. Timing signals are easily applied to the tape along with the signals from the receiving units. Other ancillary data may be included also. Tape recorders with multiple tracks adequate for this purpose are common on the market. The timing signals are not required for the determination of the path of the vehicle. However they would be required when one wishes to determine the velocities as well.

The purpose of the tape recording is to allow a more thorough examination of the signals and to permit the determination of the projectile path with less equipment. Only one counter would be required to break down the data on the tape as the tape may be replayed as many times as necessary each time counting a different signal until all the signals from all the receiving units have been measured. Another purpose in the recording is to relieve crews of the necessity of continuous watch. Automatic equipment not shown may be employed to start the tape recorder when a signal is received so that a complete record is attained of a sudden firing after a period of quiet. The data reduction process will be described subsequently.

FIG. 32 shows the receiving unit of which station 351 has one, tuned to the frequency of the transmitter at station 350, and of which station 352 and station 353 each has two, one tuned to each transmitter. The operation of the receiving unit is very simple. Signals are received on antenna 355 directly from the transmitter to which it is tuned and from the target as reflections, the signal from the transmitter being substantially larger in amplitude than the echo signal. The signal from the antenna is fed into isolation amplifier 356 whose main function is to prevent signals from phaselocked oscillator 357 from going back into the antenna circuit. From the isolation amplifier 356 the signal goes to phaselocked oscillator 357. This oscillator closely tracks the signal received from the transmitter because that signal is much larger than the echo signals. In some situations it might be possible to operate the system without the phase locked oscillator 357, employing in its stead the amplified signal directly from the transmitter or perhaps even without amplification. However the system shown is more applicable to the wide variety of signal strengths and background noise found under field conditions.

The signal from the antenna 355 is then amplitude modulated by modulator 358 with a sinusoidal wave derived from modulation oscillator 359. This modulation frequency is somewhat higher than the maximum frequency shift expected due to the doppler effect. The purpose of the modulation is to provide a carrier signal for amplification and transmission subsequent to detection in mixer 360 and mixer 361. Mixers 360 and 361 are fed mixer signals from phase locked oscillator 357 through phase shifters 362 and 363 so that the mixing signals applied to the mixers are ninety degrees out of phase with each other. Bandpass filters 364 and 365 have their pass band centered on the modulation frequency and have a bandwidth sufficient to contain the frequencies present because of the doppler shift. The signals from the filters are then amplified in amplifiers 366 and 367 which have output impedances suitable for matching the transmission lines to the control center. The signal is amplified and recorded on magnetic tape at the control center as stated before.

The process and apparatus for analysing the signals on the tape will be described in connection with FIG. 33. It is not necessary that electrical connections be made between all of the units. Data may be transferred between the printer and computer in the form of punched tape for instance, or on cards.

Each of the receiving units has a separate pair of tracks on the tape 370. The signals on each track of a given pair are ninety degrees out of phase with each other. The pair of tracks from one receiving unit may of course contain the recorded echo signals of two or more targets. The pair of signals for any particular target will, after detection by detectors 371 and 372, be ninety degrees out of phase with each other and the relative phase position between the two will be determined by whether the two legged distance from transmitter to target to receiver is increasing or decreasing. After amplification in amplifiers 375 and 376 the signals fed into the pulse forming network 377 shown in FIG. 33. The pulses from this circuit drive the reversible counter 378 which in turn drives printer 379. The timing signal from the tape is also fed into the printer so that a complete set of printed data of count versus time is obtained. This data is fed into the correlator 380 from whence it proceeds to computer 381 and thence to plot board 382 and chart recorder 383. Since there may be echos from more than one target on the pair of tape tracks being examined means are provided for tracking one pair of signals by regulating the speed of the tape drive so as to produce a nearly constant frequency at the output of amplifier 376. A signal from this point is fed into synchronous detector 384 which also receives a signal of constant frequency from oscillator 385 which determines the operating frequency of the channel. When the signal from amplifier 376 is exactly ninety degrees out of phase with the signal from oscillator 385 there is no D.C. output from the synchronous detector 384. When the signal from amplifier 376 departs from this ninety degree relationship there is a D.C. signal from the synchronous detector 384 which is employed to control the speed of the drive on the tape transport. The signal from the synchronous detector 384 is fed through low pass filter 386 which has suitable characteristics for use in the servo loop of which it is a part. From the filter 386 the signal controls the motor servo unit 387 which in turn controls the tape drive motor 388. Band pass filters 373 and 374 are placed between detectors 371 and 372 and amplifiers 375 and 376 to reduce the amplitudes of all signals of frequency other than the frequency being tracked. The center frequency of these filters is of course that of the oscillator 385.

In the above manner already described one obtains a system which is the geometrical equivalent of a system in which the change in range from the target to each station is measured directly.

When four stations are located in a plane one can write the following equations $$\alpha_1 r_1^2 + d_2 r_2^2 + \alpha_3 r_3^2 + \alpha_4 r_4^2 = K_1$$

$$\alpha_1 M_{11} r_1 + \alpha_2 M_{21} r_2 + \alpha_5 M_{31} r_3 + \alpha_4 M_{41} r_4$$
$$= -\tfrac{1}{2}(\alpha_1 M_{21}^2 + \alpha_2 M_{21}^2 + \alpha_3 M_{31}^2 + \alpha_4 M_{41}^2)$$

$$\alpha_1 M_{12} r_1 + \alpha_1 M_{22} r_2 + \alpha_3 M_{32} r_3 + \alpha_4 M_{42} r_4$$
$$= -\tfrac{1}{2}(\alpha_1 M_{12}^2 + \alpha_2 M_{22}^2 + \alpha_3 M_{32}^2 + \alpha_4 M_{42}^2)$$

$$\alpha_1 M_{13} r_1 + \alpha_1 M_{23} r_2 + \alpha_3 M_{33} r_3 + \alpha_4 M_{43} r_4$$
$$= -\tfrac{1}{2}(\alpha_1 M_{13}^2 + \alpha_2 M_{23}^2 + \alpha_3 M_{33}^2 + \alpha_4 M_{43}^2)$$

where the L's and the K are constants depending upon the location of the station within the plane and the M's are the single legged measurements as described elsewhere in this specification. These equations are sufficient to determine the ranges to each of the four stations, whose position is known. The computation process is facilitated by solving the three linear equations for three of the ranges keeping the fourth as a constant. These three may then be substituted in the fourth degree equation to obtain a single quadratic equation in one unknown. After finding the four ranges conversion to cartesian coordinates is routine and will not be described here. If iterative processes are to be employed the associated error formula is shown in FIG. 40 for the four station—three reading configuration. If a completely linear solution is desired a fourth equation, $$\alpha_1 M_{14} r_1 + \alpha_2 M_{24} r_2 + \alpha_3 M_3 r_3 + \alpha_4 M_4 r_4$$
$$= -\tfrac{1}{2}(\alpha_1 M_{14}^2 + \alpha_2 M_{24}^2 + \alpha_3 M_{34}^2 + \alpha_4 M_{44}^2)$$

may be derived as above.

Alternative circuits

The phase locked oscillator, several improved variations of which are shown in the various modifications of my invention, is a well known circuit component. This type of circuit is also variously known as a "phase locked loop" and as a "tracking filter." Simplified phase locked oscillators are shown in FIGS. 13, 17, 18, 22, and 32 as devices 130, 220, 230, 291, and 357, respectively, and the circuit shown in FIG. 34 may be used in place of these devices. It is the function of this circuit to generate a continuous wave signal that is of the same frequency and phase as the incoming signal that it is tracking but with greater power and reduced noise. In the circuits referred to above the D.C. and low frequency control voltage is obtained from the mixer and filtered and amplified in a low pass amplification circuit. The circuit shown in FIG. 34 is an improved phase locked oscillator in which the problems of D.C. amplification and of stabilizing the D.C. output characteristic of the mixer are circumvented. This circuit may be operated directly from the antenna or it may be employed in circuits where the signal has undergone considerable translation or other processing. This circuit is an excellent substitute for the circuits numbered above. The circuit shown in FIG. 34 operates in the following manner. The signal is received on antenna 400 and amplified in amplifier 401 in the conventional manner. Amplifier 401 must have a sufficiently broad bandwidth to cover the entire frequency spectrum of operation of the phaselocked oscillator, since the tuning of this amplifier is not variable and does not track the frequency of the input signal. The signal is then modulated with a simple sinewave modulationed signal adding a pair of sideband signals to the original unmodulated signal. This modulated signal is then amplified in amplifier 403 whose bandwidth, like that of amplifier 401, is sufficiently broad to accommodate the entire frequency excursions of the incoming unmodulated signal. In addition the bandwidth of amplifier 403 must be wide enough to accommodate the modulation as the total signal spectrum moves as a result of the doppler effect, equipment instabilities, or other causes of frequency shift. Amplifier 403 is tuned to the same center frequency as that of amplifier 401. Also like amplifier 401, amplifier 403 is fixed tuned; the tuning does not follow the frequency shift of the signal being tracked. The modulated signal then enters mixer 404 where it is mixed with a signal from voltage controlled oscillator 409 to produce a signal of the modulation frequency. All other signals from the mixer are suppressed by filter 405. Filter 405 is a bandpass filter whose bandwidth is just wide enough to pass the modulation frequency and may be sharply tuned. The signal from the filter 405 is amplified by conventional means in amplifier 406 and fed into synchronous detector 407. The output from detector 407 contains D.C. and low frequency components that are employed to control the frequency of voltage controlled oscillator 409. Filter 408 is a low pass filter and removes all high frequency components such as carrier frequency signals from the control signal. The exact design of filter 408 determines the response characteristics of the over all phaselocked oscillator. When the signal output of the voltage controlled oscillator is of the same frequency as the center frequency of the signal input to mixer 404 and ninety degrees out of phase with that signal there is no detectable signal of modulation frequency at the output of the mixer 404. When the input signal or the oscillator signal shifts in phase so that a component of the modulated signal input to mixer 404 is in phase with the mixing signal from voltage controlled oscillator 409 there appears at the output of the mixer 404 a signal of modulation frequency whose polarity is determined by the direction of the phase shift. This signal of modulation frequency is either directly in phase with the modulation signal applied to modulator 402 from oscillator 410 or directly out of phase with that signal. This signal then is approximately proportional to and of the same sign as the phase displacement from the standard ninety degree relationship between the two inputs to mixer 404. The synchronous detector provides a D.C. output of one polarity when the error signal fed to it from amplifier 406 is in phase with the synchronizing signal fed to it from oscillator 410 and a signal of the opposite polarity when the two input signals are of opposite phase. The D.C. control voltage from synchronous detector is essentially proportional to the amplitude of the signal output from amplifier 406 since the signal from oscillator 410 is normally at a greater signal level than the output of the amplifier 406. The filtered output of synchronous detector 407 is connected of such polarity to the control circuit of voltage controlled oscillator that original phase error is reduced or eliminated. The oscillator 410 operates at a convenient low frequency and requires no particular stabilization other than that its frequency should remain in the pass band of filter 405.

For the purposes of the systems described in this application the fact that there is ninety degrees between the phases of the input signal and the signal from the voltage controlled oscillator, which is the output signal of the circuit, is of no consequence. In other applications a ninety degree phase shifter could be placed at the output of the voltage controlled oscillator 409 so that the signal from it would be nominally in phase with the signal input to the circuit.

The output of this circuit may be fed to a frequency meter or a counter which when a proper frequency or time standard is employed would provide a complete doppler receiving station.

FIG. 35 shows a doppler receiving station of a rather elemental variety in which all of the essentials are present. In this system the time required for a predetermined number of cycles of the transmitted wave to arrive at the receiving antenna is determined. From this data the change in range that has occurred during the measured interval is found by use of the following relationship $$r_2 - r_1 = C(T - Q/f)$$

where:

$r_1$ is the range at the beginning of the measurement.
$r_2$ is the range at the end of the measurement.
Q is the number of cycles arriving at the receiving station during the measurement.
C is the velocity of propagation.
T is the time elapsed during the measurement.
$f$ is the frequency of oscillations emitted from the vehicle being tracked.

This expression may alternatively be written $$r_2 - r_1 = \lambda(Q_t - Q_r)$$

Where:

$Q_t$ is the number of waves transmitted during the measuring interval.
$Q_r$ is the number of waves received during the measuring interval.
$\lambda$ is the wavelength corresponding to the frequency of the transmitter.

It is of course readily apparent that these equations are approximations valid only for vehicles that are travelling at velocities slow compared to that of the wave propagation. The corrections that must be applied for extremely high velocities are not presented here. In FIG. 35 the signal is received by antenna 411, amplified in a conventional amplifier 415 and fed into a scaler 416 where the frequency is divided by flip-flop or multivibrators to a convenient value. Signals from this scaler are then employed to turn counter 417 which counts the number of cycles of oscillation of a signal from oscillator 418. Several such stations may be used to form a system as described elsewhere in this application. If several such identical receiving stations are employed in a system to measure the signal from a moving continuous wave transmitter it will be seen that as each receiver counts the same number of cycles of the transmitted wave the time required for each receiver to make the count is different and one may be inclined to doubt the validity of the geometric model that is employed in the system. However the error described in only that owing to the change in the position of the transmitter during this extremely slight time difference. For vehicles moving at practical velocities and at practical ranges this approximation is of no consequence.

FIG. 36 shows another elemental doppler receiving and measuring station employing the technique of measuring the number of cycles that occur during a predetermined time interval. The time interval of the measurement is set by the period of the oscillator 423. In practice this oscillator would probably operate at a higher frequency than that required for the timing signal and would be reduced to that frequency by a scaler. However in principle the time duration of the count by counter 422 is set by the period of oscillator 423. The counter receives the arriving signal through antenna 416 and amplifier 421.

Several such stations may be employed to track a moving transmitter as described elsewhere in this application. The applicable equation relating count and displacement is shown in the explanation of FIG. 35. Receiving circuits of the types shown in FIG. 35 and FIG. 36 may be employed in many of the systems described in this application. They may be employed in conjunction with the phase locked oscillator described in FIG. 34. They may be employed in both the tracking and navigation systems and in single legged and double legged systems, and in systems were the frequency of the moving transmitter is not precisely known.

Iterative solutions

The equations which express mathematically the relationships between the measured changes of distance (or rates of change of distance) and the position coordinates of the moving target are simple and easily derived from the pythagorean theorem. To make practical use of these relationships it is only necessary to find values of the unknowns that satisfy the equations for any given set of measured values. This proces is in general greatly simplified by the use of trial and error methods. It is not necessary for the purposes of practical utilization of the system disclosed herein to derive an algebraic closed solution to the particular set of equations that describe a particular system if one has a practical method or routine, which, when followed by manual or machine means, will yield the values of the unknown quantities which satisfy the equations in a practical length of time. It is often the case that too much emphasis is placed on the algebraic solution of equations to prove the workability of a device or system. Using my methods there is a relationship between the measured values and the values of the quantities that it is desired to know. Furthermore, this relationship is such that practical accuracies of the measurements correspond to practical accuracies for the unknown quantities. I also have derived expressions for the relationship between the errors of measurement and the consequent errors in the determination of the desired unknown values. In addition to providing a means of determining the expected accuracy of a given system when the errors in measurements are known these error formulas provide a method for the expeditious determination, by the process of iterative approximations, the values of the unknown coordinates of the target to any degree of accuracy desired. The accuracy of the process of iterative approximations is limited only by the fundamental geometrical relationships inherent in the system. It is the accuracy provided by these fundamental geometrical relationships that are described by the error formulas and determine the accuracy of a given system for given errors in the fundamental measurements.

Solutions by this "trial and error" process are carried out in the following manner:

(1) An approximation of the true answer is attained in one or more of several ways, which will be described later as it varies with the design details and objectives of each particular practical system.

(2) This approximate answer is employed together with the fundamental equations expressing the geometrical relationships of the system to attain values of the measured quantities which would have resulted had the target coordinates been exactly equal to the assumed approximation values. The differences between the synthetic measured values and the true measured values may then be employed in the error formulas to obtain the corresponding error in each of the assumed approximate coordinates of the target. The values of the coordinate errors may then be employed as corrections to be added to or subtracted from the approximation values according to the sign of the error value. Thus a new and closer approximation is attained. The process is repeated employing the new approximation.

The iterative process described is only valid for a finite region of variation in the neighborhood of the desired true values of the unknown coordinates. To result in a useful solution the interative process must converge; the values of the errors as given by the error formulas must decrease as the process continues. This region is known as the "region of convergence." To be useful the original approximation must lie within this region of convergence. The material presented here so far is common to the art of solving nonlinear equations such as those employed to describe my systems and is often used in computing machines where it is particularly effective because of the ability of the machine to perform such a process with great rapidity. This process is also employed for solving large sets of linear equations by machine computation as it is easier for the machine to handle than the closed algebraic solution in these instances.

The error formulas are derived simply by differentiation of the equations resulting from the Law of Pythagorus and the equations expressing the relationship between the measured changes of range and the ranges.

First let us consider the case where the displacement of the target radially from each of six stations is measured simultaneously with each of the other five stations. As stated before equations $$(x_1-a)^2(y_1-b)^2+(z_1-c)^2=r_1^2$$

$$(x_2-a)^2+(y_2-b)^2+(z_2-c)^2=r_2^2$$

can be written for the range between each station and two successive points $x_1y_1z_1$ and $x_2y_2z_2$ along the path of the moving target between which a displacement measurement is made. The symbols are indicated in FIG. 1. We may differentiate these equations to obtain $$(x_1-a)dx_1+(y_1-b)dy_1+(z_1-c)dz_1=r_1dr_1$$

$$(x_2-a)dx_2+(y_2-b)dy_2+(z_2-c)dz_2=r_2dr_2$$

where $dx$, $dy$, $dz$, and $dr$ are infinitesimal increments in the indicated variables. There is in addition an equation relating the value of displacement measurement to the values of the two ranges:

$$r_2-r_1=m$$

Where $m$ is the measured value of the displacement. Differentiating:

$$dr_2-dr_1=dm$$

where $dm$ is the infinitesimal change in displacement. Dividing by the $r$'s and substituting in this last equation we have $$\frac{x_2-a}{r_2}dx_2+\frac{y_2-b}{r_2}dy_2+\frac{z_2-c}{r_2}dz_2-\frac{x_1-a}{r_1}dx_1$$
$$-\frac{y_1-b}{r_1}dy_1-\frac{z_1-c}{r_1}=dm$$

One each such equation may be written for each displacement measurement made by each station of the system. FIG. 38 shows an error equation for the six station—single reading-single legged—displacement measurement system such as the second system described in this application and called Multiple Displacement Finders. This equation is merely a way of writing the six simultaneous equations as one matrix equation. FIG. 40 shows an error equation for a four station-single legged-three reading system such as the system called Four Station Tracker also described in this application.

The equivalent equation for so-called two-legged systems, reflecting systems in which the wave is transmitted by a fixed transmitter to be reflected by the target to a receiving station remote from the transmitter, is very similar. The equation relating the incremental distance measurement to the ranges is:

$$(r_{12}+r_{22})-(r_{11}+r_{21})=p_{12}$$

and differentiating $$dr_{12}+dr_{22}-dr_{11}-dr_{21}=dp_{12}$$

The first subscript represents the station, the second subscript represents the position of the vehicle at the initiation and termination of the measurement and $p$ represents the change in the total distance from transmitter to target plus target to receiver. As before there are equations representing the relationship between the range from each point to each station to the cartesian coordinates of that point and that station which when differentiated provide:

$$(x-a)dx+(y-b)dy+(z-c)dz(dz=rdr)$$

There are four equations for this two legged case. When these equations are combined with the one relating the infinitesimal changes in ranges to the infinitesimal change in the measured total distance increment provide the following single equation:

$$\left[\frac{x_2-a_1}{r_{12}}-\frac{x_2-a_2}{r_{22}}\right]dx_2+\left[\frac{y_2-b_1}{r_{12}}-\frac{y_2-b_2}{r_{22}}\right]dy_2$$
$$+\left[\frac{z_2+c_1}{r_{12}}-\frac{z_2-c_2}{r_{22}}\right]dz_2$$
$$\left[\frac{x_1-a_1}{r_{11}}-\frac{x_1-a_2}{r_{21}}\right]dx_1-\left[\frac{y_1-b_1}{r_{11}}-\frac{y_1-b_2}{r_{21}}\right]dy_1$$
$$-\left[\frac{z_1-c_1}{r_{11}}-\frac{z_1-c_2}{r_{21}}\right]dz_1=dp_{12}$$

A set of six such equations, one for each receiver, represents the error relationships for the reflecting system employing six fixed receivers and one fixed transmitter.

FIG. 39 shows an error equation for a seven station-two legged-single reading-displacement measuring system. This equation is appropriate for systems employing either six transmitters and one receiver or six receivers and one transmitter. Station number 1 is the singular station in this equation. This equation applies to the Air Traffic Control described in this application.

One advantage of these equations is that the solution is obtained directly in cartesian coordinates which is the system in which the data is usually employed. Coordinate conversion is not necessary as is the case when the solution is in terms of the ranges of the target from the station.

A practical consideration in the design of the so-called one legged system is the stability of the standard oscillator in the moving vehicle. The causes of this error are discussed elsewhere in this application. The effect on the computational problem is to introduce another variable into the equations which represent the geometry of the system. This variable has no true geometrical counterpart. To compute the position coordinates in the manner that has been shown it is necessary to find one or more additional equations, the number needed depending upon the system. Fortunately, there are two means for providing these equations by either increasing the number of fixed stations of the system or taking additional readings with the equipment at hand. When additional readings are taken it is necessary to assume that the oscillator in the vehicle is of constant through unknown frequency. When an additional station is employed no such assumptions are required. In either case one has the option of solving for the frequency (or the average frequency).

The equations that have been shown so far all relate distances to other distances or distances to time. In order to employ these relationships conveniently one may express the unknown frequency error in terms of distances or radial speeds. The relationship between frequency error and measured displacement is quite direct and may be expressed as follows:

$$r_2-r_1+B=M$$

Where B is the error in range produced by the average error in frequency over the interval of the measurement. As before:

$r_1$ represents the range at the start of the measurement interval.
$r_2$ represents the range at the end of the measurement interval.
$m$ represents the indicated change of range during the measurement interval.

Differentiating this equation:

$$dr_2-dr_1+dB=dm$$

We may now employ the relationships previously derived between the infinitesimal changes in the cartesian dimensions and the infinitesimal changes in range to write equations of the type:

$$\frac{x_2-a}{r_2}dx_2+\frac{y_2-b}{r_2}dy_2+\frac{z_2-c}{r_2}dz_2-\frac{x_1-a}{r_1}dx_1$$
$$-\frac{y_1-b}{r_1}dy_1-\frac{z_1-c}{r_1}dz_1-dB=dm$$

FIG. 41 shows the error equation for a seven station-single reading-single legged system permitting determination of the error in the vehicle standard frequency as well as the position coordinates when employed in the iterative process described.

Similar equations formulated from the above relationship may be written for a variety of multiple reading and single reading system configurations in addition to the six-one relationship shown. A multiple reading system for which such an error equation may be written is described herein and is called Sensor System for Aiding the Guidance of Vertical Landings. In this case the average frequency error during each of the three readings may be determined if desired. The system associated with this equation would have six fixed transmitters and a receiver in the vehicle or six fixed receivers and a transmitter in the vehicle depending upon whether the system was for tracking or navigating. The Ground Controlled Landing Sensor System described in this application is associated with this equation. The equation can be written as a six by six if one does not wish to determine the error in the vehicle frequency standard, but wishes to maintain the determination of the position coordinates independent of the frequency error. The equation then appears remarkably similar to that of the seven station-double legged system shown in FIG. 39. The greatest difference being that the individual coefficients are composed of the differences of fractions rather than the sums.

The equation shown directly above is also fundamental in the formulation of the error equation for systems with multiple readings in which the frequency of the standard oscillator in the vehicle remains constant during the required measurements of radial displacement or velocity. Such a system is the Navigation System described herein. The error equation is not included here but is easily derived by maintaining the variable $dB$ the same in the equation for each reading and multiplied by number of the reading. Here again it is possible to remove the frequency term from the matrix equation if one only wishes to determine position coordinates without knowing the frequency of vehicle standard oscillator.

An insight to the differential equations relating infinitesimal range increments to infinitesimal increments in cartesian coordinates may be obtained by writing the difference equation.

$$2(x-a)\Delta x+2(y-b)\Delta y+2(z-c)\Delta z+(\Delta x)^2+(\Delta)^2$$
$$+(\Delta z)^2=2r\Delta+(\Delta r)^2$$

Where $\Delta x$, $\Delta y$, $\Delta z$, and $\Delta r$ are the incremental variation in each variable.

It is seen that when the increments are sufficiently small the values of their squares become negligible compared to the values of other terms in the equation and there results the differential equations already listed. In using the resultant differential equation in interative solutions the values of the increments are finite and the condition $$(\Delta x)^2+(\Delta y)^2+(\Delta z)^2=(\Delta r)^2$$

is not exactly met. This situation leads to solutions for the errors which are not exact but are only approximations themselves. These values are then used to establish a closer approximation of the true position coordinates. It is to be observed that this equation is a relationship between the cartesian coordinates, the infinitesimal variations in the cartesian coordinates, and the infinitesimal variations in the range displacement. For our purposes we use this equation to relate the relationship between the infinitesimal variations as a function of the coordinates of the positions of the target at the beginning and at the end of the displacement measurement. The equation is linear permitting the use of conventional and well developed methods of both manual and machine computation. The use of these equations for the determination of the accuracy of a given system is dependent upon how accuracy is defined by those working with the system. In some instances one wishes to determine the most probable error, in others it is desired to determine the maximum possible error, and there are other definitions. In error studies the value of dm represents the error in the measurement of the displacement by the station and is determined by the mechanics of the measurement itself. We have then, for a single measurement system, one error equation for each system. For the six station system there are six equations. There are also six unknowns $dx_1$, $dy_1$, $dz_1$, $dx_2$, $dy_2$, $dz_2$. There is the resultant set of six simultaneous independent equations which may be solved for the six unknowns for any point along the path of the vehicle between which a displacement measurement is made by each of the six stations with a known error, dm. One familiar with the art is able to determine the system accuracy from this set of equations according to his particular accuracy criterion.

One may employ the set of error equations in a limited region in the neighborhoods of the two points to attain corrections to the approximate positions that are assumed in order to initiate the iterative process. The infinitesimal errors in displacement values are initially of finite size and are known because the synthetic displacement calculated from the two assumed points is known and the measured values, which are assumed to be true values, are known. The difference between the synthetic value and the measured value constitutes the error infinitesimal of displacement, dm. The set of equation is then solved for the errors or corrections to be applied to the assumed approximate coordinates of the two points. The correction values are not those necessary to achieve an exact solution in one step as the process of differentiation by which the error equations were derived leaves us with equations which are only approximate themselves for finite values of the infinitesimals such as we must employ. When the process is initiated within the interval of convergence the equations become more close approximations of the true relationships as each step in the iteration process is completed until the residual errors are only determined by the fundamental accuracy of the system as determined by its geometry and over which mathematical procedures have no influence.

This procedure is simple and direct. The equivalent sets of equations are available for both reflective and non reflective systems and for both displacement and velocity type measurements. Similar sets of equations may also be written for systems where the stations take more than one displacement measurement or measure derivatives of radial velocities.

Approximate methods

Any method for obtaining an approximation of the true values of the coordinates of the positions of the moving vehicles is by itself a method of solving the problem. It is merely a question of accuracy whether or not the particular method is sufficiently accurate for the purposes to be served by the particular system. The question of whether or not to employ the iterative method to refine the data obtainable from approximation methods would depend in part upon the accuracy with which it is possible to make the fundamental measurements. If the approximation methods provide solutions which are as accurate as the error formulas and the measurement accuracy indicate to be possible there is no use in attempting to attain greater accuracy by iterative processes.

Some of the methods of attaining approximate solutions are:

(1) Reference to tables of solutions arranged opposite increments of measured data.

(2) Random selection of possible solutions.

(3) Analogs.

(4) The use of linear solutions made possible by taking redundant data.

(5) The use of previous data taken along the track of the vehicle. This is a natural consequence of the tracking process.

(6) Extra data supplied from other equipments or knowledge of the expected path, such as orbits.

Reference to tables is a very standard method of machine solution of nonlinear equations. The quick access to the table stored in the memory of the computer machine permits its use in applications where the speed in acquiring a solution is important. This method is very straight forward and is well known in the art. There is always a practical limit as to how fine the data may be provided set by the limits of the memory of the machine and the speed required for a solution. In using this method the coordinates of the various positions of the vehicle are arranged in steps opposite the corresponding displacement data calculated from these stepped positions. Interpolation between the steps is of course possible to increase the fineness of the application of the table.

Random selection of possible solutions is also made possible by the extreme rapidity of the modern computing machine. In this method points are selected randomly or they may be randomly selected out of some restricted group of points. The iterative process described before is initiated using this data as an approximation. If the process converges the iteration is carried out to whatever accuracy is required. If the iterative process does not converge, another set of solutions is randomly selected and another attempt is made at an iterative solution. The process of selecting and trying is carried out until iterative process does converge. Of course the random selection process could be carried out without the use of the error formulas by a process of repeated tries directing the process in that direction in which the error appears to be diminishing. This would be a true "cut and try" method and is not recommended in most instances.

The method of analogs is quite appropriate for attaining solutions and may take a number of forms. One analog method is to construct a mechanical scale model of the geometry of the system. Such models have been made by the inventor employing chains and weights and are of particular value in demonstrating the physical relationships underlying the invention. The fixed parameters of the model are adjusted to coincide with the measured values then the dependent parameters are adjusted by trial and error until it is indicated that all geometrical criteria are met. In the case of the chain model this condition is indicated by the chains all becoming taut.

Linear solutions to the fundamental equations are made possible by the use of special distributions of stations, and the taking of redundant data to eliminate terms of higher degree than the first from the equations. This method will be discussed more in detail later.

The use of previous tracking data is particularly and naturally applicable to attaining solutions of ultimate accuracy very quickly perhaps with only one or two iterations. The process of tracking must be started with the initial acquisition of the target which is achieved employing one of the other methods of getting the initial approximation. As the tracking process continues the succeeding position determinations already have the information available from the acquisition process. In a system employing a single measurement of displacement to get a solution, the position of the vehicle at the time that tracking was initiated is retained, the termination position being advanced as each new reading is taken, the previous termination reading being employed as an approximation in getting the new position. The approximation of the initial true position gets ever closer as tracking progresses for it has been found that the longer the distance between the initial position and final position the more accurate is the solution for these positions.

The last method mentioned for obtaining an approximate solution, which may be subsequently refined for the higher accuracy available with my invention, is the use of other types of radar and tracking equipment and knowledge concerning the expected path of the vehicle, such as its orbit. This art is well known and need not be discussed here.

Closed algebraic solutions

Closed alegbraic solutions are not required for the practical application of my invention and do not extend the art in the manner in which data is taken or in system configuration or in the accuracies attainable. Any given system configuration or mode of operation for which a closed solution is available may also be solved by an iterative procedure. The opposite statement is not true, and there are important instances in which no closed solution is available. In some instances these closed solutions are very simple and have practical application in computational procedures. Such solutions also provide additional evidence of the geometrical relationships which underlie my invention. In general, use of a closed solution requires some simplification of the geometry of the system, such as locating all of the stations within a plane. In other instances the taking of additional readings during the measurement interval is required.

There are such a large number of combinations of system specifications, such as the number of stations, how the number of stations is divided into transmitters and receivers, the use of transmitters and receivers at the same station, the variety of equipment that may be employed aboard the vehicle, that inclusion of all such variations would make this document too bulky. Each variation that is intelligently conceived has both advantages and disadvantages over another such system. Sometimes these comparisons are not obvious and must rest upon detailed mathematical computation of the accuracies before a choice between two systems can be made.

The closed solutions presented here have in general one characteristic in common which is the pereminence of the ranges in the calculations. While it may be possible to write some of these solutions directly in terms of the desired cartesian coordinates, such expressions would be enormously complicated. The process of deriving the cartesian coordinates when the ranges from three or more fixed points are known is well understood. In practical application of these solutions these ranges are first found and the numerical value is then substituted in the above transformations to obtain the cartesian coordinates. As stated before this procedure is unnecessary when iterative techniques are employed. Another general characteristic of the closed solutions is to become very complicated for the so-called two legged configuration of the system. This is the configuration in which all of the measurements are those of the total distance from transmitter to target plus target to receiver. Problems involving error in vehicle oscillator frequency in the single legged configuration are also too bulky. Both of these problems yield closed solutions when a sufficient number of readings are taken over the available tracking interval. These forms will not be presented in this application because of their algebraic complexity.

One method of study of closed solutions is through the use of well known relationships between the ranges of a point to several stations of the form:

$$\sum_{i=1}^{i=h} \alpha_i r_i^2 = k$$

where the L's and the K are constants which are determined by the geometrical configuration of the system. These equations exist for a system configuration in which four stations lie in a common plane. Should all four stations lie along a common circle the constant K is zero. Such an equation can also be written for five stations in a general configuration; and, if the five stations lie on a sphere, the constant K again becomes zero. For systems employing a number of stations greater than five one may make up combinations of these four and five station equations to provide the required number of equations for the particular purpose at hand.

As an example of this technique let us examine a case in which four stations take simultaneous readings of radial displacement, three such readings are required to determine the point which the target occupied at the termination of the measuring interval. This problem may be solved for all four of the corresponding positions of the vehicle by iterative means. Now if the four stations are made to lie in a common plane we can employ the following relationship $$\alpha_1 r_1^2 + \alpha_2 r_2^2 + \alpha_3 r_3^2 + \alpha_4 r_4^2 = K$$

We also have from the relationships between the measurements and the ranges the following equations where the first subscript designates the station and the second designates the number of the measurement or the number of the position occupied by the vehicle.

| | | |
|---|---|---|
| $r_{12}-r_{11}=m_{11}$ | $r_{13}-r_{11}=m_{12}$ | $r_{14}-r_{11}=m$ |
| $r_{22}-r_{21}=m_{21}$ | $r_{23}-r_{21}=m_{22}$ | $r_{24}-r_{21}=m$ |
| $r_{32}-r_{31}=m_{31}$ | $r_{33}-r_{31}=m_{32}$ | $r_{24}-r_{31}=m$ |
| $r_{42}-r_{41}=m_{41}$ | $r_{43}-r_{41}=m_{42}$ | $r_{44}-r_{41}=m$ | and from above $$\alpha_1 r_{11}^2 + \alpha_2 r_{21}^2 + \alpha_3 r_{31}^2 + \alpha_4 r_{41}^2 = K$$

$$\alpha_1 r_{12}^2 + \alpha_2 r_{22}^2 + \alpha_3 r_{32}^2 + \alpha_4 r_{42}^2 = K$$

$$\alpha_1 r_{13}^2 + \alpha_2 r_{23}^2 + \alpha_3 r_{33}^2 + \alpha_4 r_{43}^2 = K$$

$$\alpha_1 r_{14}^2 + \alpha_2 r_{24}^2 + \alpha_3 r_{34}^2 + \alpha_4 r_{44}^2 = K$$

The set to be solved is constituted of sixteen simultaneous equations in sixteen unknown ranges. The set may be solved for only the ranges corresponding to a particular one of the four vehicle positions if desired. With the four ranges of a point known it is a simple matter to determine the cartesian coordinates using any three of them. A linear solution for the cartesian coordinates may be employed if one chooses to use the fourth range to cancel out the higher terms.

Simultaneous solution of the sixteen equations is not difficult as the set quickly reduces to a simple quadratic in one unknown.

The same procedure can be employed for five stations in a three dimensional configuration. In this instance four readings are required. In a similar manner the set reduces to a simple quadratic.

Should it be desired an additional reading may be employed to obtain a set of equations in which only the solution of linear equations is involved.

If one chooses to "linearize" the problem by taking the additional reading he can derive a system of linear simultaneous equation such as is shown below in matrix form for the case of four stations in a plane $$\begin{bmatrix} \alpha_1 m_{11} & \alpha_2 m_{21} & \alpha_3 m_{31} & \alpha_4 m_{41} \\ \alpha_1 m_{12} & \alpha_2 m_{22} & \alpha_3 m_{32} & \alpha_4 m_{42} \\ \alpha_1 m_{13} & \alpha_2 m_{23} & \alpha_3 m_{33} & \alpha_4 m_{43} \\ \alpha_1 m_{14} & \alpha_2 m_{24} & \alpha_3 m_{34} & \alpha_4 m_{44} \end{bmatrix} \begin{bmatrix} r_{11} \\ r_{21} \\ r_{31} \\ r_{41} \end{bmatrix} =$$

$$-\tfrac{1}{2} \begin{bmatrix} \alpha_1 m_{11}^2 + \alpha_2 m_{21}^2 + \alpha_3 m_{31}^2 + \alpha_4 m_{41}^2 \\ \alpha_1 m_{12}^2 + \alpha_2 m_{22}^2 + \alpha_3 m_{32}^2 + \alpha_4 m_{42}^2 \\ \alpha_1 m_{13}^2 + \alpha_2 m_{23}^2 + \alpha_3 m_{33}^2 + \alpha_4 m_{43}^2 \\ \alpha_1 m_{14}^2 + \alpha_2 m_{24}^2 + \alpha_3 m_{34}^2 + \alpha_4 m_{44}^2 \end{bmatrix}$$

A six station system, which actually requires only one measurement for an iterative solution may be provided with a closed linear solution by taking two such additional readings if the stations are located in three dimensions. If the stations are in a plane only one such additional reading is required. The determinant associated with a six station single legged system where the stations are located in the three dimensions is as follows:

$$\begin{bmatrix} \alpha_1 m_{11} & \alpha_2 m_{21} & \alpha_3 m_{31} & \alpha_4 m_{41} & \alpha_5 m_{51} & 0 \\ \alpha_1 m_{12} & \alpha_2 m_{22} & \alpha_3 m_{32} & \alpha_4 m_{42} & \alpha_4 m_{52} & 0 \\ \alpha_1 m_{13} & \alpha_2 m_{23} & \alpha_3 m_{33} & \alpha_4 m_{43} & \alpha_5 m_{53} & 0 \\ \beta_1 m_{11} & \beta_2 m_{21} & \beta_3 m_{31} & \beta_4 m_{41} & 0 & \beta_6 m_{61} \\ \beta_1 m_{12} & \beta_2 m_{22} & \beta_3 m_{32} & \beta_4 m_{42} & 0 & \beta_6 m_{62} \\ \beta_1 m_{13} & \beta_2 m_{23} & \beta_3 m_{33} & \beta_4 m_{43} & 0 & \beta_6 m_{63} \end{bmatrix}$$

Other combinations of stations into two groups of five each would have been equally appropriate. If the stations were all in a plane we could use three groups of four stations each taking only two readings to obtain the total of six equations needed to determine simultaneously the six ranges from the initial point to the six stations.

This sort of solution appears very attractive in that only linear equations are employed. In comparison with single reading systems however the multiple reading systems suffer a disadvantage in accuracy when employed with some trajectories and with short measuring intervals. Since there can be no single reading system employing only four stations multiple reading systems have much to offer in certain cases. However the advisability of employing an extra reading to avoid solution of a quadratic or two is to be examined in the light of a possible deterioration in the available accuracy of the system.

Closed solutions may be obtained in single reading systems in which the stations are so distributed as to make the use of a sufficient number of these equations that are linear in the squares of the ranges. For each such equation we may derive a linear equation when a single displacement or velocity reading is taken. Thus if six stations are in a plane we can derive three linear and three nonlinear independent algebraic equations which may be solved for the six unknown ranges. In this instance the solution, if carried out in an adequate manner, is just as accurate as when carried out by the iterative process. However this solution involves the simultaneous solution of quadratics. Other criteria may have to be employed to decide which is the better process to employ in getting an answer.

The multiple reading systems when operated over very short measurement intervals become similar to a system in which the measurement is taken at a single point, but in which the second and higher derivatives of the radial velocity are measured in addition to the radial velocity. If four stations were located in a plane it would be possible to obtain any number of independent equations corresponding to any chosen point merely by repeatedly differentiating with respect to time the expression relating the squares of the four ranges to each other.

$$\sum_{i=1}^{i=h} \alpha_i r_i^2 = k$$

$$\sum_{i=1}^{i=h} \alpha_i r_i \dot{r}_i = 0$$

$$\sum_{i=1}^{i=h} \alpha_i (\dot{r}_i^2 + r_i \ddot{r}_i) = 0$$

$$\sum_{i=1}^{i=h} \alpha_i (3\dot{r}_i \ddot{r}_i + r_i \dddot{r}_i) = 0$$

$$\sum_{i=1}^{i=h} \alpha_i (4\dot{r}_i \dddot{r}_i + 3\ddot{r}_i^2 + r_i \ddddot{r}_i) = 0$$

Simultaneous solution of four of these equations yield the unknown ranges.

In general the higher ordered time derivatives may be obtained through the differentiation of the Doppler velocity data. The order of the highest ordered derivative attainable is determined by the quality of the available data and the smoothing methods that are available. The higher the order of the derivative that it is desired to employ in a solution the better must be the Doppler data which is differentiated to provide the derivative. Iterative techniques may be employed in achieving solutions in systems employing range derivative type measurements in the manner as employed for displacement type measurements. An error equation for a system employing radial velocity data is shown in FIG. 37. Since only range velocity (simple Doppler shift) measurements are made in this system, six stations are required. This is the Error Equation for the first system described in this application and called Multiple Rate Finders. Similar error equations may be written for systems employing fewer stations and higher time derivatives. Such equations may also be written to include provision for unknown constant vehicle frequency standards and for variable unknown frequency standards in the vehicle.

While I have shown a preferred embodiment of the invention it will be understood that the invention is capable of variation and modification from the form shown so that its scope should be limited only by the scope of the claims appended hereto.

What is claimed is:

1. A method for the determination of the position and course of a moving transmitter of waves propagated between the transmitter and a plurality of fixed measuring stations each of said measuring stations comprising only a single wave aperture having a single location and there being only a single wave aperture at each said single location, comprising the step of measuring the Doppler effect caused by the motion of the transmitter upon the waves arriving at each of the measuring stations, said measurement of the Doppler effect performed at one station being substantially simultaneous with the measurement performed at each of the other stations, and each individual measurement being performed relative to waves impinging on only one such single location, conveying the data resultant from said measurements to a common point, and calculating the position and course of the moving transmitter from such data.

2. A method for the determination of the position of a moving object without knowledge of or reference to the type of path followed by the moving object or the forces acting on the object or knowledge of any previous point occupied by the object, comprising the steps of identifying each of a plurality of fixed points in space determining simultaneously the instantaneous value of the component of velocity of the moving object in the direction of each of a number of fixed points such that the otherwise unknown and unbounded position of the moving object is uniquely defined by said determinations and the known parameters related thereto and calculating the position of said moving object in orthogonal coordinates relative to said identified fixed points.

3. A method of determining the position of a moving reflecting target comprising the steps of transmitting continuous waves at a different frequency from each of a plurality of transmitters, radiating energy from the transmitters over a relatively large solid angle, detecting and measuring the signals originating from all of the transmitters and reflected by the target in the direction of each of a plurality of receiving stations, maintaining the frequency of each transmitter constant, said measuring comprising simultaneously counting the number of cycles of reflected waves arriving at each receiving station during a counting interval, precisely maintaining the duration of the time interval of the count, transferring the measured data to a common point, determining the change in the total distance the reflected waves traverse from each transmitter to each receiver by multiplying the number of waves arriving at the receiver by the wave length of the transmitted wave and subtracting the time duration of the count measurement by the velocity propagation of the wave in the medium, performing the said measurements employing combinations of transmitters and receivers such that the otherwise unknown and unbounded position of the said moving reflecting target is entirely specified by said measurements and the known parameters related thereto, calculating the position of the moving target in appropriate coordinates employing these measured distance increments and said known parameters without any knowledge of the type of flight path of the target or previous or current position of the target or any dimension thereof singly or in manifold in any coordinate system, associating the various echo signals detected at one receiving station with the proper echo signals from other stations when more than one target is detected by the stations at the same time, comparing the measurements made at the separate receivers using cross correlation techniques, the differences between the values of the measurements resulting from one target and corresponding to each of the plurality of transmitter stations being identical for that target at each of the other of said receiving stations, and detecting these correlations prior to the process of calculation of position of the target in convenient coordinates.

4. A method for determining the position of a moving reflecting target by means of the observation of the Doppler effect upon waves that are emitted by a plurality of transmitting stations, reflected by the target, and detected and measured by a single receiving station, all of the stations being spacially separated from each other, comprising the steps of transmitting continuous waves at a different frequency from each of said transmitting stations radiating wave energy over a relatively large solid angle from each transmitting station, maintaining the frequency of each transmitting station at a fixed and known value, detecting and measuring the signal reflected by the said target in the direction of said receiving station, detecting and measuring at said receiving station the reflected signal from each transmitting station separately and simultaneously with the reflected signals from the other of said transmitting station, determining the number of cycles of reflected waves arriving during each measurement interval, precisely determining the time duration of the measurement interval, determining the change in the total distance of transmitting station to target and target to receiving station occurring during the measurement interval, performing said measurements using essentially simultaneously a number of transmitters such that the otherwise unknown and unbounded position of said moving reflecting target is completely specified by said measurements and the known parameters associated therewith.

5. A method for the determination of the position of a moving vehicle carrying a receiver of pulsed waves when a frequency or time standard of high accuracy is not available aboard the vehicle comprising the steps of transmitting pulsed waves that are uniformily and accurately spaced from a plurality of transmitters whose positions are known, said pulses being transmitted at substantially the same time from all transmitters, using a low accuracy frequency standard of high stability to measure with high precision the relative time intervals between the arrivals at the receiver of successive pulses from each of said transmitters, identifying which pulses arriving at the receiver are emitted by each of the transmitters, performing said measurements using substantially simultaneously a number of said transmitters such that the otherwise unknown and unbounded position of said moving vehicle is fully determined by said measurements and the known parameters thereof, and determining the position of the vehicle in orthogonal coordinates from the measured data.

6. A method of determining the position of a moving vehicle, whose previous positions are otherwise unknown, comprising the following steps:

(1) establishing at separated known geographical points wave transmitting means and wave receiving means, (2) placing aboard the vehicle a transponder responsive to signals received from said transmitting means and to which said receiving means are responsive, (3) detecting at each of the said receiving means the signals from said transponder and employing these signals to measure variations in the sum of the distance from a transmitting means to the vehicle and the distance from the vehicle to the receiving means, (4) performing the said measurements using a combination of stations such that the otherwise unknown and unbounded position of the moving vehicle is fully determined by said measurements and the known parameters associated therewith, (5) calculating the desired positional data in suitable coordinates from the measured and known data.

7. A method of determining the position of a moving vehicle and providing that vehicle with one terminal of a communications link that may be used for any other communication purpose, the two functions being fulfilled using a single communications channel with a single apparatus aboard the said vehicle, the position of the vehicle being unknown and unbounded other than by the position determining method described in steps of this claim, comprising the following steps:

Step (1) Placing aboard the vehicle one terminal of a communications system;

Step (2) Placing at a plurality of separate and known points other terminals of said communications system;

Step (3) Employing the terminals of said wave communications system of Step 1 and Step 2 and making measurements therewith dependent upon variation of the position of the moving vehicle, the same propagated waves being employed both for communications purposes and for the purposes of said measurements simultaneously, said measurements being measurements of the variations of the unknown lengths of the wave propagation paths between the terminal of Step 1 and the terminals of Step 2;

Step (4) Employing the variation measurements derived in Step 3 and known parameters associated therewith to determine the position of the moving vehicle;

Step (5) Employing the means of Step 1 and selected means of Step 2 to communicate.

References Cited

UNITED STATES PATENTS

| | | | |
|---|---|---|---|
| 2,654,884 | 10/1953 | Palmer | 343—9 |
| 2,817,081 | 12/1957 | Van Roberts | 343—9 |
| 2,912,671 | 11/1959 | Hayes | 340—3 |
| 3,012,222 | 12/1961 | Hagemann | 340—3 |
| 2,406,953 | 9/1961 | Lewis | 343—15 |
| 2,821,704 | 1/1958 | O'Day | 343—15 |
| 1,406,996 | 2/1922 | Marrill | 343—105 |
| 2,413,637 | 12/1946 | Loughlin | 343—105 |
| 2,428,966 | 10/1947 | Gage | 343—101 |
| 1,875,329 | 3/1934 | Chereix | 331—1 |
| 1,952,701 | 3/1931 | Chereix | 331—1 |
| 2,940,076 | 6/1960 | Bissett | 343—112 |
| 2,968,034 | 1/1961 | Cafarelli | 343—112 |
| 2,403,626 | 7/1946 | Wolff | 343—103 |
| 2,444,452 | 7/1948 | Labin | 343—6 |
| 2,514,351 | 7/1950 | Smith | 343—6 |
| 2,515,332 | 7/1950 | Budenbom | 343—15 |
| 2,537,593 | 1/1951 | Landon | 343—14 |
| 2,968,034 | 1/1961 | Cafarelli | 343—112 |
| 3,115,627 | 12/1963 | Pierce | 343—8 |

RODNEY D. BENNETT, Primary Examiner

R. E. BERGER, Assistant Examiner

U.S. Cl. X.R.

340—3; 343—8, 15, 101, 112